(12) United States Patent
Saito et al.

(10) Patent No.: US 12,227,391 B2
(45) Date of Patent: Feb. 18, 2025

(54) VIBRATION DAMPING DEVICE AND ELEVATOR APPARATUS

(71) Applicant: Mitsubishi Electric Corporation, Tokyo (JP)

(72) Inventors: Eiichi Saito, Tokyo (JP); Takahide Hirai, Tokyo (JP); Seiji Watanabe, Tokyo (JP); Daisuke Nakazawa, Tokyo (JP); Daiki Fukui, Tokyo (JP); Tomohiro Asamura, Tokyo (JP); Yusuke Chikada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1049 days.

(21) Appl. No.: 17/051,788

(22) PCT Filed: Dec. 3, 2018

(86) PCT No.: PCT/JP2018/044401
§ 371 (c)(1),
(2) Date: Oct. 30, 2020

(87) PCT Pub. No.: WO2019/220670
PCT Pub. Date: Nov. 21, 2019

(65) Prior Publication Data
US 2021/0231190 A1 Jul. 29, 2021

(30) Foreign Application Priority Data

May 15, 2018 (JP) .................................. 2018-093797

(51) Int. Cl.
*B66B 7/06* (2006.01)
*B66B 1/28* (2006.01)
(Continued)

(52) U.S. Cl.
CPC ............... *B66B 7/06* (2013.01); *B66B 1/28* (2013.01); *B66B 1/3476* (2013.01); *B66B 5/022* (2013.01);
(Continued)

(58) Field of Classification Search
CPC ........... B66B 7/06; B66B 1/28; B66B 1/2476; B66B 5/022; B66B 5/122; B66B 5/125;
(Continued)

(56) References Cited

U.S. PATENT DOCUMENTS 5,492,312 A 2/1996 Carlson
5,558,191 A 9/1996 Lai
(Continued)

FOREIGN PATENT DOCUMENTS

CN 107489732 A 12/2017
CN 113358498 A 9/2021
(Continued)

OTHER PUBLICATIONS

Office Action issued on Dec. 14, 2021, in corresponding Japanese patent Application No. 2020-518957, 5 pages.
(Continued)

*Primary Examiner* — Thomas W Irvin
(74) *Attorney, Agent, or Firm* — XSENSUS LLP

(57) ABSTRACT

A vibration damping device for reducing vibration of an elevator rope includes a displacement amplifier arranged around a region from a first portion of the elevator rope drawn and a second portion of the elevator rope drawn from an opposite side of one or more sheaves in parallel with the first portion. The displacement amplifier is configured to amplify a displacement of each of the first portion and the second portion of the elevator rope. The device also includes a limiting member that controls displacement amplification performed by the displacement amplifier such that the (Continued)

displacement of the first portion or the second portion amplified by the displacement amplifier does not become greater than a first displacement, which is a displacement of the elevator rope by which the elevator rope is not allowed to return to an equilibrium position of the vibration.

13 Claims, 54 Drawing Sheets

(51) Int. Cl.
    *B66B 1/34*         (2006.01)
    *B66B 5/02*         (2006.01)
    *B66B 5/12*         (2006.01)
    *B66B 7/10*         (2006.01)
    *B66B 7/12*         (2006.01)
    *F16F 13/00*       (2006.01)
    *F16F 15/00*       (2006.01)
    *F16F 15/03*       (2006.01)
    *F16F 15/04*       (2006.01)
    *F16F 15/02*       (2006.01)

(52) U.S. Cl.
    CPC ............... *B66B 5/125* (2013.01); *B66B 7/10* (2013.01); *B66B 7/1215* (2013.01); *F16F 13/007* (2013.01); *F16F 15/002* (2013.01); *F16F 15/03* (2013.01); *F16F 15/035* (2013.01); *F16F 15/04* (2013.01); *F16F 15/022* (2013.01); *F16F 2222/06* (2013.01); *F16F 2228/007* (2013.01); *F16F 2228/063* (2013.01); *F16F 2230/0023* (2013.01); *F16F 2230/0029* (2013.01); *F16F 2230/18* (2013.01)

(58) Field of Classification Search
    CPC ........ B66B 7/10; B66B 7/1215; F16F 13/007; F16F 15/002; F16F 15/03; F16F 15/035; F16F 15/04; F16F 15/022; F16F 2222/06; F16F 2228/007; F16F 2228/063; F16F 2230/0023; F16F 2230/0029; F16F 2230/18
    See application file for complete search history.

(56) References Cited

U.S. PATENT DOCUMENTS

| | | | |
|---|---|---|---|
| 7,784,590 B2 | 8/2010 | Watanabe et al. | |
| 7,798,290 B2* | 9/2010 | Mustalahti ............ | B66B 11/007 187/391 |
| 8,567,568 B2* | 10/2013 | Korvenranta ......... | B66B 11/008 187/264 |
| 9,359,172 B2* | 6/2016 | Mangini ................ | B66B 7/06 |
| 9,487,378 B2* | 11/2016 | Lin ........................ | B66B 11/08 |
| 9,828,211 B2* | 11/2017 | Schonauer ............ | F16F 15/002 |
| 2009/0120733 A1* | 5/2009 | Mustalahti ............ | B66B 7/10 187/404 |
| 2010/0072000 A1* | 3/2010 | Lin ........................ | B66B 11/08 187/266 |
| 2010/0089706 A1* | 4/2010 | Korvenranta ......... | B66B 11/008 187/264 |
| 2013/0048438 A1* | 2/2013 | Mangini ................ | B66B 7/06 187/414 |
| 2013/0133983 A1* | 5/2013 | Mangini ................ | B66B 5/021 187/277 |
| 2013/0213742 A1 | 8/2013 | Hakala et al. | |
| 2014/0229011 A1 | 8/2014 | Fukui et al. | |
| 2015/0321880 A1* | 11/2015 | Schonauer ............ | B66B 1/28 187/292 |
| 2016/0096708 A1* | 4/2016 | Alasentie .............. | B66B 11/04 187/266 |
| 2016/0236905 A1* | 8/2016 | Zerelles ................ | B66B 9/00 |
| 2016/0272463 A1 | 9/2016 | Benosman | |
| 2016/0297644 A1* | 10/2016 | Guilani ................. | B66B 7/12 |
| 2017/0260025 A1 | 9/2017 | Benosman et al. | |
| 2018/0068773 A1 | 3/2018 | Zhu et al. | |
| 2021/0094793 A1* | 4/2021 | Saito ..................... | F16F 15/035 |
| 2021/0094799 A1* | 4/2021 | Saito ..................... | F16F 15/04 |
| 2021/0130127 A1* | 5/2021 | Saito ..................... | F16F 15/03 |
| 2021/0231190 A1 | 7/2021 | Saito et al. | |
| 2022/0112052 A1 | 4/2022 | Nakazawa et al. | |
| 2022/0381317 A1 | 12/2022 | Asamura et al. | |

FOREIGN PATENT DOCUMENTS

| | | | | |
|---|---|---|---|---|
| DE | 112019007876 T5 * | 9/2022 | ............ | B66B 11/08 |
| JP | 3-26682 A | 2/1991 | | |
| JP | H03-051279 A | 3/1991 | | |
| JP | H10-504088 A | 4/1998 | | |
| JP | 2004-250217 A | 9/2004 | | |
| JP | 2007-1711 A | 1/2007 | | |
| JP | 2007-119185 A | 5/2007 | | |
| JP | 2007-309411 A | 11/2007 | | |
| JP | 2007-331901 A | 12/2007 | | |
| JP | 2013-166652 A | 8/2013 | | |
| JP | 2014-190507 A | 10/2014 | | |
| JP | 2014-234295 A | 12/2014 | | |
| JP | 2015-199586 A | 11/2015 | | |
| WO | 2010/013597 A1 | 2/2010 | | |
| WO | WO-2021090400 A1 * | 5/2021 | ............... | B66B 7/06 |
| WO | WO-2021090401 A1 * | 5/2021 | ............ | B66B 11/08 |

OTHER PUBLICATIONS

Office Action issued on Mar. 24, 2023, in corresponding U.S. Appl. No. 17/051,786, 37 pages.
Office Action issued on Aug. 23, 2021, in corresponding Chinese patent Application No. 201880093276.5, 16 pages.
International Search Report and Written Opinion mailed on Dec. 25, 2018, corresponding PCT/JP2018/044400, 10 pages; including English Translation of the International Search Report.
International Search Report and Written Opinion mailed on Feb. 26, 2019, corresponding PCT/JP2018/044403, 9 pages; including English Translation of the International Search Report.
International Search Report and Written Opinion mailed on Feb. 26, 2019, corresponding PCT/JP2018/044402, 11 pages; including English Translation of the International Search Report.
Office Action issued on Sep. 2, 2022, in corresponding Korean patent Application No. 10-2020-7032186, 8 pages.
International Search Report and Written Opinion mailed on Feb. 26, 2019 for PCT/JP2018/044401 filed on Dec. 3, 2018, 8 pages including English Translation of the International Search Report.
U.S. Final Office Action issued Aug. 15, 2023 in co-pending U.S. Appl. No. 17/051,786, 11 pages.
U.S. Nonfinal Office Action issued Sep. 25, 2023 in co-pending U.S. Appl. No. 17/051,799, 40 pages.
U.S. Office Action issued Nov. 21, 2023 in co-pending U.S. Appl. No. 17/051,786, 14 pages.
U.S. Office Action issued Dec. 21, 2023 in co-pending U.S. Appl. No. 17/051,960, 50 pages.
Niedrig, Heinz; Sternberg, Martin: Das Ingenieurwissen: Physik. Berlin: Springer, 2014. Pages 35 to 36.—ISBN 978-3-642-41127-4.
Office Action dated Jul. 23, 2024 in the corresponding German patent application No. 11 2018 007 620.2, 28pp.
Office Action dated Jul. 29, 2024 in the corresponding German patent application No. 11 2018 007 607.5, 16pp.
Office Action dated Jul. 29, 2024 in the corresponding German patent application No. 11 2018 007 617.2, 25pp.

* cited by examiner

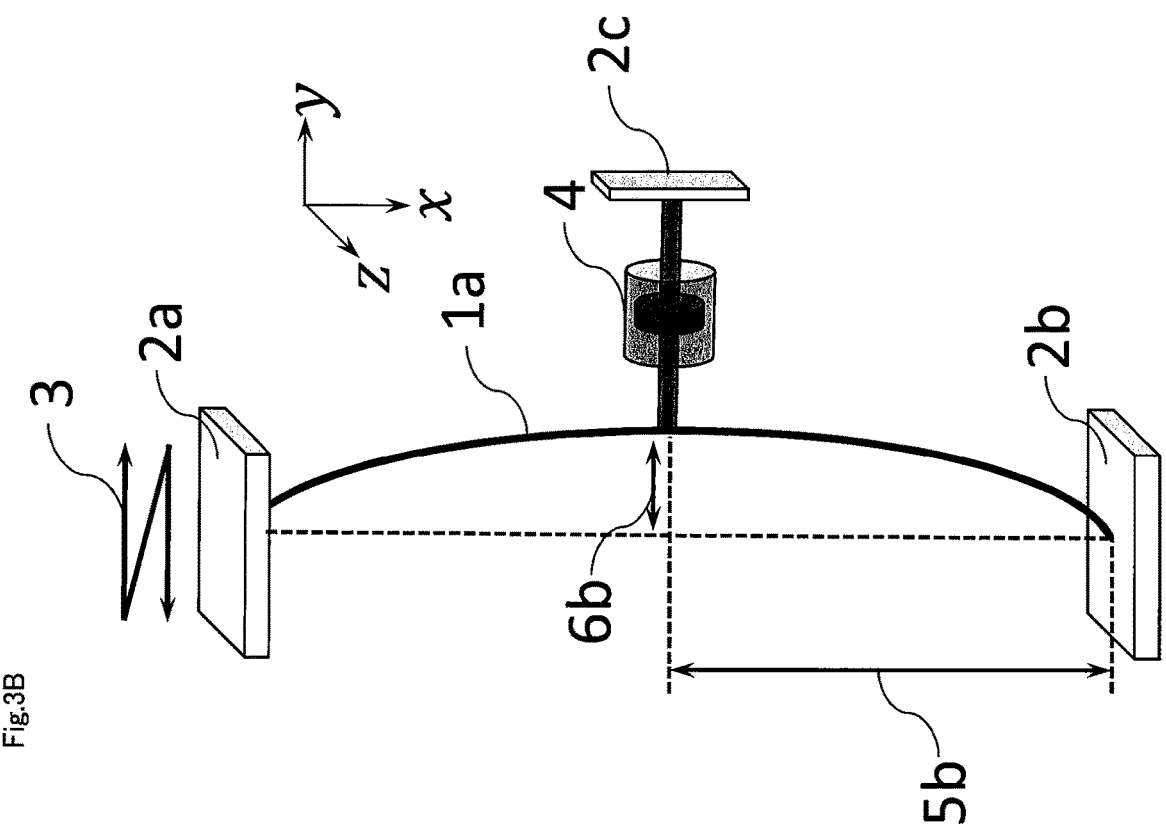
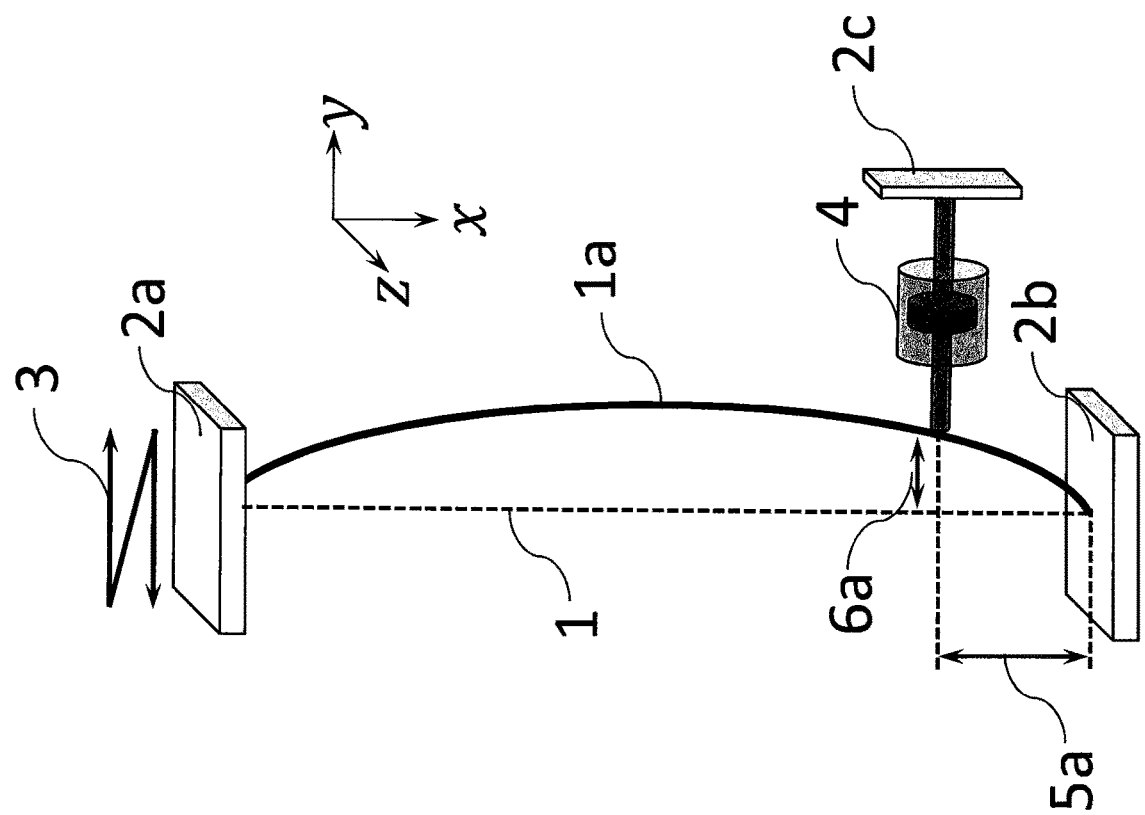

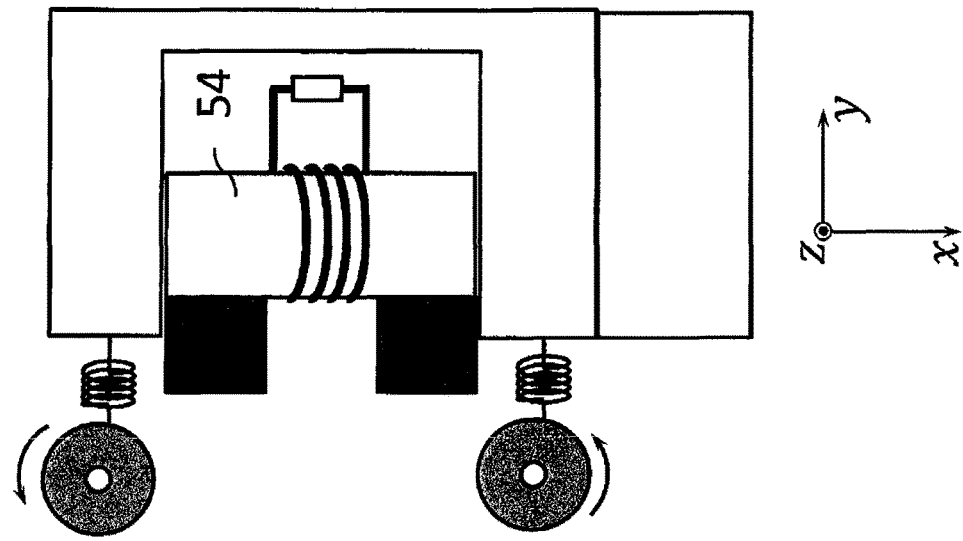
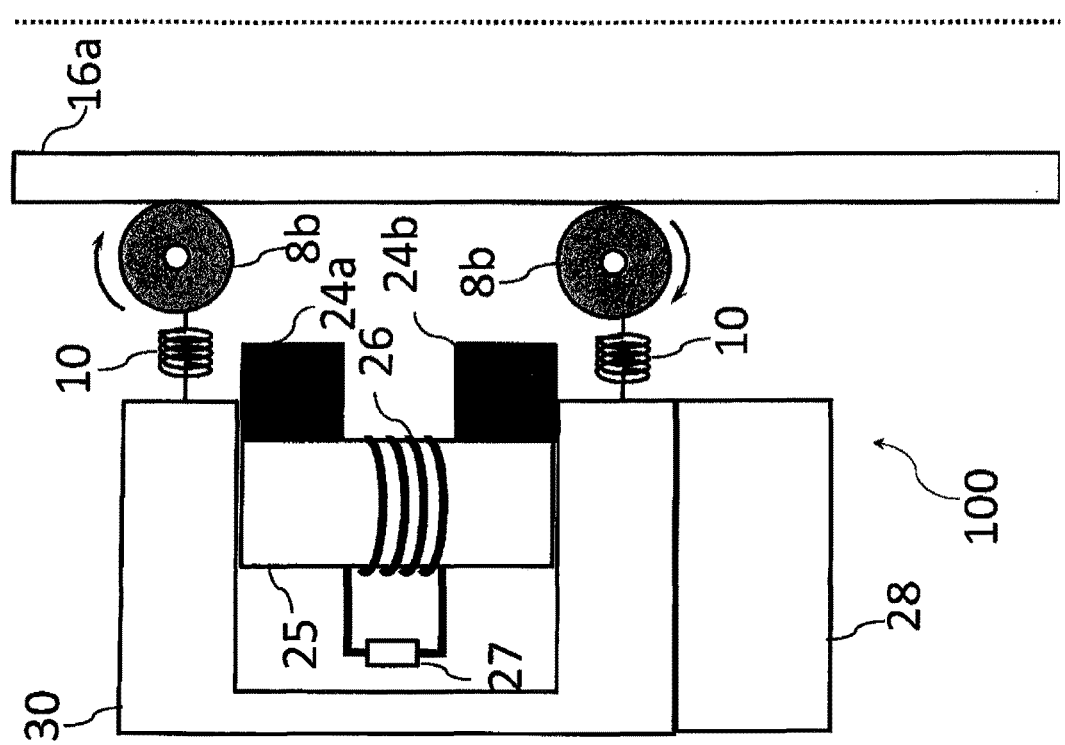
Fig.15

VIBRATION DAMPING DEVICE AND ELEVATOR APPARATUS

CROSS-REFERENCE TO RELATED APPLICATIONS

The present application is based on PCT filing PCT/JP2018/044401, filed Dec. 3, 2018, which claims priority to JP 2018-093797, filed May 15, 2018, the entire contents of each are incorporated herein by reference. This application is also related to U.S. Ser. No. 17/051,960, entitled: "SWAY AMOUNT ESTIMATION SYSTEM AND ELEVATOR APPARATUS" filed on Oct. 30, 2020; U.S. Ser. No. 17/051,799, entitled: "VIBRATION DAMPING SYSTEM AND ELEVATOR APPARATUS" filed on Oct. 30, 2020; and U.S. Ser. No. 17/051,786, entitled: "VIBRATION DAMPING DEVICE AND ELEVATOR APPARATUS" filed on Oct. 30, 2020.

FIELD

The present invention relates to a vibration damping device to control vibration of an elevator rope, which is wound on and folded over a sheave.

BACKGROUND

As a vibration damping device for an elevator rope, for example, there is disclosed a conventional vibration damping device that includes a damper (which converts vibration energy into heat energy and dissipates the energy) disposed in a machine room located near an end of the elevator rope, for controlling vibration of the elevator rope (PTL 1).

As another vibration damping device, there is also disclosed a device that is disposed near an end of a rope and includes a mechanical element for applying a negative centering force to an elevator rope in the same direction as the displacement direction of the elevator rope, and also includes an inverted pendulum to implement the negative centering force (PTL 2). Meanwhile, there is also disclosed the use of the attraction force of a permanent magnet to implement such a negative centering force (PTL 3).

CITATION LIST

Patent Literature

[PTL 1] JP 2007-1711 A
[PTL 2] JP H3-26682 A
[PTL 3] JP 2007-309411 A

SUMMARY

Technical Problem

In the conventional vibration damping device, a damper is provided at a portion where the amplitude of a long structure is small. Thus, the obtained vibration damping effect is small, and it may be impossible to provide the damper at a portion where the amplitude is large. Further, since negative stiffness obtained with an inverted pendulum or a permanent magnet has a property such that its stiffness value increases nonlinearly with an increase in displacement of a long structure, the negative stiffness would become excessively large and become unstable if the displacement of the long structure is increased. Then, the displacement of the vibration damping device would be fixed at the maximum position of the range of motion of the vibration damping mechanism, which is problematic in that the vibration damping effect of the negative stiffness cannot be exhibited.

It is an object of the present invention is to provide a vibration damping device including an instability preventing means, for efficiently suppressing amplification of vibration of an elevator rope, which is wound on and folded over a sheave, due to a resonance phenomenon.

Solution to Problem

A vibration damping device according to the present invention for reducing vibration of an elevator rope that is wound on and folded over one or more sheaves of an elevator, includes: a displacement amplifier arranged around a region from a first portion of the elevator rope drawn from the one or more sheaves and a second portion of the elevator rope drawn from an opposite side of the one or more sheaves in parallel with the first portion, the displacement amplifier being configured to amplify a displacement of each of the first portion and the second portion of the elevator rope; and a limiting member that controls displacement amplification performed by the displacement amplifier such that the displacement of the first portion or the second portion amplified by the displacement amplifier does not become greater than a first displacement, the first displacement being a displacement of the elevator rope by which the elevator rope is not allowed to return to an equilibrium position of the vibration.

An elevator apparatus according to the present invention includes the aforementioned vibration damping device.

Advantageous Effects of Invention

According to the present invention, it is possible to perform vibration control while preventing instability using a vibration damping device that is provided for an elevator rope wound on and folded over a sheave.

BRIEF DESCRIPTION OF DRAWINGS

FIG. 3A is a schematic view in which vibration of the long structure according to Embodiment 1 is controlled with a damper.

FIG. 3B is a schematic view in which vibration of the long structure according to Embodiment 1 is controlled with a damper.

FIG. 15 is a view of the vibration damping device with limiting members of the elevator apparatus according to Embodiment 2.

FIG. 40A is a side view of the vibration damping device according to Embodiment 3.

DESCRIPTION OF EMBODIMENTS

Embodiment 1

Embodiment 1 will be described with reference to the drawings. It should be noted that the present invention is not limited to the specific examples described hereinafter, and the dimensions, materials, and shapes can be changed as appropriate.

Figure 1:
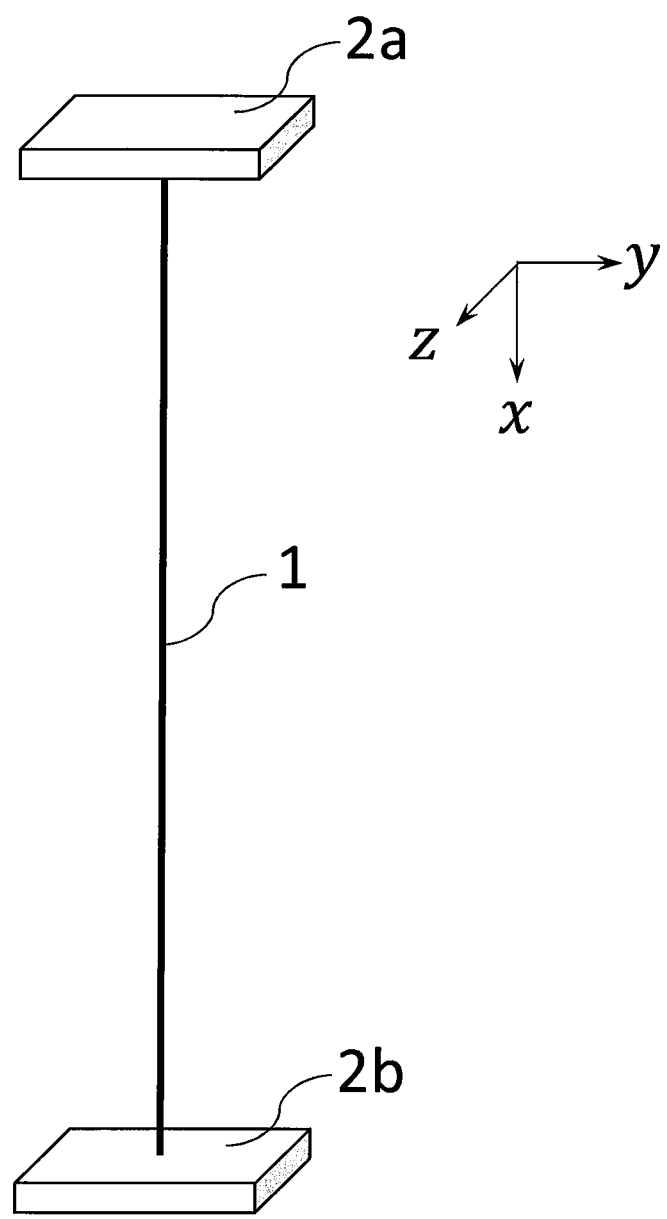
FIG. 1 is a schematic view of the long structure according to Embodiment 1.

FIG. 1 is a schematic view of a structure 1 that is a vibration control target of a vibration damping device 100 of the present embodiment. The structure 1 herein is a long object having a longer dimension at least along one direction thereof than that along the other direction. The structure 1 may be a bar-like or plate-like structure or a rope-like object, for example. Alternatively, the structure 1 may be a structural member that supports something to maintain its shape, or a flexible member whose shape will greatly change against turbulence. In addition, the structure 1 may be fixed to another object at a given position along the direction of its longer dimension.

The structure 1 is fixed at both ends to fixed planes 2a and 2b. The figure illustrates the x-axis, y-axis, and z-axis of the 3-axis orthogonal coordinate system, and the vertically downward direction corresponds to the positive direction of the x-axis. The longitudinal direction of the structure 1 is parallel with the x-axis, and thus, the structure 1 is arranged along the vertical direction. The fixed plane 2a is located above the structure 1 in the vertical direction, and the fixed plane 2b is located below the structure 1 in the vertical direction. FIG. 1 illustrates a state in which the structure 1 is not vibrated and thus vibration in the transverse direction that is a direction perpendicular to the longitudinal direction (hereinafter referred to as "transverse vibration") is not generated.

Figure 2:
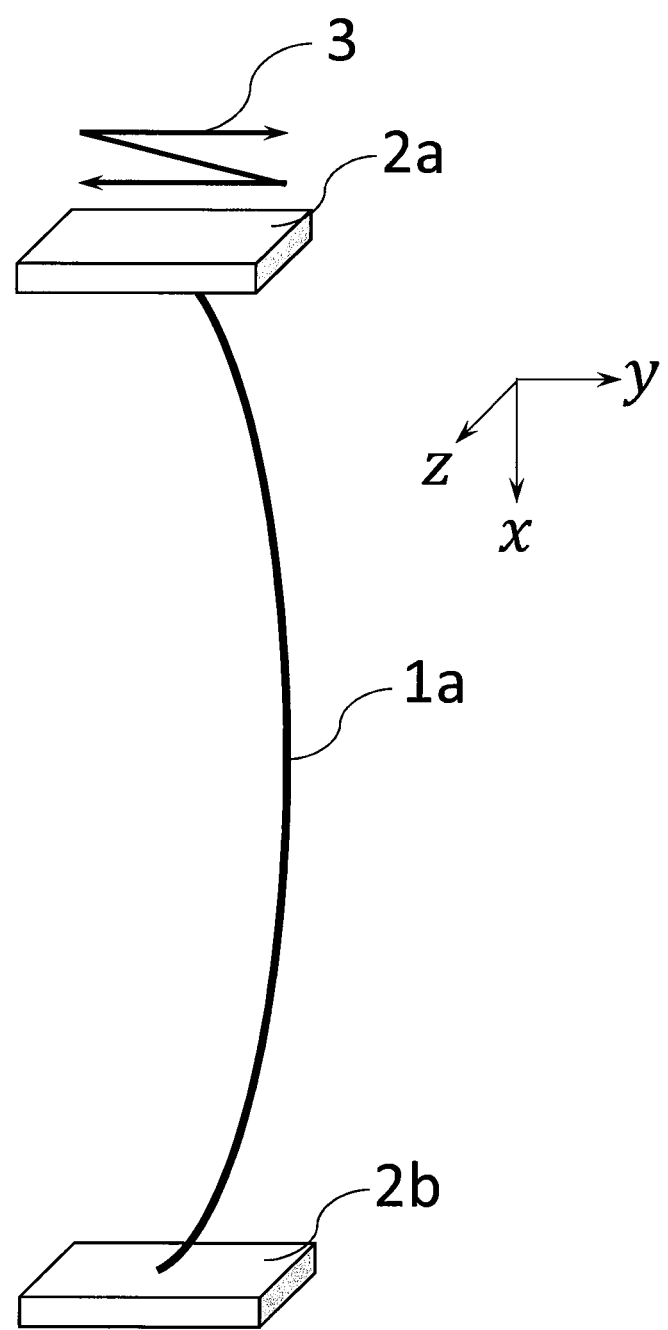
FIG. 2 is a schematic view illustrating the state of vibration of the long structure according to Embodiment 1.

FIG. 2 is a schematic view illustrating the state of a structure 1a that is vibrated. In FIG. 1, when a vibration force 3 to vibrate the fixed plane 2a is applied to the fixed plane 2a and the vibration frequency of the vibration force 3 coincides with the natural frequency of the structure 1a, a resonance phenomenon occurs. Then, the amplitude of the structure 1a (and the fixed plane 2a) is amplified. Although the figure illustrates that the direction of the vibration of the vibration force 3 and the structure 1a is the y-axis direction, the present invention is not limited thereto, and the same holds true for any direction on the yz plane. In addition, a similar phenomenon occurs when the fixed plane 2b is vibrated.

Herein, the amplitude of vibration when resonance of the structure 1a occurs differs depending on the position of the structure 1a in the longitudinal direction (i.e., x-direction), and is determined by the distribution of the stiffness and mass of the structure 1a.

FIG. 3 are schematic views in which vibration (or resonant vibration) of the structure 1a is controlled with a damper. Herein, the damper is a viscous element that converts vibration energy into heat energy by means of viscous resistance or friction, for example, and dissipates the energy, thereby absorbing the vibration, and exerts a force proportional to speed. FIG. 3A illustrates disposing a damper 4 as a vibration damping means via a fixed plane 2c at a position away from the fixed plane 2b by a distance 5a in the vertically upward direction (i.e., x-direction). In contrast, in FIG. 3B, the damper 4 is disposed at a position away from the fixed plane 2b by a distance 5b, which is greater than the distance 5a and is half the longitudinal length of the structure 1, in the vertically upward direction (i.e., x-direction).

When the amplitude of vibration of the structure 1a at the position where the damper 4 is disposed in FIG. 3A is compared with that in FIG. 3B, it is found that an amplitude 6a in FIG. 3A at a position closer to the fixed plane 2b is smaller than an amplitude 6b in FIG. 3B. Then, since the displacement of the damper 4 in FIG. 3A is smaller than that in FIG. 3B, the vibration damping effect of the damper 4 in FIG. 3A is smaller than that in FIG. 3B.

However, since the position where the damper 4 of FIG. 3A is disposed is close to the fixed plane 2b, its installation is easier than that of the damper 4 in FIG. 3B. Therefore, the damper 4 is disposed at a position near the fixed plane 2b where its installation is easy, and a device for increasing the vibration damping effect of the damper 4 is introduced. Although the configuration illustrated herein is intended to increase the vibration damping effect of the damper 4, a device configuration without the damper 4 is also possible.

Other than the aforementioned damper 4, as a conventional vibration damping device, there is also known a vibration damping device that uses an inverted pendulum mechanism or a negative stiffness mechanism using a permanent magnet described in PTL 2 or 3. However, the stiffness characteristics exhibited by such negative stiffness mechanisms are nonlinear such that the stiffness value (i.e., modulus of elasticity) is not constant with respect to changes in displacement of a structure but the stiffness value increases along with displacement.

When an inverted pendulum mechanism or a negative stiffness mechanism using a permanent magnet is used, there is a possibility that as a displacement of the structure 1 increases, the negative stiffness value becomes excessively large and may cause unstable behavior. Herein, "the negative stiffness value becomes large" means that the absolute value of the negative stiffness value becomes large. Unstable behavior has practical problems. Specifically, as the negative stiffness mechanism has nonlinear stiffness characteristics, if unstable behavior occurs in the conventional vibration damping device, a displacement of the structure 1 at the position where the vibration damping device is disposed would be fixed at the maximum position of the range of motion of the vibration damping device. This is because a force of the negative stiffness becomes greater than a force with which the structure 1 attempts to return to the equilibrium position. When the structure 1 is fixed at the maximum position of the range of motion of the vibration damping device, the displacement amplification effect cannot be obtained, with the result that the vibration damping effect of the negative stiffness cannot be exhibited at all.

To prevent such unstable behavior due to an increase in the negative stiffness value, it may be effective to set the negative stiffness value to a small value in advance. However, with a small negative stiffness value, the amount of amplification of the displacement of the structure 1 also becomes small. Consequently, the vibration damping effect becomes smaller or an improvement in the vibration damping effect of the damper becomes smaller. Further, even when the negative stiffness mechanism has a small negative stiffness value, it has nonlinear characteristics regarding an increase in the negative stiffness value. Thus, the phenomenon of the unstable behavior cannot be solved fundamentally.

Figure 4:
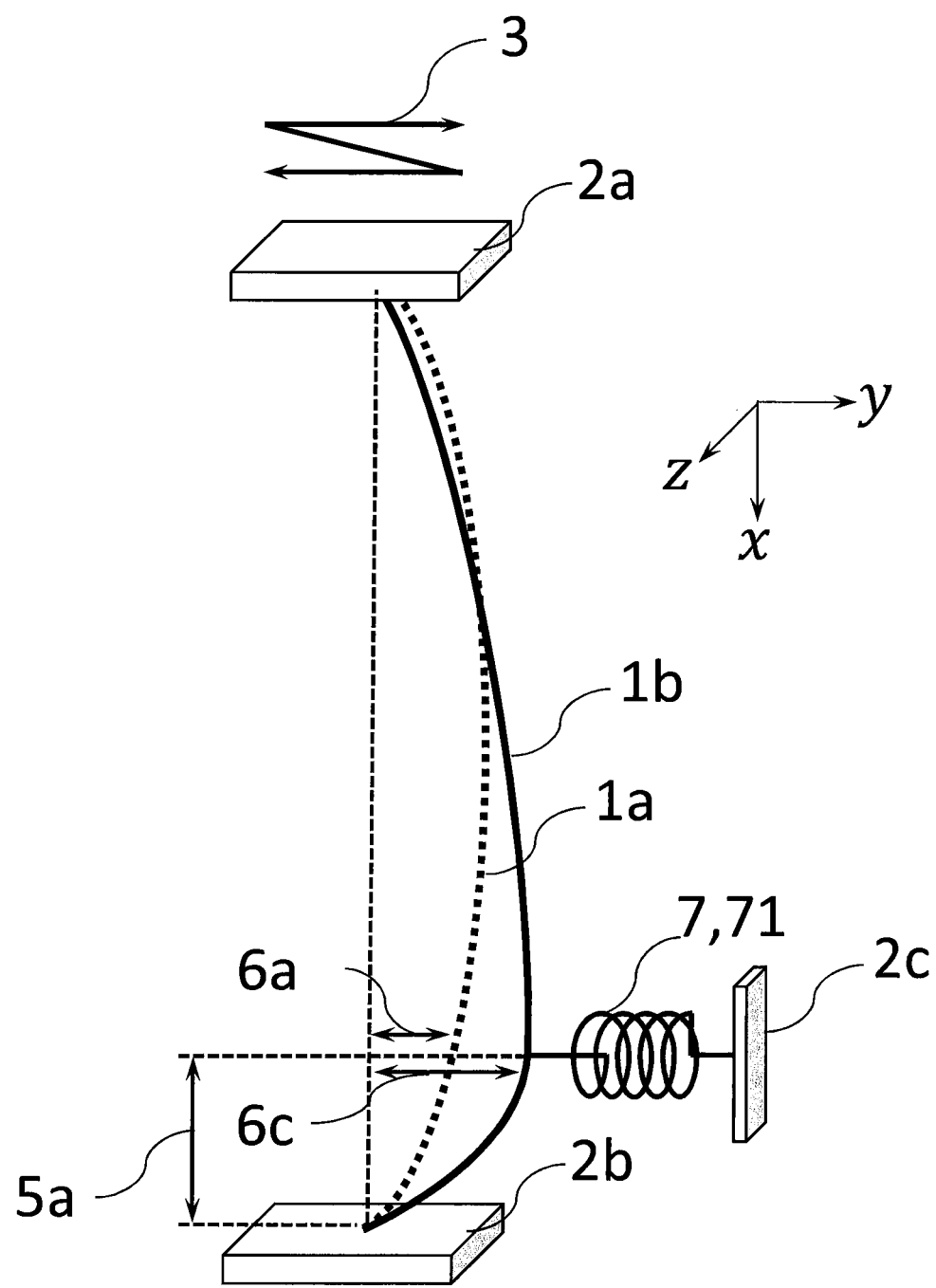
FIG. 4 is a view illustrating the displacement amplifier provided to a long structure according to Embodiment 1.

FIG. 4 is a view illustrating an example of a displacement amplifier 7 provided to the structure of the vibration damping device 100 of the present embodiment. The displacement amplifier 7 is a device that amplifies a displacement due to vibration of the structure 1. The displacement amplifier 7 amplifies a displacement of the structure 1 using negative stiffness or negative inertia, for example. In the present embodiment, the displacement amplifier 7 amplifies a displacement of the structure 1 without requiring an external energy input. That is, the displacement amplifier 7 is a passive device. The displacement amplifier 7 is a negative stiffness portion 71, for example. The negative stiffness portion 71 is connected via the fixed plane 2c to a position away from the fixed plane 2b by the distance 5a at which the damper 4 of FIG. 3A is disposed. The negative stiffness portion 71 is arranged so that the structure 1 has a natural length when it stands still.

Herein, the state in which the structure 1 stands still means a state in which there is no displacement of the structure 1 in the direction perpendicular to the longitudinal direction thereof, which means that there is no vibration, that is, there is no external force other than gravity acting on the structure 1. At this time, the structure 1 is in the equilibrium position. The negative stiffness portion 71 has characteristics opposite to the characteristics of common positive stiffness that represent the degree of difficulty of deformation in response to an applied force. While a spring having positive stiffness, for example, applies an elastic force in the direction opposite to the received displacement, the negative stiffness portion 71 applies an elastic force in the same direction as the received displacement.

As the negative stiffness portion 71, an inverted pendulum mechanism or a mechanism using a permanent magnet can be used. The inverted pendulum mechanism is a pendulum mechanism having the center of gravity at a position higher than a pivot. The pivot is fixed to the fixation portion, and a weight is connected to a vertically upward position of the structure 1 in the stand-still state. Then, when the structure is displaced in the transverse direction, the weight is tilted, and further, a force that tends to cause the structure to fall due to gravity is generated. The force that tends to cause the structure to fall can be used as the negative stiffness force. However, the negative stiffness provided by the inverted pendulum is not linear. Thus, a negative stiffness force becomes greater as the displacement increases.

Meanwhile, regarding the mechanism using a permanent magnet, a ferromagnetic material, such as iron, is used for the structure 1 or a member provided on the structure 1 at a position facing the displacement amplifier 7, and a permanent magnet is provided at a position away from the structure 1 in the stand-still state. Since there is a distance between the structure 1 in the stand-still state and the permanent magnet, a magnetic force acting between them is small. However, when the structure 1 is displaced and approaches the permanent magnet, the magnetic force attracting them to each other increases and then becomes the negative stiffness force. However, since the magnetic force follows the Coulomb's law and thus is inversely proportional to the square of the distance between the structure 1 and the permanent magnet, the negative stiffness is nonlinear unless a special mechanism is provided. Naturally, when the structure 1 and the permanent magnet have come into contact with each other and the distance between them has become zero, the negative stiffness force will not increase any further even if the displacement of the structure 1 increases.

The negative stiffness portion 71 increases a displacement of the structure 1a at a position where the negative stiffness portion 71 is provided at the distance 5a from the fixed plane 2b. This is illustrated in FIG. 4. In FIG. 4, if the structure 1 is displaced like a structure 1a indicated by the dotted line, the negative stiffness portion 71 contracts by exerting a force in the same direction as the displacement. With this force, the structure deforms like the spatial waveform of a structure 1b indicated by the solid line and thus can be shaped.

In this manner, even when the displacement amplifier is provided at a position not corresponding to the antinode of the vibration of the structure 1, it is possible to change the spatial waveform of the vibration of the structure 1a, that is, the vibration mode so that the antinode of the vibration of the structure 1 approaches the damper 4. Therefore, even when the damper 4 is provided at the distance 5a (which is less than half the length of the structure 1) from the fixed plane 2b as illustrated in FIG. 3A, it is possible to increase the vibration damping effect of the damper 4 by providing the damper 4 with the negative stiffness portion 71.

Figure 5:
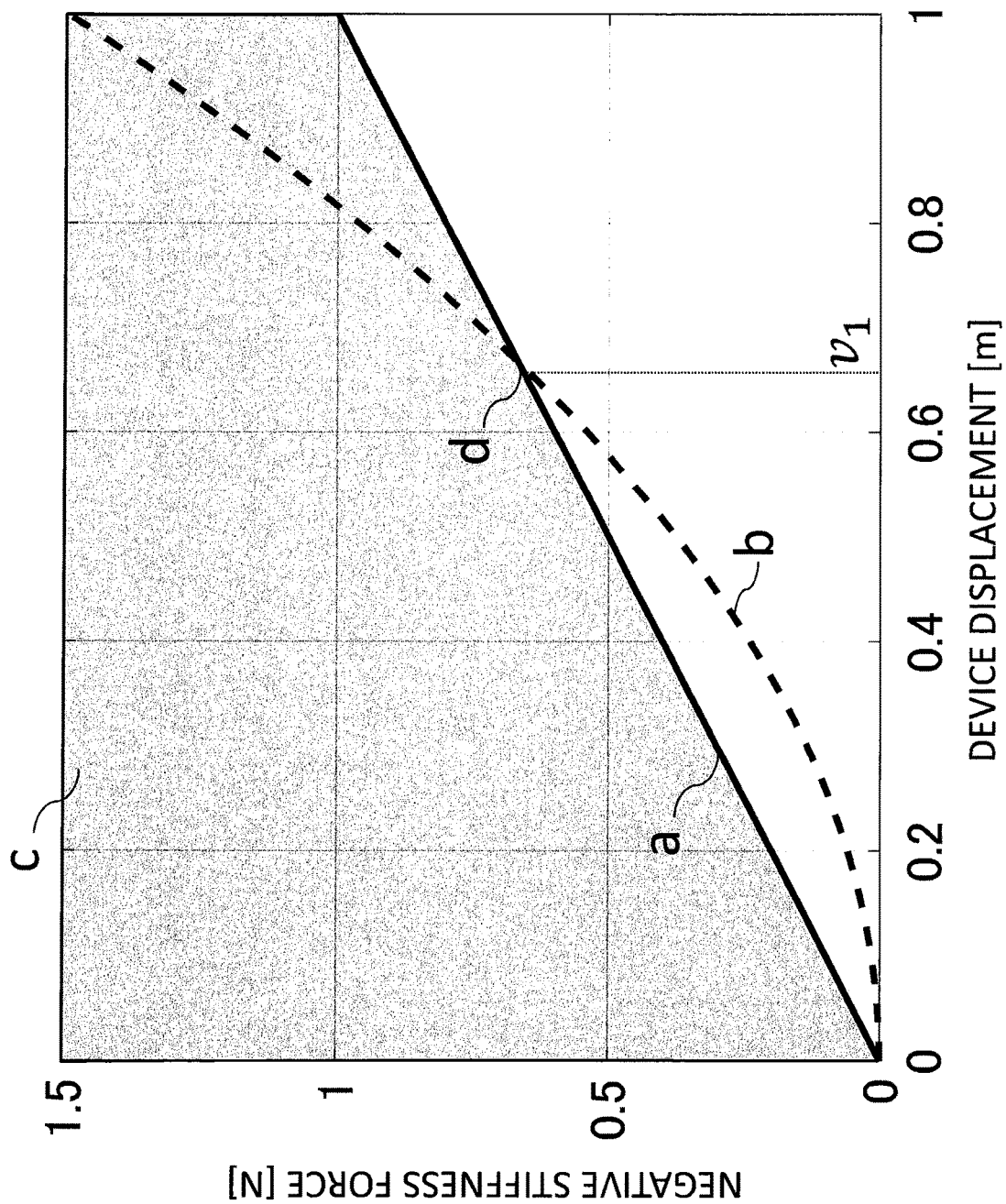
FIG. 5 is a graph illustrating an unstable phenomenon of the vibration damping device.

FIG. 5 is a graph illustrating an unstable phenomenon due to negative stiffness of the vibration damping device 100 of the present embodiment. In the figure, the ordinate axis indicates the negative stiffness force [N], and the abscissa axis indicates the displacement [m] of the negative stiffness portion 71. The solid line a and the dashed line b in the graph indicate the characteristics representing the relationship between the displacement and negative stiffness force, and the slope of each line corresponds to the negative stiffness value.

The displacement amplifier 7 exhibits a negative stiffness force with a constant slope as indicated by the solid line a, and should, when the structure 1 is displaced like the structure 1a, exert a force in the displacement direction that has an absolute value less than that of the restoring force generated in the direction to return to the structure 1 in the stand-still state. In FIG. 5, a region c indicated in gray is a region where the absolute value of a force generated by the displacement amplifier 7 based on negative stiffness is greater than that of the restoring force of the structure, and thus is an unstable region. In the unstable region c, vibration mode shaping by means of negative stiffness does not function effectively, and the vibration damping effect of the damper cannot be obtained.

To exert a force smaller than the force in the unstable region, it is necessary to set the negative stiffness value of the displacement amplifier 7 to a value smaller than the slope of the solid line a. However, when an inverted pendulum mechanism or a permanent magnet is used as a machine having negative stiffness characteristics, the generated negative stiffness force inevitably becomes a nonlinear force whose slope increases along with displacement in principle as indicated by the dotted line b. That is, provided that the intersection between the solid line a, which represents linear negative stiffness as the stability limit, and the dotted line b, which represents a nonlinear negative stiffness force of the actual negative stiffness portion 71, is indicated by an intersection d, when a displacement greater than the displacement v1 of the negative stiffness portion 71 at the intersection d occurs, the operation of the vibration damping device 100 having the displacement amplifier 7 with such negative stiffness characteristics becomes unstable.

Figure 6:
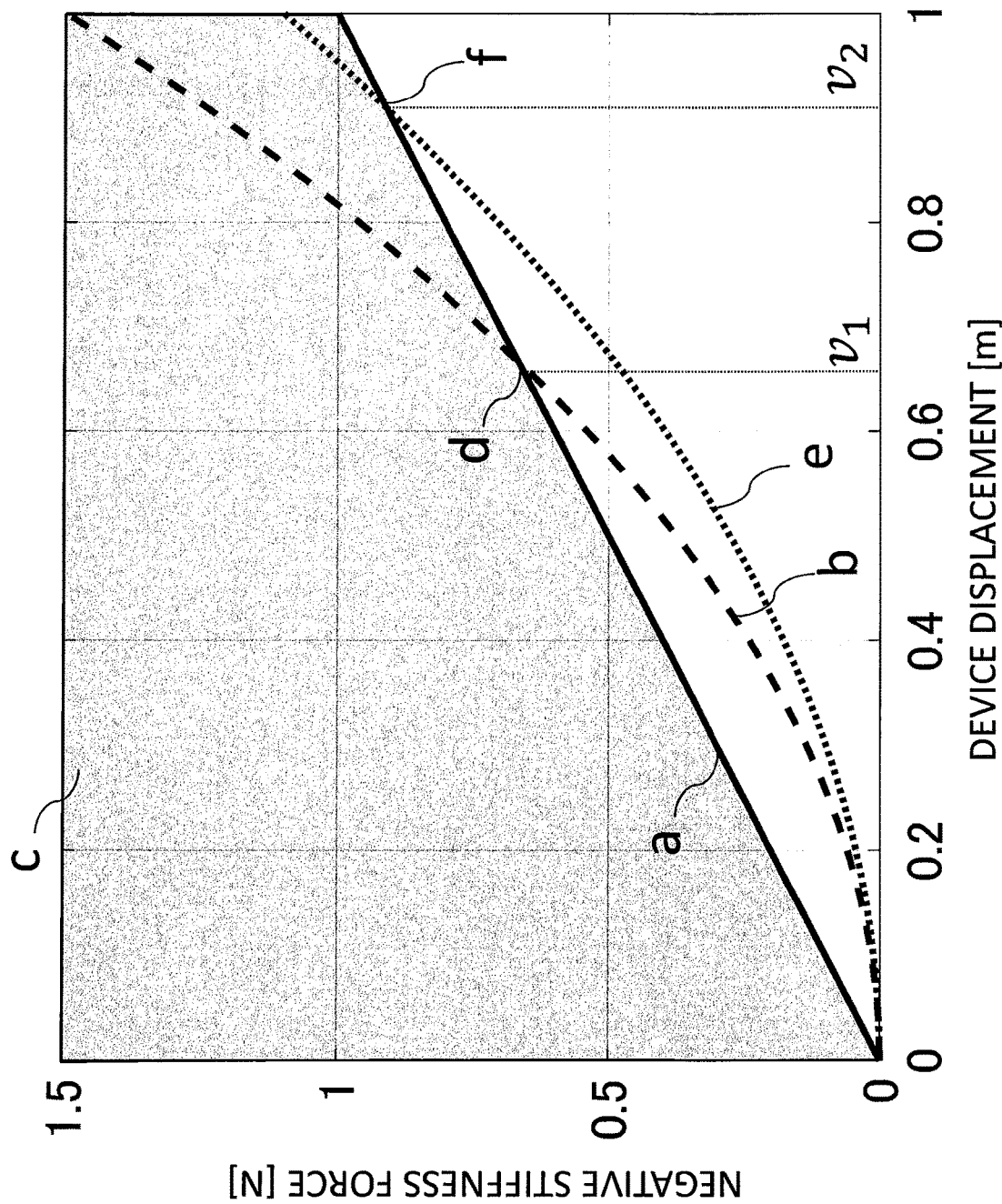
FIG. 6 is a graph illustrating the concept of preventing unstable operation of the vibration damping device.

FIG. 6 is a graph illustrating the concept of preventing unstable operation of the vibration damping device 100 due to the nonlinear stiffness characteristics of the negative stiffness portion 71, which is the displacement amplifier 7, against vibration of the structure 1 of the present embodiment. Usually, in order for the vibration damping device 100 to accommodate a larger vibration amplitude (i.e., excitation amplitude) of the structure 1, it is desired to expand the range of displacement of the displacement amplifier 7 in which the displacement amplifier 7 can function stably. In FIG. 6, the ordinate axis indicates the negative stiffness force, and the abscissa axis indicates the displacement of the negative stiffness portion 71 as in FIG. 5. The solid line a in the graph indicates the stability limit at which the absolute value of a force generated by the displacement amplifier 7 using negative stiffness is equal to that of the restoring force of the structure, and the dashed line b and the dotted line e indicate negative stiffness characteristic curves representing the relationship between the displacement and negative stiffness force of the negative stiffness portion 71.

As indicated by the dotted line e in FIG. 6, designing the negative stiffness portion 71 such that its negative stiffness force becomes weaker in comparison with the solid line a will allow the intersection d between the solid line a indicating the stability limit and the characteristic curve b of the negative stiffness portion 71 to move to the intersection f between the solid line a and the characteristic curve e of the negative stiffness portion 71. Then, the intersection between the solid line a indicating the stability limit and the characteristic curve of the negative stiffness portion 71 moves in the direction in which the displacement is greater. Thus, the stable operation range of the vibration damping device 100 can be expanded up to a greater displacement v2.

However, there is a problem in that the negative stiffness value (i.e., the slope of each of the dashed line and the dotted line in the graph) when the displacement is around zero is small, which makes it difficult to sufficiently increase the displacement of the structure 1 with the displacement amplifier 7. To solve such a problem, there is a need for a means capable of preventing unstable operation of the vibration damping device without decreasing the negative stiffness value when the displacement is around zero.

Figure 7A:
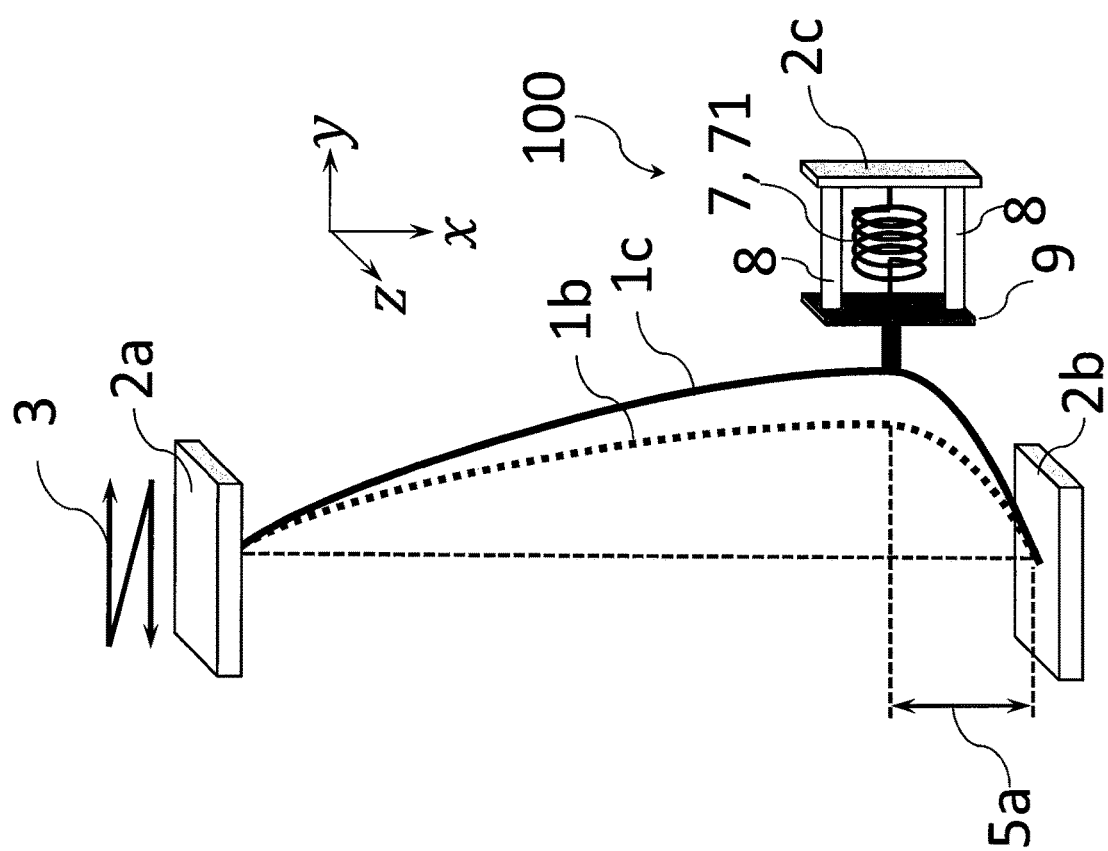
FIG. 7A is a view illustrating limiting members of the vibration damping device according to Embodiment 1.

FIG. 7 are views each illustrating the vibration damping device 100 including a displacement amplifier and limiting members for controlling the displacement amplification performed by the displacement amplifier according to the present embodiment. The limiting members are means for preventing unstable operation of the vibration damping device 100. In FIG. 7A, the negative stiffness portion 71, which is the displacement amplifier, is fixed at one end to the fixed plane 2c and is connected at the other end to a coupling portion 9 that is coupled to the structure 1. Herein, the coupling portion 9 is connected to the structure 1 so as to be capable of transmitting a force thereto. The coupling portion 9 may transmit a force to the structure 1 without contact. The limiting members 8 are bar-like members provided on the fixed plane 2c and protruding toward the structure 1 by a predetermined length. As the amplitude of the vibration force 3 increases, the amplitude of the structure 1 also increases, and when the amplitude of the structure 1 has increased than that in the state of the structure 1b, the structure 1 is further displaced by the displacement amplifier 7 so that the coupling portion 9 becomes further closer to the fixed plane 2c.

Figure 7B:
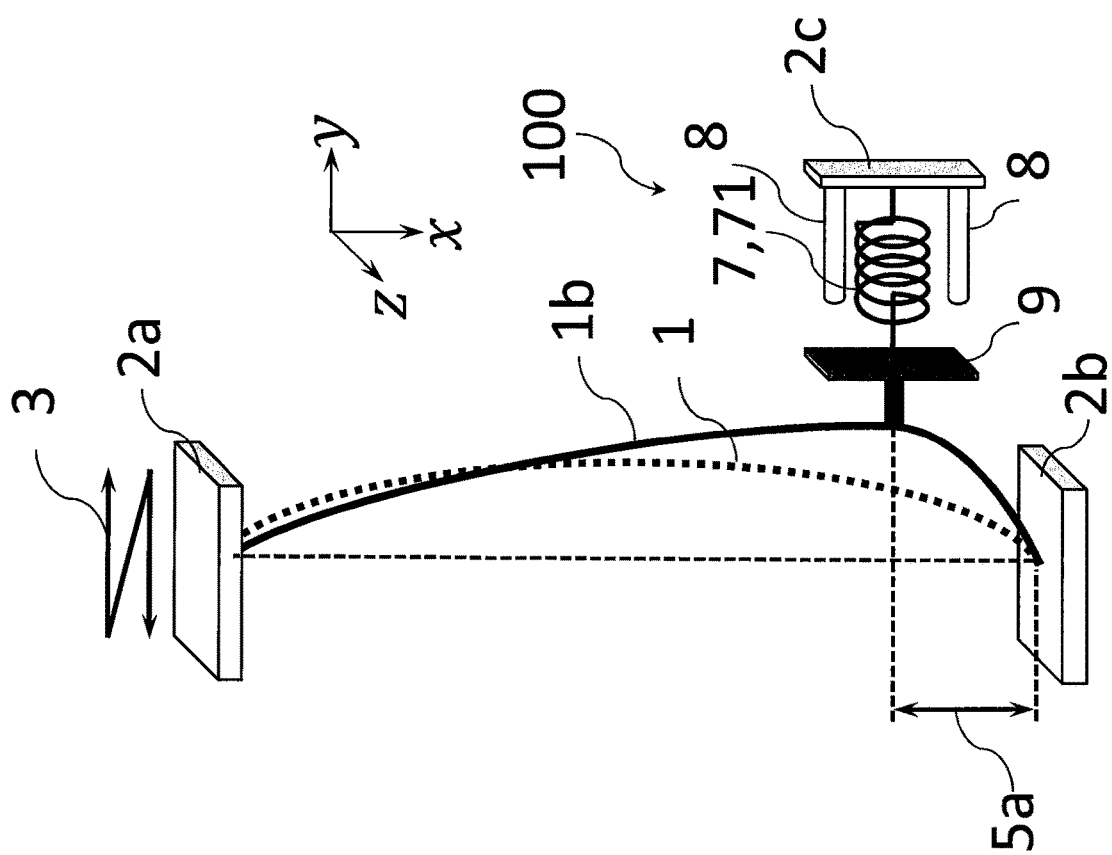
FIG. 7B is a view illustrating limiting members of the vibration damping device according to Embodiment 1.

Then, the structure 1 is displaced until the coupling portion 9 provided at the other end of the negative stiffness portion 71 collides with or comes into contact with the limiting members 8 provided on the fixed plane 2c. FIG. 7B illustrates a state in which the coupling portion 9 contacts the limiting members 8. The structure 1 is deformed (displaced) up to the state of a structure 1c illustrated in the figure. As for the structure 1c in the figure, the limiting members 8 provided on the fixed plane 2c collides with or comes into contact with the coupling portion 9 provided at the other end of the negative stiffness portion 71, thus the displacement amplification of the negative stiffness portion 71 becomes limited.

Herein, the predetermined length of each limiting member 8 is the length that allows the limiting member 8 and the coupling portion 9 to be in contact with each other in the state in which the displacement of the negative stiffness portion 71 does not exceed the displacement v1 at the intersection d between the stability limit line a, at which the absolute value of a force generated by the displacement amplifier 7 using negative stiffness is equal to that of the restoring force of the structure 1, and the negative stiffness characteristic curve b of the negative stiffness portion 71 in the graphs of FIGS. 5 and 6.

Setting the length of each limiting member 8 in the aforementioned manner allows the vibration damping device 100 to operate stably without the negative stiffness portion 71, which is the displacement amplifier 7, entering the unstable region c in FIGS. 5 and 6. In addition, providing the limiting members 8 can prevent unstable operation of the negative stiffness portion 71. Thus, it is not necessary to set the negative stiffness value of the negative stiffness portion 71, which is the displacement amplifier 7, low for a displacement of around zero. Therefore, both the vibration damping effect and stability of the negative stiffness portion 71 can be provided.

Further, the limiting members 8 can also control the displacement amplifier 7 such that a force generated by the displacement amplifier 7 does not exceed a force generated due to the equivalent stiffness in the displacement direction of the structure between the coupled position of the structure 1 and the fixed plane and the coupled position where the displacement amplifier 7 amplifies the displacement. A displacement of the structure 1 that occurs when a force generated by the displacement amplifier 7 exceeds a force generated due to the equivalent stiffness in the displacement direction of the structure between the coupled position of the structure 1 and the fixed plane and the coupled position where the displacement amplifier 7 amplifies the displacement is an example of a first displacement. Herein, the first displacement is the displacement of the structure 1 by which the structure 1 is not allowed to return to the equilibrium position of the vibration with the displacement amplifier 7. Accordingly, the limiting members 8 prevent unstable vibration of the structure 1.

Figure 8:
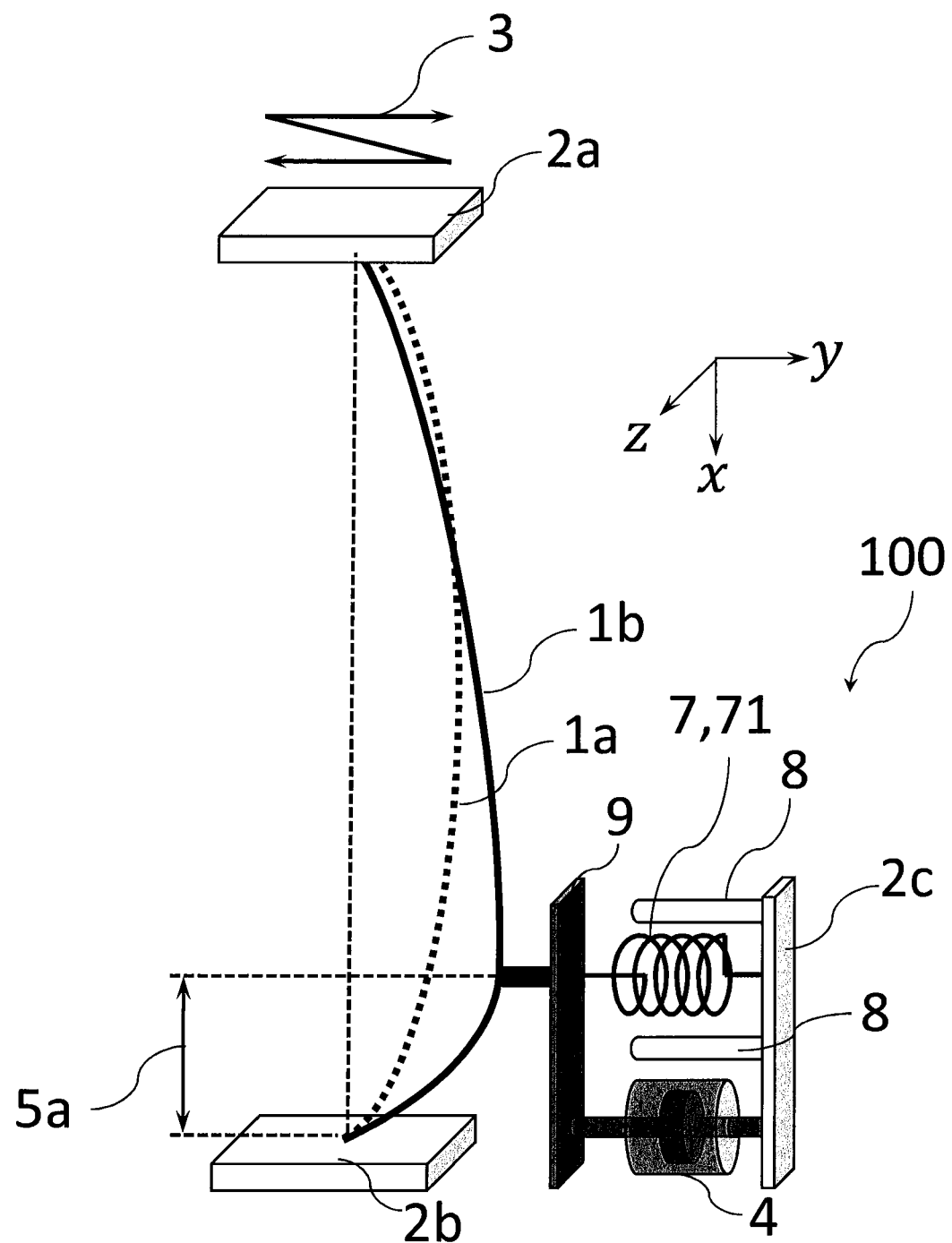
FIG. 8 is a view illustrating the vibration damping device with the damper according to Embodiment 1.

FIG. 8 is a view illustrating the configuration of the vibration damping device 100 provided with the negative stiffness portion 71 as the displacement amplifier 7 and a damper as a vibration damping means against vibration of the structure 1 of the present embodiment. In FIG. 8, the damper 4 is connected at one end to the coupling portion 9, which is provided so as to be coupled to the structure 1 at a position away from the fixed plane 2b by the distance 5a that is less than half the length of the structure 1, together with the negative stiffness portion 71, as in FIG. 7, and is connected at the other end to the fixed plane 2c together with the negative stiffness portion 71. Both the ends of the damper 4 are connected to the coupling portion 9 and the fixed plane 2c, respectively, so as to allow a vibration damping action to act between them.

It has been described with reference to FIG. 3A that when the damper 4 is provided on the fixed plane 2c near the fixed portion of the structure 1, the obtained vibration damping effect is small because the displacement of the structure 1 is small. However, even when the damper 4 is provided at a similar position (i.e., the coupling portion 9 or the fixed plane 2c), the displacement amplifier 7 illustrated in FIG. 7 can increase the displacement of the structure 1 at the position where the vibration damping device 100 including the damper 4 is disposed. Thus, the vibration damping effect of the damper 4 is maximized.

Although FIG. 8 illustrates an example in which the damper 4 is connected to the coupling portion 9, which is coupled to the structure 1, together with the displacement amplifier, the damper 4 may be connected to the structure 1 at a position adjacent the structure 1, separately from and in parallel with the displacement amplifier 7 (i.e., the negative stiffness portion 71). This is because as long as the damper 4 is located near the position where the displacement amplifier is connected to the structure 1, the effect of increasing the displacement of the structure 1 is obtained, and the vibration damping effect of the damper 4 improves. Further, when the displacement amplifier and the damper 4 are separately connected to the structure 1, the effect of preventing the structure of the vibration damping device 100, such as the coupling portion 9, from becoming complex is also expected.

Figure 9A:
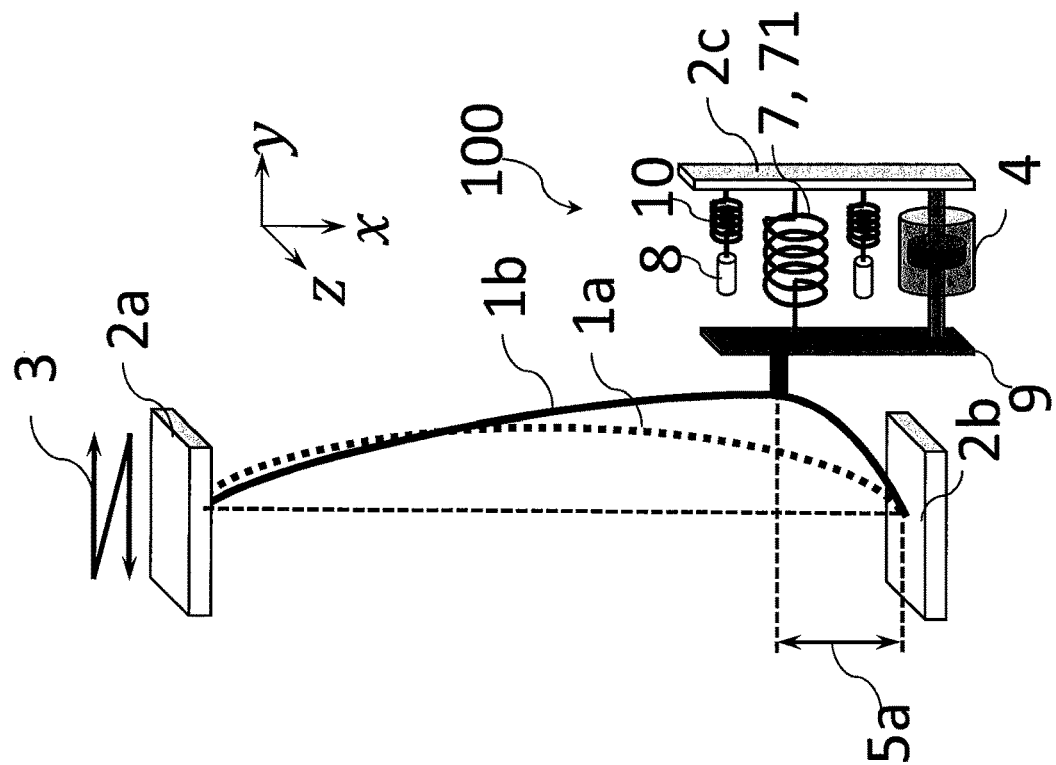
FIG. 9A is a view illustrating the configuration and the effect of the vibration damping device according to Embodiment 1.
Figure 9B:
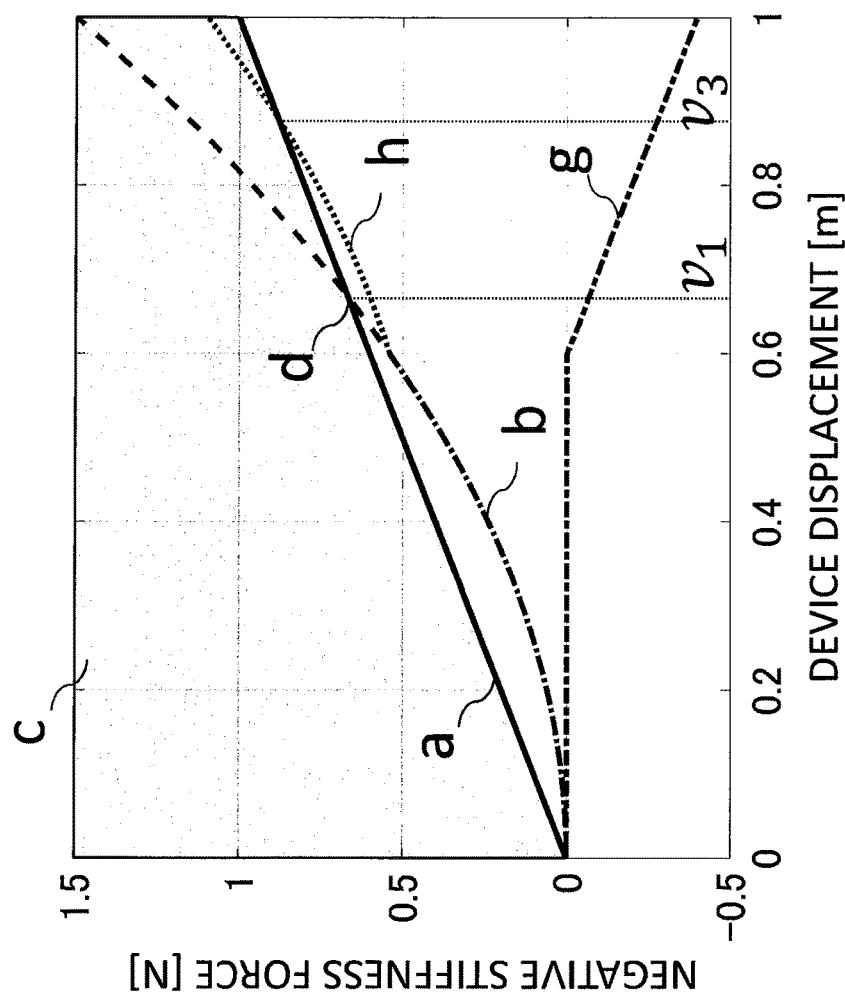
FIG. 9B is a view illustrating the configuration and the effect of the vibration damping device according to Embodiment 1.

FIG. 9 are views illustrating an example of other limiting members according to the present embodiment. FIG. 9A is a conceptual view illustrating the configuration of the vibration damping device 100 including other limiting members. FIG. 9B is a graph illustrating the effect of the configuration of FIG. 9A.

In FIG. 9A, the configuration of the vibration damping device 100 including the fixed plane 2c, the negative stiffness portion 71, the coupling portion 9, and the damper 4 is the same as that in FIG. 8, but the configuration of each limiting member 8 is different. In FIG. 9A, each limiting member 8 is the same as that illustrated in FIG. 8 in having a predetermined length, but is different in having a positive stiffness portion 10 with positive stiffness. Upon receiving displacement, the positive stiffness portion 10 generates a repulsive force in the direction opposite to the displacement. With the positive stiffness portion 10 provided, each limiting member 8 is displaced in the direction in which its length becomes shorter when the coupling portion 9 collides with the limiting member 8, and thus provides a reaction force to the coupling portion 9 and eventually the structure 1.

In FIG. 8, the length of each limiting member 8 does not change. Therefore, when the coupling portion 9 collides with each limiting member 8, neither the negative stiffness portion 71 nor the structure 1 is allowed to be displaced. In contrast, in the configuration of FIG. 9A, each limiting member 8 is displaced in the direction in which the limiting member 8 contracts after the coupling portion 9 has collided with the limiting member, so that the negative stiffness portion 71 continues to be displaced. However, when each limiting member 8 contracts, the positive stiffness portion 10 exerts a reaction force. The direction of the reaction force exerted by the positive stiffness portion 10 is opposite to the direction of the negative stiffness force exerted by the negative stiffness portion 71, and thus can weaken the negative stiffness force of the negative stiffness portion 71 that has become excessively large.

In the configuration of FIG. 8, the negative stiffness portion 71 is configured such that it is not displaced more than or equal to a displacement to a position immediately before the safety boundary so that the negative stiffness portion 71 will not enter the unstable region. In contrast, in the configuration of FIG. 9A, the negative stiffness portion 71 is greatly displaced more than the displacement v1 at the safety boundary in the example of FIG. 8, but an offset force is generated to prevent an excessively large negative stiffness force. This can increase the range of displacement within the safety region of the negative stiffness portion 71, which is the displacement amplifier.

FIG. 9B is a graph illustrating the effect of the configuration of FIG. 9A. In the figure, the ordinate axis indicates the negative stiffness force, and the abscissa axis indicates the displacement of the negative stiffness portion 71 as in FIG. 5. The solid line a in the graph indicates the stability limit at which the absolute value of a force generated by the displacement amplifier 7 using negative stiffness is equal to that of the restoring force of the structure, and the dashed line b indicates a negative stiffness characteristic curve representing the relationship between the displacement and negative stiffness force of the negative stiffness portion 71. The alternate long and short dash line g indicates a force generated by the positive stiffness portion 10 attached to each limiting member 8, which is a restoring force exerted so that the displacement returns to the zero position. In this graph, the negative stiffness force corresponds to the positive direction of the ordinate axis. Thus, the value of a force generated by the positive stiffness portion 10 has a negative value.

In FIG. 9B, the coupling portion 9 is configured to come into contact with the limiting members 8 when the coupling portion 9 (or the negative stiffness portion 71) has been displaced by 0.6 [m]. The resultant force of the limiting members 8 and the negative stiffness portion 71 is the force allowed to act on the structure 1b by the displacement amplifier 7, and is represented by the dotted line h in FIG. 9B. The resultant force of the limiting members 8 and the negative stiffness portion 71 has characteristics of the curve b until the coupling portion 9 comes into contact with the limiting members 8, and has the characteristics of the curve h after it has contacted the limiting members 8.

When the device displacement is smaller than the displacement v3 at the intersection between the safety limit curve a and the resultant force curve h of the limiting members 8 and the negative stiffness portion 71, the resultant force of the limiting members 8 and the negative stiffness portion 71 is less than or equal to the safety limit curve a. Accordingly, the stable region of the vibration damping device 100 can be expanded from v1 to v3, which corresponds to a displacement at the intersection between the safety limit curve a and the resultant force curve h, without the negative stiffness value decreased at a device displacement of around zero.

Figure 10B:
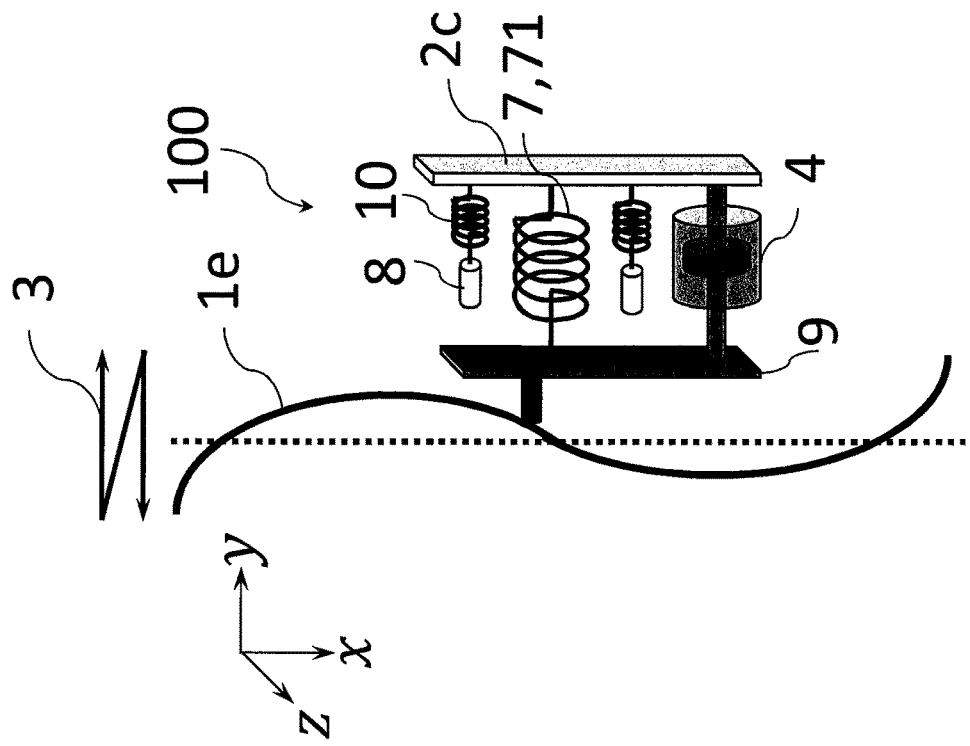
FIG. 10B is a view illustrating an example in which the vibration damping device according to Embodiment 1 is applied to the structure having no fixed plane at either end thereof.
Figure 10A:
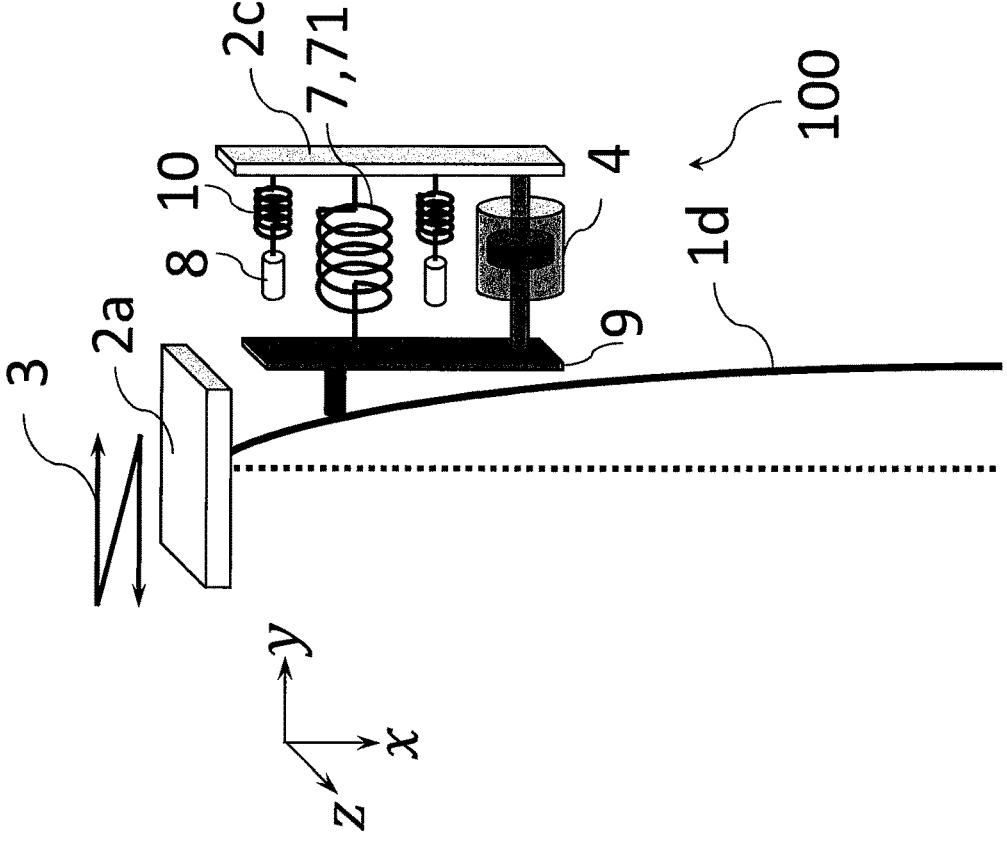
FIG. 10A is a view illustrating an example in which the vibration damping device according to Embodiment 1 is applied to the structure having no fixed plane at either end thereof.

FIG. 10 are views in which the vibration damping device 100 of the present embodiment is applied to a structure having no fixed plane at either end thereof. FIG. 10A illustrates an example in which the vibration damping device 100 is applied to a structure 1d that is connected at one end to the fixed plane 2a and is free at the other end. In the figure, the structure 1d to which the vibration damping device 100 is applied has a smaller amplitude at a position closer to the fixed plane 2a, but the vibration damping device 100 can be more easily provided at a position close to the fixed plane 2a. Herein, the fixed plane 2c is provided at a position close to the fixed plane 2a, and the aforementioned vibration damping device 100 is provided between the fixed plane 2c and the structure 1d. Even when the vibration damping device 100 is provided at a position where a displacement of the structure 1d is small, the displacement is increased by the negative stiffness portion 71 and the vibration mode is changed, and also, the limiting members 8 prevent excessive amplification of the displacement. Thus, a stable damping effect can be provided.

As illustrated in the figure, the damper 4 may also be provided on the coupling portion 9, which is coupled to the structure 1d, together with the negative stiffness portion 71. Such a configuration can increase the vibration damping effect of the damper 4. Further, each limiting member 8 may be configured to include the positive stiffness portion 10 to expand the range of displacement in the stable region. Although the figure illustrates a configuration in which the fixed plane 2a is provided in a vertically upward position and the structure 1d hangs therefrom, it is also possible to provide a configuration in which the fixed plane is provided in a vertically downward position and the structure 1d is provided thereon in an upright position.

FIG. 10B illustrates an example in which the vibration damping device 100 is applied to a structure 1e whose both ends are free. In this example, the center of the structure 1e is fixed. The vibration damping device 100 is arranged at a position close to the fixed portion of the structure 1e. A displacement of the structure 1e in FIG. 10B is small at its center portion. Therefore, providing the damper 4 at the center portion would not be very effective. However, even when the damper 4 is provided at a similar position (i.e., the coupling portion 9 or the fixed plane 2c), the displacement amplifier 7 can increase the displacement of the structure 1 at the position where the vibration damping device 100 including the damper 4 is disposed. Thus, the vibration damping effect of the damper 4 is maximized.

In the figure, the aforementioned vibration damping device 100 is provided between the fixed plane 2c and the structure 1e. Even when the vibration damping device 100 is provided at a position where a displacement of the structure 1e is small, the displacement is increased by the negative stiffness portion 71 and the vibration mode is changed, and also, the limiting members 8 prevent excessive amplification of the displacement. Thus, a stable damping effect can be provided.

As in FIG. 10A, the damper 4 may be provided on the coupling portion 9, which is coupled to the structure 1e, together with the negative stiffness portion 71. Further, even when each limiting member 8 is configured to include the positive stiffness portion 10, the same effect as that described above can be obtained.

Figure 11B:
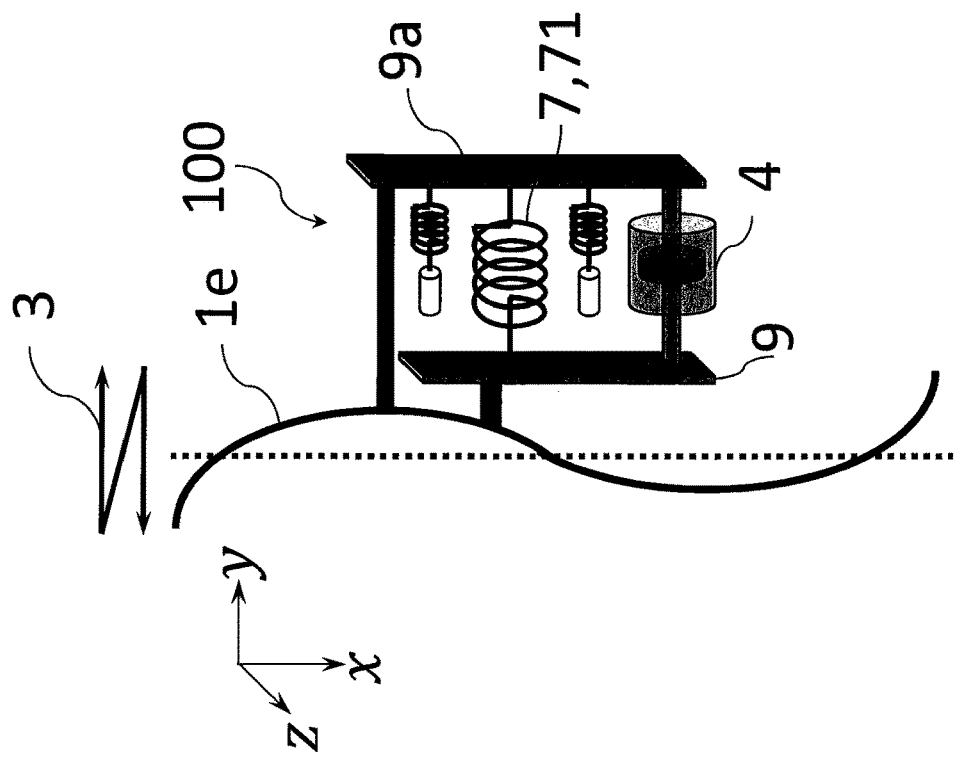
FIG. 11B is a view illustrating an example in which the vibration damping device according to Embodiment 1 is not connected to anything other than the structure, and both ends of the vibration damping device are coupled to the structure.
Figure 11A:
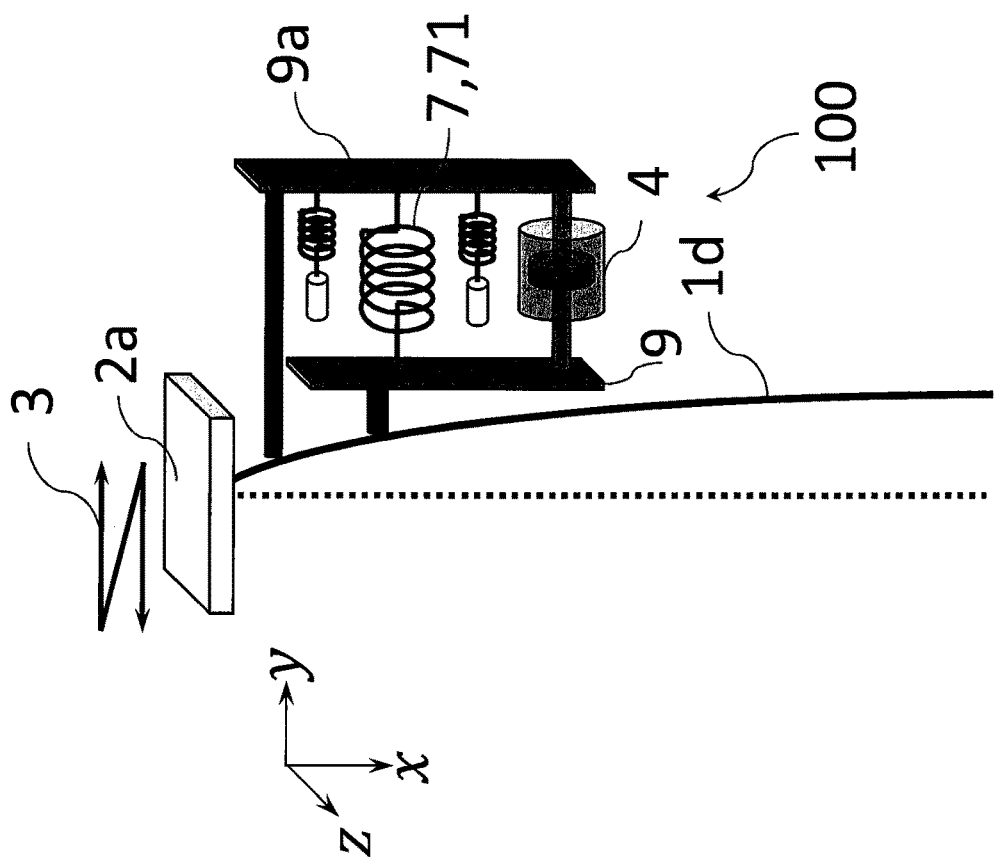
FIG. 11A is a view illustrating an example in which the vibration damping device according to Embodiment 1 is not connected to anything other than the structure, and both ends of the vibration damping device are coupled to the structure.

FIG. 11 are views each illustrating an example in which the vibration damping device 100 according to the present embodiment is not connected to anything other than the structure. That is, the structure in FIG. 11 does not have the fixed plane 2c, but instead, the vibration damping device 100 has a coupling portion 9a that is coupled to the structure 1d at a second position away from a first position at which the coupling portion 9 is coupled to the structure 1d. In addition, the negative stiffness portion 71, which is a displacement amplifier, is provided between the first coupling portion 9 coupled to the structure 1d at the first position and the second coupling portion 9a coupled to the structure 1d at the second position.

The vibration damping device 100 is configured such that the coupled positions (i.e., the first position and the second position) of the first coupling portion 9 and the second coupling portion 9a are away from each other. Thus, when the structure 1 vibrates and deforms into a wave shape, a displacement of the first coupling portion 9 in the direction perpendicular to the longitudinal direction of the structure 1d differs from that of the second coupling portion 9a. Such a difference in displacement is increased by the negative stiffness portion 71, which is the displacement amplifier, and the vibration mode of the structure 1d is changed. Thus, the damping effect of the damper 4 can be increased.

In addition, in FIG. 11, each limiting member 8 is provided at the first coupling portion 9 or the second coupling portion, and prevents the negative stiffness portion 71 from being displaced by a degree greater than or equal to a predetermined displacement, or each positive stiffness portion 10 exerts a force in the direction opposite to a negative stiffness force exerted by the negative stiffness portion 71, thereby preventing the negative stiffness force from becoming excessively large.

In the vibration damping device 100, the coupled position of the structure 1 and the displacement amplifier 7 (or the coupling portion 9) may be arranged at a position closer to the node than to the antinode of the vibration of the structure 1. Herein, the distance between the coupled position and the node of the vibration of the structure 1 is shorter than the distance between the coupled position and the antinode of the vibration of the structure 1. In addition, the distance between the coupled position and the node of the vibration of the structure 1 is greater than zero. Providing the coupled position at a position closer to the node than to the antinode of the vibration of the structure (when it vibrates at its natural frequency) can change the vibration mode more easily, which can increase the vibration damping effect. This is because rather than providing the displacement amplifier 7 at a position closer to the antinode of the vibration to further increase the displacement, providing the displacement amplifier 7 at a position closer to the node of the vibration at which the displacement is small will allow another antinode of the vibration to be generated and thus will change the vibration mode to a different vibration mode. Then, the frequency of the new vibration mode (after the change) typically becomes low, and it is thus expected that the frequency be away from the previous natural frequency (before the change) and the amplitude be small. By changing the natural frequency in this manner, the vibration damping device 100 is expected to avoid resonance of the structure 1 even when a configuration without the damper is employed.

According to the present embodiment, the vibration damping device 100 includes the displacement amplifier 7 that is arranged along any position in the longitudinal direction of the structure and that amplifies a displacement of the structure, and the limiting members 8 that control the displacement amplification performed by the displacement amplifier 7 such that the displacement of the structure amplified by the displacement amplifier 7 will not become greater than a preset displacement. Herein, the preset displacement is the first displacement of the structure 1 by which the structure 1 is not allowed to return to the equilibrium position of the vibration. Accordingly, the vibration damping device 100 can stably increase a displacement due to vibration of the structure at the position where the displacement amplifier 7 is provided, and can thus increase the vibration damping effect.

The displacement amplifier 7 may be arranged at a position closer to the node than to the antinode of the vibration of the structure. Herein, the distance between the position of the displacement amplifier 7 and the node of the vibration of the structure 1 is shorter than the distance between the coupled position and the antinode of the vibration of the structure 1. Further, the distance between the position of the displacement amplifier 7 and the node of the vibration of the structure 1 is greater than zero. Then, it follows that the displacement amplifier 7 is arranged at a position closer to the node than to the antinode of the waveform of the vibration of the structure in the natural vibration mode. Thus, the waveform of the vibration of the structure, and hence the vibration mode can be changed.

The displacement amplifier 7 is configured with a simple structure of a negative stiffness member, such as a permanent magnet or an inverted pendulum. Therefore, vibration can be controlled without a power supply and without requiring a reduction in weight, improvement in durability, or control.

Each limiting member is configured with an elastic body having positive stiffness. Therefore, when a displacement of the structure has reached a preset displacement, the elastic body is displaced in the direction in which it becomes shorter, thereby applying a force to the structure in the direction opposite to the displacement of the structure. Then, since the direction of the force exerted by the elastic body is opposite to the direction of a negative stiffness force exerted by the displacement amplifier 7, the elastic body can suppress an excessive negative stiffness force of the displacement amplifier 7 and thus can avoid unstable operation thereof.

In addition, each limiting member is configured to control the displacement amplifier 7 such that a force generated by the displacement amplifier 7 does not exceed a force generated due to the equivalent stiffness in the displacement direction of the structure between the fixed position of the structure and the coupled position where the displacement amplifier amplifies the displacement. Therefore, the displacement amplifier 7 can be prevented from becoming unstable while exerting a vibration damping effect.

The preset first displacement for each limiting member is a displacement at which a force exerted by the displacement amplifier 7 exceeds a force generated due to the equivalent stiffness in the displacement direction of the structure between the fixed position of the structure and the coupled position where the displacement amplifier 7 amplifies the displacement. Therefore, the displacement amplifier 7 can be prevented from becoming unstable while exerting a vibration damping effect.

The displacement amplifier 7 is configured to apply the components of a force in the vibration (displacement) direction of the structure and thus in the displacement direction thereof. Therefore, the displacement amplifier 7 can exhibit a vibration damping effect.

The vibration damping device 100 also includes a vibration damper that reduces vibration of the structure. Therefore, vibration energy can be efficiently dissipated by the displacement amplifier 7 and the limiting members, and thus a high vibration damping effect can be obtained.

Examples of a structure that is fixed at both ends to fixed planes as illustrated in FIG. 1 include an elevator rope, a timing belt, a main cable of a suspension bridge, and a wire of an electric discharge machine. In addition, examples of a structure that is fixed at one end to a fixed plane and is free at the other end as illustrated in FIG. 10A include a wire rope of a crane and an antenna. Further, examples of a structure that is free at both ends as illustrated in FIG. 10B include a structure having no fixed planes, such as a tethered satellite. Applying the configuration of the present embodiment to any of such examples can stably increase the vibration damping effect.

Embodiment 1 has described control of transverse vibration that is perpendicular to the longitudinal direction of a structure. However, it is also possible to apply the configuration of the present embodiment to control of longitudinal vibration that is parallel with the longitudinal direction of a structure by changing the direction of the displacement amplifier 7 and the vibration damping effect as with the case of controlling transverse vibration so that the vibration damping effect can be stably increased.

Embodiment 2

The present embodiment will describe an embodiment in which a vibration control target of the vibration damping device 100 is an elevator rope, and the concept of the vibration damping device of Embodiment 1 is applied thereto.

Figure 12:
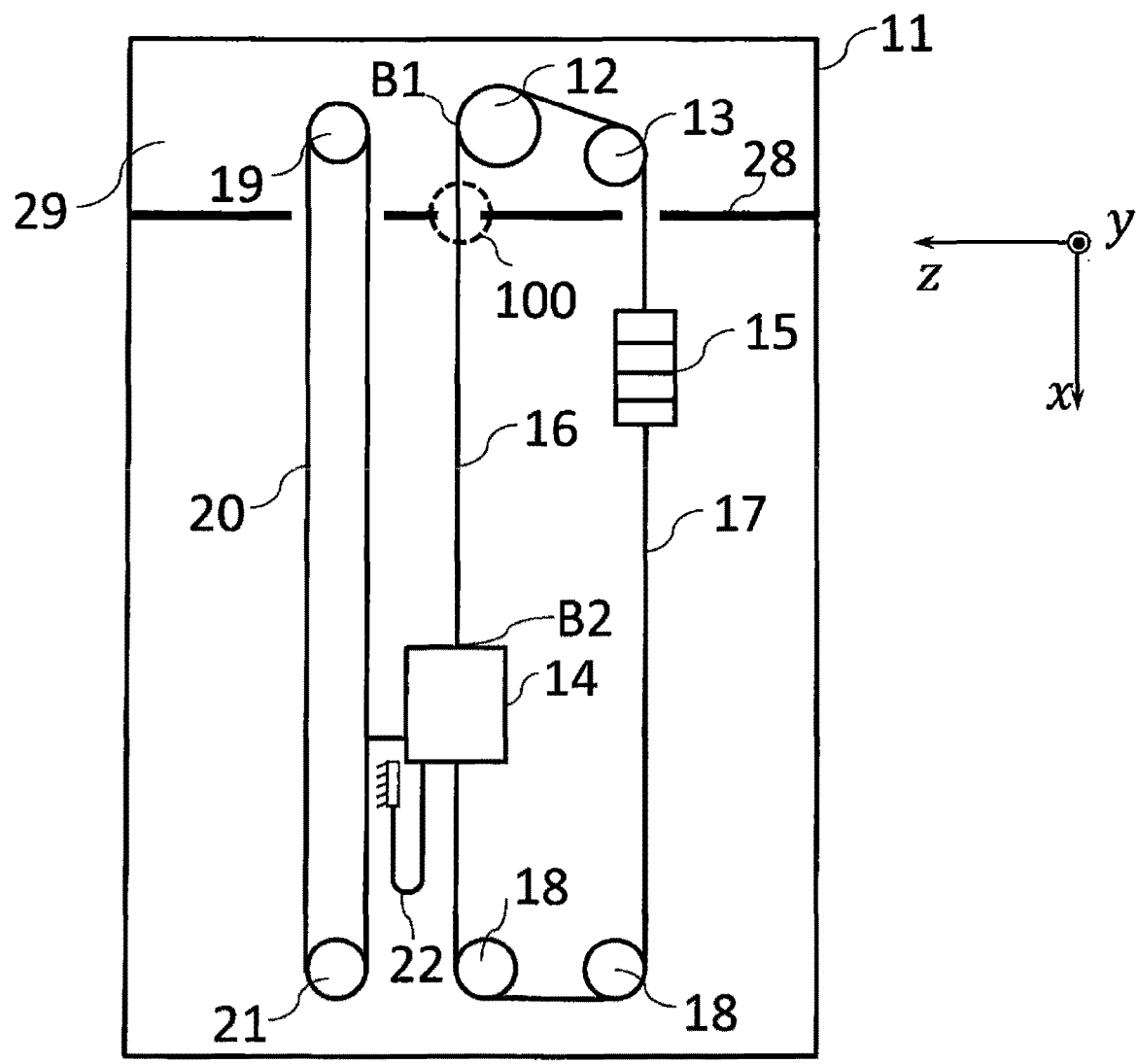
FIG. 12 is a view illustrating the elevator apparatus according to Embodiment 2.

FIG. 12 is a schematic view illustrating the configuration of an elevator apparatus according to the present embodiment. FIG. 12 illustrates the x-axis, y-axis, and z-axis of the 3-axis orthogonal coordinate system. In FIG. 12, the vertically downward direction is the positive direction of the x-axis. FIG. 12 schematically illustrates the elevator apparatus in a state where there is no building sway and thus no vibration is generated. Hereinafter, the building will not be described in detail, but portions related to the elevator apparatus will be mainly described. In addition, the support portion for each part, a control unit, and the like are omitted.

In FIG. 12, a machine room 29 is provided in the upper portion of an elevator apparatus 11, and a traction machine 12, a deflector sheave 13, and a governor 19 are provided in the machine room 29. A car 14 for carrying passengers is connected to one end of a main rope 16, and the other end of the main rope 16 is connected to a counterweight 15 via the traction machine 12 and the deflector sheave 13.

Upon rotation of the traction machine 12, the car 14 connected to the main rope 16 is raised or lowered in the vertical direction (i.e., x-axis direction in FIG. 12) due to a frictional force between a sheave provided on the shaft of the traction machine 12 and the main rope 16. As the counterweight 15 is connected to the other end of the main rope 16 on the side opposite to the one end thereof connected to the car 14, the dead load of the car 14 is offset and the driving force of the traction machine 12 is reduced.

As the car 14 is raised or lowered, the length of the main rope 16 on the side of the car 14 and that on the side of the counterweight 15 across the traction machine 12 will change. Then, since the main rope 16 also has its dead load per unit length, the mass of the traction machine 12 on the side of the car 14 and that on the side of the counterweight 15 become unbalanced. To compensate for such unbalanced mass, a compensating rope 17, which is connected at one end to the bottom side of the car 14 and is connected at the other end to the counterweight 15, is provided via compensating sheaves 18.

Further, to identify the raised or lowered position of the car 14 in the vertical direction (i.e., x-axis direction), a governor rope 20 coupled to the car 14, the governor 19 on which the governor rope 20 is wound, and a governor tension sheave 21 located on the side opposite to the governor 19 are provided so that they move as the car 14 is raised or lowered. The governor rope 20 is rigidly coupled to the car 14 and moves as the car 14 is raised or lowered. Thus, the moving quantity of the governor rope 20 is measured by an encoder provided on the governor 19. In addition, the car 14 is provided with a traveling cable 22 for transmitting power and information signals. Herein, the structure 1 that is a vibration control target of Embodiment 2 is an elevator rope. The elevator rope is a cord-like structure of the elevator apparatus 11. Examples of the elevator rope include the main rope 16, the compensating rope 17, the governor rope 20, and the traveling cable 22. The elevator rope includes a wire rope and a belt rope. The elevator rope is made of a ferromagnetic material, for example. Alternatively, the elevator rope may have a ferromagnetic material on its surface so as to have a ferromagnetic property, for example.

Figure 13:
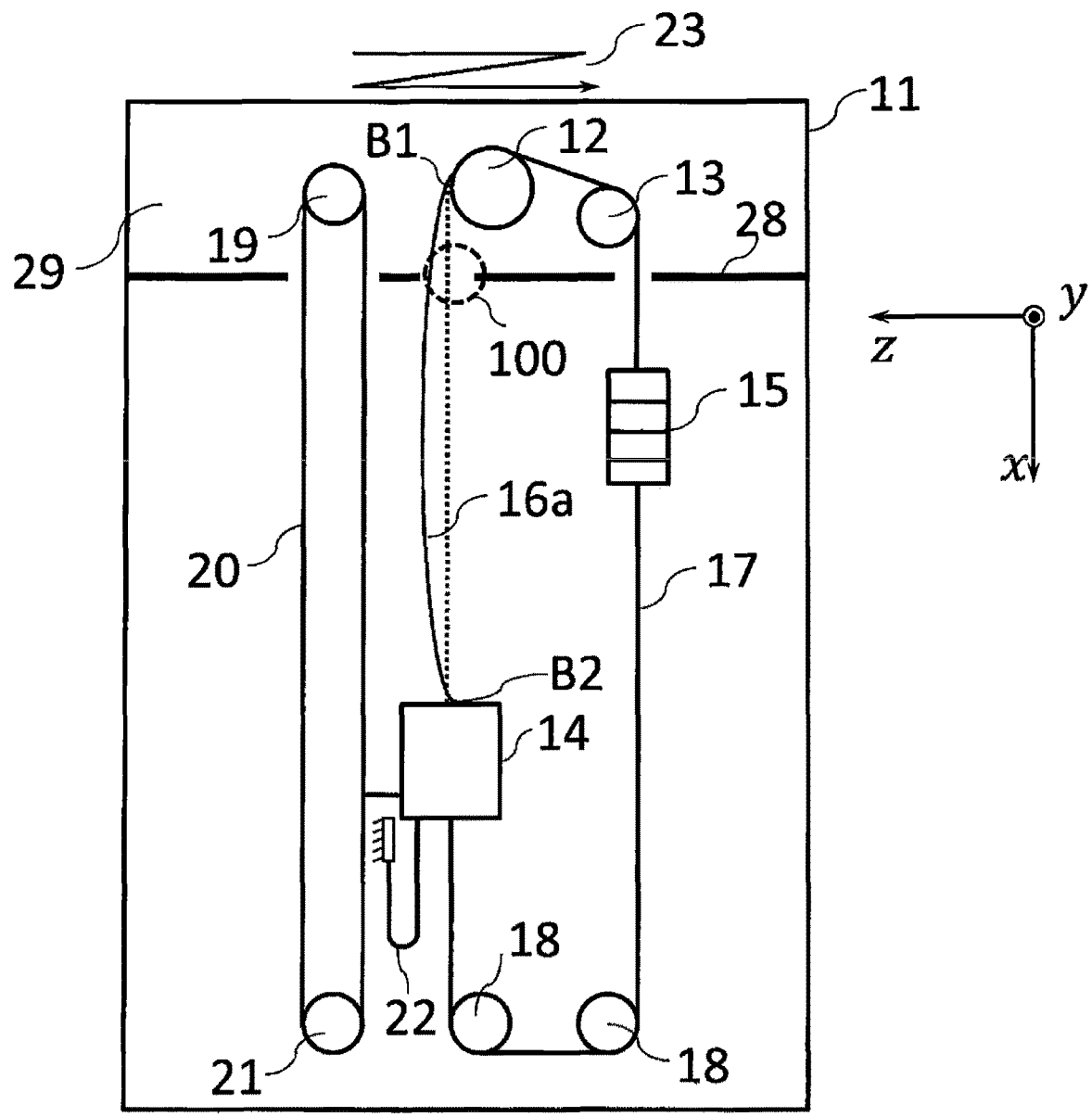
FIG. 13 is a view illustrating the time when the elevator apparatus according to Embodiment 2 is vibrated.

FIG. 13 is a view illustrating the time when building sway 23 occurs in the elevator apparatus illustrated in FIG. 12 due to turbulence, such as earthquakes or winds, for example. When the building sway 23 occurs, the traction machine 12 and the governor 19 fixed to the building also sway in a similar manner, so that the main rope 16, the compensating rope 17, the governor rope 20, and the traveling cable 22, which are the ropes (i.e., elevator ropes) of the elevator apparatus, are vibrated. At this time, if the vibration frequency of the building sway 23 coincides with the natural frequency of any of the elevator ropes, a resonance phenomenon occurs, which amplifies the sway. FIG. 13 exemplarily illustrates a state where the natural frequency of the main rope 16a coincides with the vibration frequency of the building sway, and thus a resonance phenomenon occurs on the main rope 16.

Figure 14:
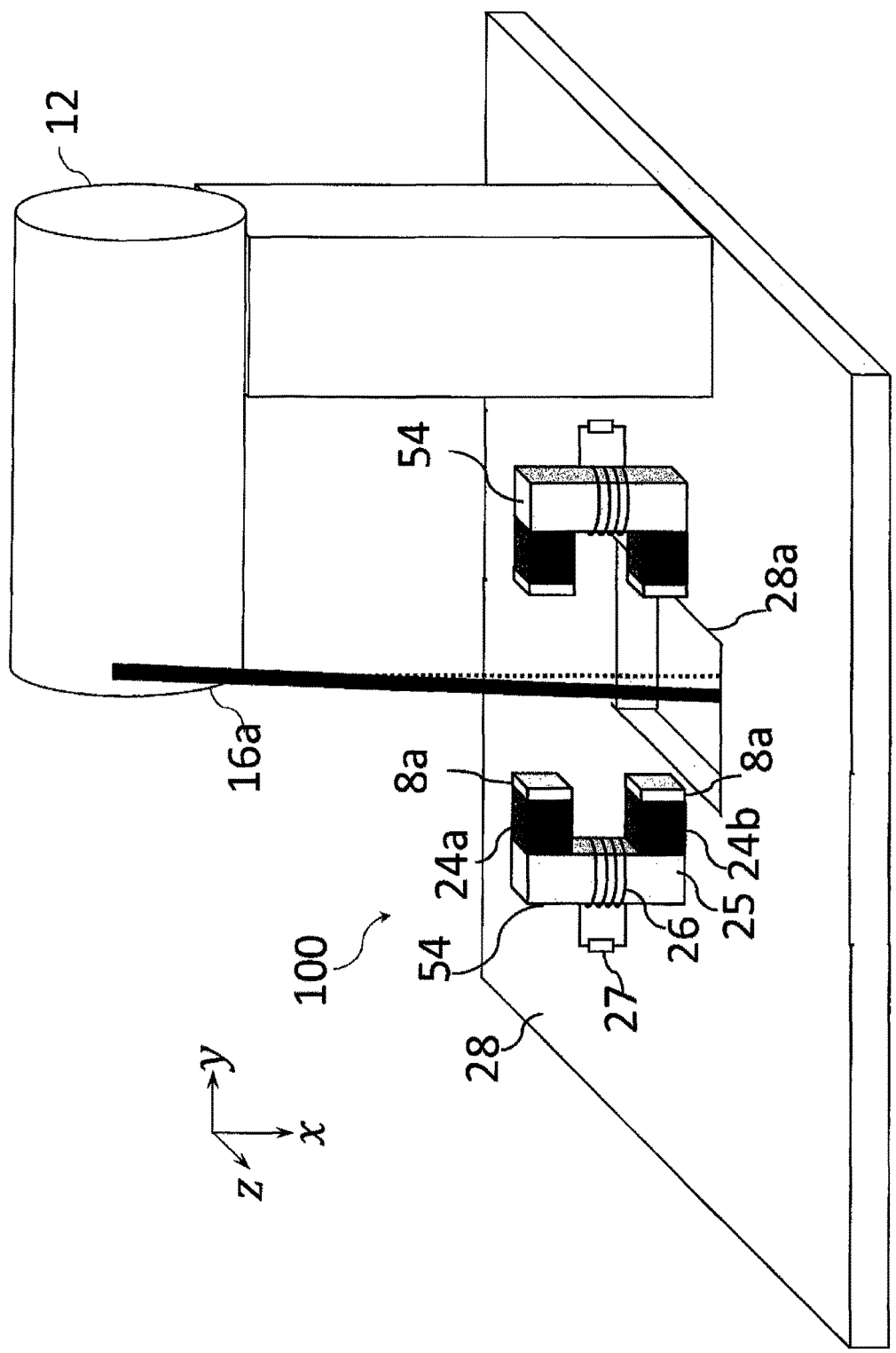
FIG. 14 is a view illustrating the vibration damping device of the elevator apparatus according to Embodiment 2.

FIG. 14 is a view illustrating an example of the vibration damping device 100 that controls vibration of the main rope 16 of the elevator apparatus according to the present embodiment. The range of the main rope whose vibration is controlled by the vibration damping device 100 is between an end B1 of the main rope close to the traction machine and a coupled portion B2 of the car and the main rope. Hereinafter, the distance between the end B1 of the rope and the coupled portion B2 of the car and the main rope shall be referred to as the length of the main rope unless otherwise stated. FIG. 14 illustrates an example in which the vibration damping device 100 for the elevator apparatus is disposed on a machine room floor 28, and the displacement amplifier 7 includes permanent magnets. The machine room floor 28 has a rope duct 28a. The rope duct 28a is an opening leading to the hoistway from the machine room 29. The main rope 16a is passed through the rope duct 28a.

Although FIG. 14 illustrates an example in which the vibration damping device 100 for the elevator apparatus is disposed on the machine room floor 28, this is only exemplary and the position of the vibration damping device 100 is not limited thereto. The vibration damping device 100 may be disposed at any position within the range of the end B1 to the coupled portion B2 of the rope in a state where the car 14 is stopped at the top floor.

In the present embodiment, the displacement amplifier 7 is a passive device. In this example, the negative stiffness portion 71 as the displacement amplifier 7 of the vibration damping device 100 of Embodiment 2 includes a pair of magnet units 54. Each of the pair of magnet units 54 includes permanent magnets 24 (24a and 24b) and a yoke 25. The permanent magnets 24 (24a and 24b) are provided so as to face each other at symmetrical positions across the main rope 16 (indicated by the dotted line in the figure). The yoke 25 is arranged along a direction parallel with the main rope 16. The magnetic poles of the permanent magnet 24a are directed toward the upper end of the yoke 25 from the direction of the main rope 16. The magnetic poles of the permanent magnet 24b are opposite to those of the permanent magnet 24a and are directed toward the lower end of the yoke 25 from the direction of the main rope 16. The magnetic poles of the magnet unit 54 are, for example, the magnetic poles of the permanent magnets 24 that do not face the yoke 25. The pair of magnet units are arranged with their same magnetic poles facing each other. The negative stiffness portion 71, which is the displacement amplifier 7 of Embodiment 2, includes the permanent magnets 24a and 24b. The limiting members include limiting members 8a formed of a non-magnetic material. An attraction force acting on the main rope 16 due to the magnetic forces of the permanent magnets 24 (24a and 24b) increases in inverse proportion to the distance between the permanent magnets 24 (24a and 24b) and the main rope 16a. When the main rope 16a is displaced from the stand-still state, a force attracted in the displacement direction acts on the main rope 16a utilizing the aforementioned property, which further increases the displacement of the main rope 16a. In this manner, the permanent magnets 24 generate a negative stiffness force and thus exhibit the function of the displacement amplifier.

The pair of magnet units 54 may be provided at different heights across the main rope 16.

The negative stiffness portion 71 as the displacement amplifier 7 of the vibration damping device 100 of Embodiment 2 may include at least one magnet unit 54. In addition, more than one magnet unit 54 may be arranged along the longitudinal direction of the main rope 16.

Since the attraction force of the permanent magnets 24 is inversely proportional to the distance between the permanent magnets 24 and the main rope 16a, the attraction force has nonlinear characteristics with respect to the displacement of the main rope 16a. Utilizing the geometric symmetry of the device arrangement can, when a nonlinear element is series-expanded, cancel even-ordered terms. Thus, the negative stiffness portion 71 is configured to have the minimum nonlinearity.

In FIG. 14, the yoke 25 arranged on the side faces of the permanent magnets, a coil 26 wound on the yoke 25, and an electric resistor 27 electrically connected to the coil 26 are provided. The yoke 25, the coil 26, and the electric resistor 27 implement the characteristics of a damper as a vibration damping portion.

This is because as the displacement of the main rope 16a changes, the magnetic flux of each permanent magnet changes, and the magnetic flux passing through the yoke 25 also changes. When the magnetic flux passing through the yoke 25 has changed and the magnetic flux passing through the coil 26 has changed, a voltage is generated in the coil 26 due to an electromagnetic induction phenomenon. As a voltage is generated across the both ends of the coil 26, a current flows through the electric resistor 27 and the electric resistor dissipates Joule heat. This means that vibration energy, which is a change in the displacement of the main rope 16a, is eventually dissipated as Joule heat by the electric resistor 27. The amount of change in the magnetic flux passing through the coil 26 depends on the speed of the displacement of the main rope 16a. Consequently, the same effect as when a mechanical damper is attached can be obtained with the coil 26 and the electric resistor 27. The limiting members 8a are non-magnetic bodies and are attached to the magnets 24a and 24b, respectively. The thickness of each limiting member 8a is set in the range that can prevent the main rope 16 from becoming unstable due to negative stiffness. Each limiting member 8a limits the distance between the main rope 16a and each magnet 24 so that the distance does not become less than the thickness of the limiting member 8a.

The limiting members 8 control a force exerted by the displacement amplifier 7 to be smaller than a force with which the elevator rope attempts to return to the equilibrium position (i.e., the position in the stand-still state) with the tension of the elevator rope. This can prevent the vibration from entering the unstable region.

The displacement amplifier 7 may be arranged at a position closer to the sheave (i.e., the traction machine or the deflector sheave) on which the elevator rope is wound than to the car 14 or the counterweight 15. The displacement amplifier 7 may be arranged at a position closer to the car 14 or the counterweight 15 or to the sheave on which the elevator rope is wound than to the center position of the elevator rope. The center position of the elevator rope is the midpoint between the fixed position B1 and the fixed position B2, for example. At this time, the distance between the position of the displacement amplifier and the car 14 or the counterweight 15, or the sheave is shorter than the distance between the displacement amplifier and the center position of the elevator rope. The distance between the position of the displacement amplifier and the car 14 or the counterweight 15, or the sheave is greater than zero. Accordingly, it becomes easier to change the vibration mode of the elevator rope to another vibration mode at a position away from the antinode of the vibration of the primary vibration mode.

The displacement amplifier 7 is formed of a negative stiffness member that exerts a force corresponding to a transverse displacement of the elevator rope in a direction away from the equilibrium position of the elevator rope. Accordingly, vibration of the elevator rope can be effectively controlled.

FIG. 15 is a view of the vibration damping device 100 obtained by providing roller-type limiting members on the vibration damping device 100 of the present embodiment. The main rope 16*a* moves in the x-axis direction as the car 14 is raised or lowered. Thus, in the vibration damping device 100 including the limiting members 8*a* as illustrated in FIG. 14, a friction force may be generated when the main rope 16*a* and the limiting members 8*a* come into contact with each other, which can promote the deterioration of the main rope 16*a*.

In FIG. 15, limiting members 8*b* each having a roller at its tip are disposed as limiting devices between the vibration damping device 100 and the main rope 16*a*, so that the rollers at the tips of the limiting members 8*b* first come into contact with the main rope 16*a*, thereby reducing the load on the main rope 16*a* in the vertical direction (i.e., x-axis direction). Meanwhile, the limiting members 8*b* can limit a displacement of the main rope 16*a* in the transverse direction (i.e., y-axis direction) that is orthogonal to the vertical direction.

In addition, the limiting members 8*b* each having a roller at its tip can be attached to a non-magnetic fixation member 30 via the positive stiffness portions 10. Accordingly, when the negative stiffness force (i.e., attraction force) of the permanent magnets as the negative stiffness portion 71 has become excessively large as in FIG. 9 of Embodiment 1, the positive stiffness portions 10 can exert a force in the direction opposite to the negative stiffness force and thus can expand the stable range of the permanent magnets, which is the negative stiffness portion 71. Further, attaching the limiting members 8*b* to the non-magnetic fixation member 30 can reduce the influence on the function of the damper including the permanent magnets 24, the yoke 25, the coil 26, and the electric resistor 27.

Described above is an example in which a vibration damping portion (i.e., damper) is formed by providing the yoke 25, the coil 26, and the electric resistor 27. However, even without such a damper, the natural frequency becomes a low frequency and resonance with the building sway 23 can be avoided, thus exhibiting a vibration damping effect. That is, limiting devices each including the permanent magnet 24 as the negative stiffness portion 71 and the limiting member 8*b* having a roller at its tip may be used. Alternatively, limiting devices each including the permanent magnet 24 and the limiting member 8*b*, which has a roller at its tip and includes the positive stiffness portion 10, may also be used. Accordingly, the vibration damping device 100 can be provided that prevents the negative stiffness force of the negative stiffness portion 71 from becoming excessively large and thus can prevent the negative stiffness portion 71 from becoming unstable.

Although the aforementioned vibration damping device 100 is provided near the traction machine 12 that is provided in the machine room and disposed in a vertically upward position, the vibration damping device 100 may also be provided at a position near the joined portion of the car 14 and the main rope 16 or the joined portion of the counterweight 15 and the main rope 16. This allows the vibration mode of the elevator rope to be more easily changed to another mode at a position away from the antinode of the vibration of the primary vibration mode. That is, it is effective to provide the vibration damping device 100 at a position away from the antinode of the vibration of the primary vibration mode.

Figure 16:
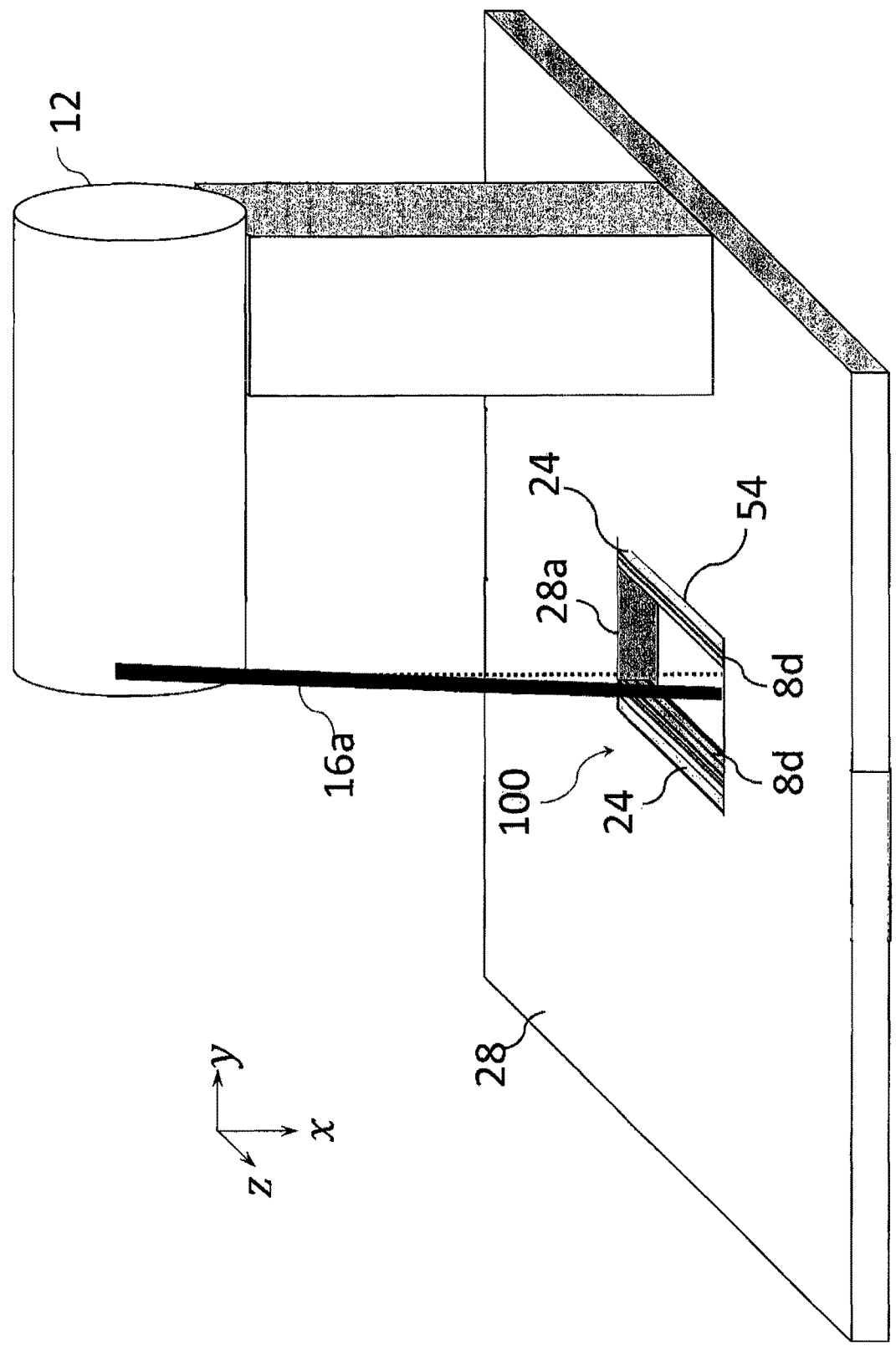
FIG. 16 is a view of the vibration damping device according to Embodiment 2 provided in the rope duct.

FIG. 16 is a view of the vibration damping device 100 of the present embodiment provided in the rope duct 28*a*. The vibration damping device 100 includes a pair of permanent magnets 24 and a pair of limiting members 8*d*. The permanent magnets 24 are examples of the magnet units. One of the pair of permanent magnets 24 is arranged on the inner side of one of the pair of limiting members 8*d*. The other of the pair of permanent magnets 24 is arranged on the inner side of the other of the pair of limiting members 8*d*.

The pair of limiting members 8*d* are provided in the rope duct 28*a*. The pair of limiting members 8*d* are arranged at symmetrical positions across the main rope 16*a*. For example, when the rope duct 28*a* is a rectangular opening, the pair of limiting members 8*d* are provided on opposite sides of the rope duct 28*a*. The pair of limiting members 8*d* face each other across the main rope 16*a*.

The pair of permanent magnets 24 are provided in the rope duct 28*a* together with the pair of limiting members 8*d*. Each of the pair of permanent magnets 24 is arranged with its magnetic pole facing the main rope 16*a*. The magnetic pole of each of the pair of permanent magnets 24 is covered with each of the pair of limiting members 8*d*.

Accordingly, the vibration damping device 100 becomes compact. Therefore, the vibration damping device 100 can also be applied to an elevator apparatus in which the distance from the rope duct 28*a* to the traction machine 12 is short.

Figure 17:
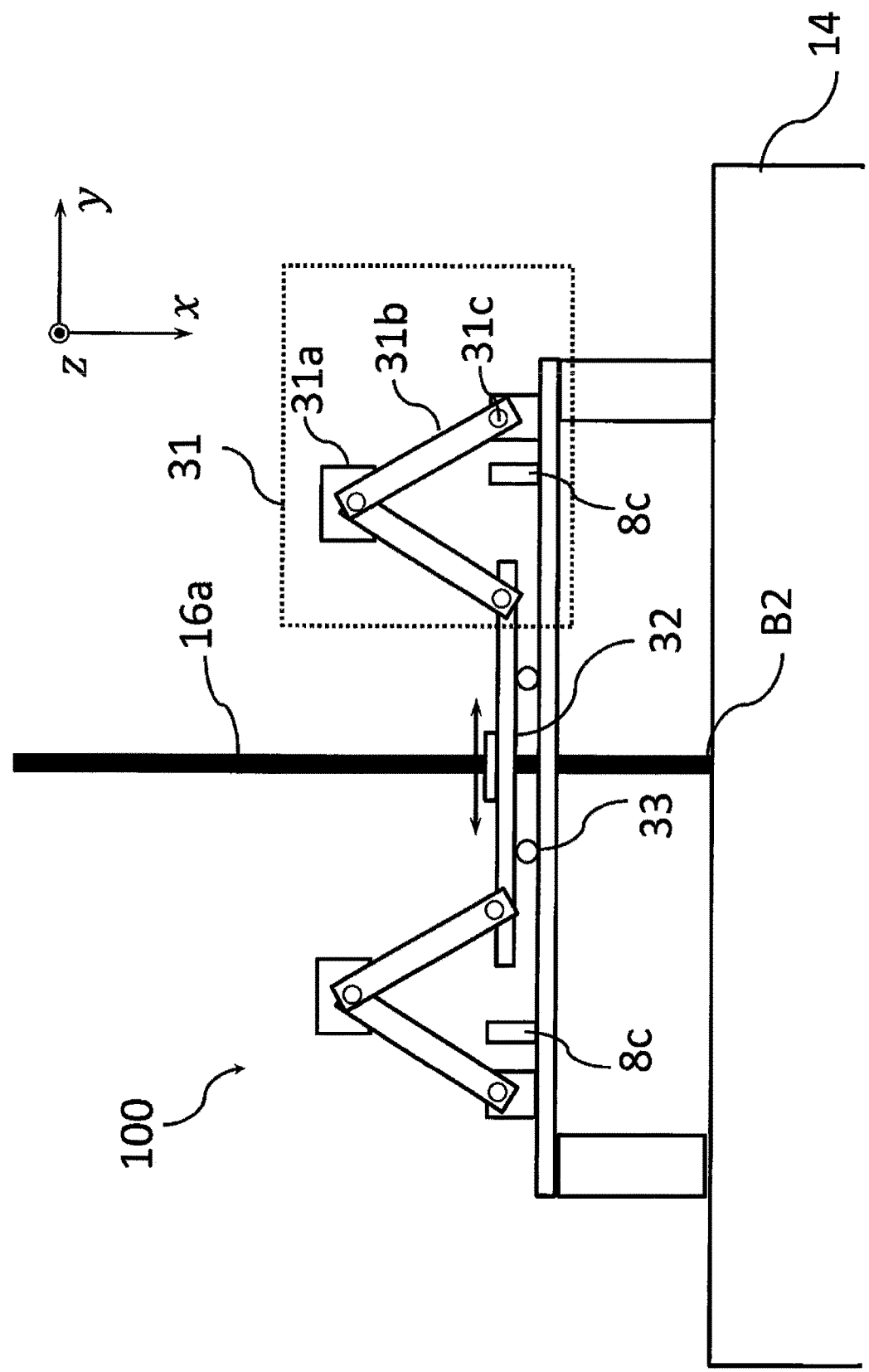
FIG. 17 is a front view illustrating the vibration damping device with the negative stiffness portion configured with the link mechanism of the elevator apparatus according to Embodiment 2.
Figure 18:
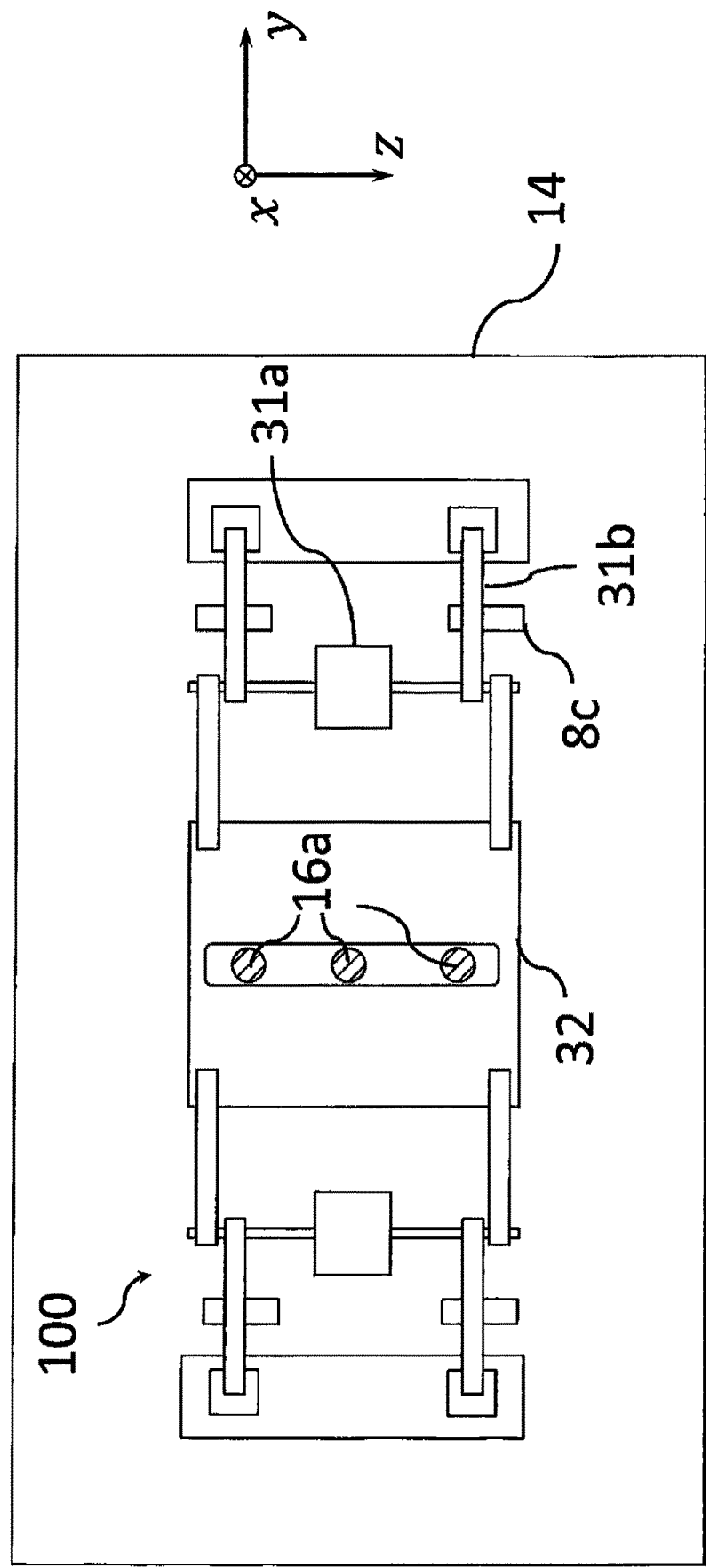
FIG. 18 is a top view illustrating the vibration damping device with the negative stiffness portion configured with the link mechanism of the elevator apparatus according to Embodiment 2.

FIGS. 17 and 18 are views each illustrating an example in which the vibration damping device 100 that controls vibration of the main rope 16 of the elevator according to the present embodiment is configured with a link mechanism. As illustrated in FIG. 17, the negative stiffness portion 71 of the vibration damping device 100 has a line-symmetric structure with respect to the main rope 16 in the stand-still state as the axis of symmetry (as seen in the section of the xy plane in the figures, for example), as with the vibration damping device 100 illustrated in FIG. 14.

Each side of the line-symmetric negative stiffness portion 71 of the vibration damping device 100 has a toggle link mechanism 31 that includes a weight 31*a*, a link 31*b*, and a rotation pivot 31*c*. The toggle link mechanism 31 is fixed at one end to the car 14 and is fixed at the other end to a rope restraining member 32 or at the rotation pivot. The rope restraining member 32 is coupled to one or more main ropes 16*a*, and is supported by a linear guide 33 so as to be freely movable in the horizontal direction (i.e., y-axis direction). The linear guide 33 may include a pair of rollers that contact with the main rope 16 interposed therebetween.

The displacement of the rope restraining member 32 in the horizontal direction is limited by the limiting members 8*c* provided on the fixed plane. The limiting members 8*c* prevent the negative stiffness force exerted by the toggle link mechanism 31, which is the negative stiffness portion 71, from becoming excessively large and thus prevent the toggle link mechanism 31 from becoming unstable. FIG. 17 is a front view of the vibration damping device 100 as viewed from the side in the horizontal direction, while FIG. 18 is a top view of the vibration damping device 100 as viewed from a vertically upward position.

Next, the function of the configuration illustrated in FIGS. 17 and 18 will be described. In FIGS. 17 and 18, when the main rope 16a is displaced, it comes into contact with the rope restraining member 32, and thus, the rope restraining member 32 is displaced. Then, the link 31b of the toggle link mechanism 31 on the side of the displacement direction connected to the rope restraining member 32 is folded, while the link 31b of the toggle link mechanism 31 on the other side has an extended shape. Each toggle link mechanism 31 is a mechanism that generates a great force (in this case, a negative stiffness force) when it extends due to the inertia of the weight 31a. The force transmitted by the toggle link mechanism 31 to the main rope 16a is greater when the link 31b extends than when it is folded. Therefore, compared to the force applied to the main rope 16a by the toggle link mechanism 31 on the side of the displacement direction, the force applied to the main rope 16a by the toggle link mechanism 31 on the other side is greater. Accordingly, the toggle link mechanism 31 generates a negative stiffness force. The toggle link mechanism 31 is an example of an unstable link mechanism that generates a negative stiffness force utilizing a displacement of one or more links.

Consequently, it is possible to add a force in the same direction as the displacement direction of the main rope 16a, that is, the negative stiffness characteristics of the displacement amplifier 7 utilizing the characteristics of the toggle link mechanism 31. Meanwhile, since the friction of the linear guide 33 suffices as the viscosity of a vibration damping means, a hydraulic damper or the like is not separately attached in this example. However, a damper may be attached when the friction of the linear guide 33 is insufficient, for example.

Next, the vibration damping principle of the vibration damping device 100 for an elevator rope according to Embodiment 2 and methods of determining the negative stiffness value and the viscosity value of the damper will be described using mathematical expressions. Hereinafter, a method of designing the vibration damping device which is applied to the main rope 16 among the elevator ropes will be described. However, the theory can be similarly applied the vibration damping device which is applied to other elevator ropes.

First, referring to FIG. 13, the main rope 16a in a region where it hangs from the traction machine 12 to it is connected to the car 14 will be described as the main rope 16. Considering vibration of the main rope 16a, both ends of the structure correspond to the end B1 of the main rope 16 in contact with the sheave of the traction machine 12 and the end B2 of the main rope 16 connected to the car 14. Let the distance between the ends B1 and B2 be L. Let the end B1 of the main rope 16 be the origin, and let the vertically downward direction be the positive direction of the x-axis. A transverse vibration displacement of the main rope 16a at a position away from the origin by the distance x at the time t is expressed as a function v(x,t). At this time, the spatiotemporal characteristics of the main rope 16a are governed by an equation of motion represented by Expression (1).

[Math. 1]

$$\rho \frac{\partial^2 v(x,t)}{\partial t^2} = T \frac{\partial^2 v(x,t)}{\partial x^2} - F_{cmp}\delta(x-x_0) \quad (1)$$

Herein, $\rho$ is the linear density of the main rope 16a, $F_{cmp}$ is a force applied to the main rope 16a by the vibration damping device 100, $\delta(\cdot)$ represents the delta function, and $x_0$ represents the position where the vibration damping device 100 is disposed. T represents the tension of the main rope 16a, which is constant herein. The left-hand side of Expression (1) represents the inertial force of a small point mass obtained by multiplying the linear density by the acceleration of the point mass (i.e., second-order partial differentiation with respect to the time of the vibration displacement function v(x,t)). This shows that the left-hand side is balanced with the difference between the components of a force in the horizontal direction of the tension T acting on both ends of the small point mass (i.e., second-order partial differentiation with respect to the position x of the vibration displacement function v(x,t)). Further, the force $F_{cmp}$ of the vibration damping device 100 is added at the position $x_0$. Expression (1) is known as an equation representing a wave propagation, and is called a wave equation. The wave propagation speed c is represented by Expression (2).

[Math. 2]

$$c = \sqrt{\frac{T}{\rho}} \quad (2)$$

Expression (2) represents that the wave propagation speed c of the main rope 16a is the square root of the tension T of the main rope 16a divided by the linear density $\rho$. The boundary conditions for the main rope 16a are represented by the following Expressions (3) and (4).

[Math. 3]

$$v(0,t)=v_{ext} \quad (3)$$

[Math. 4]

$$v(L,t)=0 \quad (4)$$

Herein $V_{ext}$ represents the displacement of building sway. Expression (3) represents that a forced displacement $V_{ext}$ is applied to the end B1 of the main rope 16a due to the building sway. Meanwhile, Expression (4) represents that the displacement of the end B2 whose distance from the end B1 is L is zero, that is, the end B2 is fixed. The initial conditions are such that the main rope 16 stands still at t=0.

Using the aforementioned boundary conditions and the initial conditions can determine the exact solution of the transfer function of the wave equation represented by Expression (1), which is represented by the following Expression (5).

[Math. 5]

$$V(x,s) = \left[\frac{e^{-\frac{s}{c}x} - e^{-\frac{s}{c}(2L-x)}}{1 - e^{-\frac{s}{c}2L}}\right]\left[V_{ext} - \frac{c}{2s}\left(e^{\frac{s}{c}x_0} - e^{-\frac{s}{c}x_0}\right)\frac{1}{T}F_{cmp}\right] = \qquad (5)$$

$$\left[\frac{\sinh\frac{s}{c}(L-x_0)}{\sinh\frac{s}{c}L}\right]\left[V_{ext} - \frac{c}{s}*\sinh\frac{s}{c}x_0*\frac{1}{T}F_{cmp}\right]$$

Herein, s represents the Laplacian operator, and sinh represents the hyperbolic function.

Herein, to design the vibration damping device 100 that can be implemented using a mechanical element that outputs the vibration damping force $F_{cmp}$, approximation by means of infinite product expansion is applied to the hyperbolic function of Expression (5). When the approximation is applied, it is assumed that the position $x_0$ where the vibration damping device 100 is disposed is a position whose distance from the end B1 is sufficiently smaller than the length L of the main rope 16, that is, a position close to the end B1 on the side of the traction machine. Based on the foregoing assumption, transfer functions up to the transverse vibration displacement $V(x_0,s)$ of the main rope 16 at the position where the vibration damping device is disposed and the transverse vibration displacement $V(L/2,s)$ of the main rope 16 at the center position thereof are represented by the following Expressions (6) and (7), respectively.

[Math. 6]

$$V(x_0, s) = \qquad (6)$$

$$\left(\frac{L-x_0}{L}\right)^3 \frac{s^2+\omega_{x0}^2}{s^2+\omega_L^2}\left[V_{ext} - \frac{x_0}{T}F_{cmp}\right] = \alpha\frac{s^2+\omega_{x0}^2}{s^2+\omega_L^2}\left[V_{ext} - \frac{x_0}{T}F_{cmp}\right]$$

It should be noted that $\alpha = (L-x_0)^3/L^3$ for simplification.

[Math. 7]

$$V(L/2, s) = \frac{1}{2}\frac{L}{(L-x_0)}\frac{\omega_{x0}^2}{s^2+\omega_{x0}^2}V(x_0, s) \qquad (7)$$

Herein, $\omega_L$ and $\omega_{x0}$ are respectively the primary natural frequencies of the main rope 16 when the length of the main rope 16 is L and when it has become the distance $L_{x0}$ from the end B1 to the position where the vibration damping device 100 is disposed. These are represented by Expressions (8) and (9), respectively.

[Math. 8]

$$\omega_L = \frac{\pi}{L}\sqrt{\frac{T}{\rho}} \qquad (8)$$

[Math. 9]

$$\omega_{x0} = \frac{\pi}{L-x_0}\sqrt{\frac{T}{\rho}} \qquad (9)$$

Herein, it is assumed that the force $F_{cmp}$ output from the vibration damping device 100 (i.e., the negative stiffness force of the negative stiffness portion 71) is the resultant force of the stiffness and the viscous element represented by the following Expression (10).

[Math. 10]

$$F_{cmp} = (K_p + D_p s)V(x_0,s) = G(\overline{K}_p + \overline{D}_p s)V(x_0,s) \qquad (10)$$

Herein, $K_p$ and $D_p$ represent the stiffness value and the viscosity value of the displacement amplifier 7 (i.e., the negative stiffness portion 71), respectively. In addition, $K_p$ bar and $D_p$ bar (notations of lines above the symbols) represent the stiffness value and the viscosity value of the displacement amplifier 7 (i.e., the negative stiffness portion 71) normalized by the constant G, respectively. The constant G is given by the following value.

[Math. 11]

$$G = \frac{T}{x_0} \qquad (11)$$

Substituting Expression (10), which represents the force applied by the vibration damping device 100, into Expression (6), which represents the transfer function, to calculate a characteristic polynomial can obtain the following Expression (12).

[Math. 12]

$$D(s) = \overline{D}_p\alpha\left(s^3 + \frac{(\overline{K}_p\alpha+1)}{\overline{D}_p\alpha}s^2 + \omega_{x0}^2 s + \frac{\omega_L^2 + \omega_{x0}^2\overline{K}_p\alpha}{\overline{D}_p\alpha}\right) \qquad (12)$$

Herein, the following constants are defined for simplification in Expression (12). Assuming that the damping ratio of the main rope 16 is set to 1 and the angular frequency is set to con by the vibration damping device 100, the characteristic polynomial is represented by the following Expression (13).

[Math. 13]

$$D(s) = \overline{D}_p\alpha(s+\omega_n)^3 = \overline{D}_p\alpha(s^3+3\omega_n s^2+3\omega_n^2 s+\omega_n^3) \qquad (13)$$

The conditions for setting the damping ratio to 1 with the vibration damping device 100 are as follows. Solving simultaneous equations in which the coefficients of Expressions (12) and (13) are compared with $K_p$ bar, $D_p$ bar and $\omega_n$ as unknowns can obtain the following Expressions (14), (15), and (16).

[Math. 14]

$$\overline{K}_p = \frac{1}{\alpha}\frac{1}{8}\left\{1 - 9\frac{\omega_L^2}{\omega_{x0}^2}\right\} \qquad (14)$$

[Math. 15]

$$\overline{D}_p = \frac{1}{\alpha}\frac{1}{\sqrt{3}\omega_{x0}}\frac{9}{8}\left\{1 - \frac{\omega_L^2}{\omega_{x0}^2}\right\} \qquad (15)$$

[Math. 16]

$$\omega_n = \frac{\omega_{x0}}{\sqrt{3}} \qquad (16)$$

Multiplying the normalized stiffness value and viscosity value calculated with Expressions (14) and (15), respectively, by the constant G can obtain the actual stiffness value and viscosity value. In addition, referring to Expression (14), the value is negative due to the condition that the value of $\omega_L$ is close to $\omega_{x0}$, and thus, it is found that implementation of negative stiffness is indispensable for controlling vibration of the main rope 16.

Further, applying the negative stiffness to the vibration damping device 100 will change the maximum damping ratio that can be obtained by adjusting the viscosity value (hereinafter referred to as the maximum damping ratio). The maximum damping ratio $\zeta$ is represented as the function of the normalized negative stiffness value $K_p$ bar and is given by the following Expression (17).

[Matth. 17]

$$\zeta(\bar{K}_p) = \frac{1}{2}\left(\sqrt{1 + \frac{\omega_{x0}^2 - \omega_L^2}{\omega_L^2 + a\bar{K}_p\omega_{x0}^2}} - 1\right) \quad (17)$$

In particular, when the normalized negative stiffness value $K_p$ bar is zero, the maximum damping ratio is equivalent to that when the vibration damping device 100 is constructed using only a viscous element. In that case, the maximum damping ratio $\zeta$ is represented by the following Expression (18).

[Math. 18]

$$\zeta(0) = \frac{1}{2}\frac{\omega_{x0} - \omega_L}{\omega_L} = \frac{1}{2}\frac{\frac{x_0}{L}}{1 - \frac{x_0}{L}} \quad (18)$$

From Expression (18), which represents the maximum damping ratio when the normalized negative stiffness value is zero, it is found that the maximum damping ratio is determined by the ratio of the position $x_0$ where the vibration damping device is disposed to the length L of the main rope 16 (hereinafter simply referred to as the ratio). It is also found that when the length L of the main rope 16 becomes greater and the ratio becomes smaller, the numerator of Expression (18) becomes smaller and thus, the maximum damping ratio also becomes smaller. That is, it is found that vibration of the main rope 16, which is a long elevator rope, in a high rise building is difficult to control with a vibration damping device that uses only viscosity. Therefore, the vibration damping device 100 including the displacement amplifier 7 using negative stiffness is highly effective.

Figure 19:
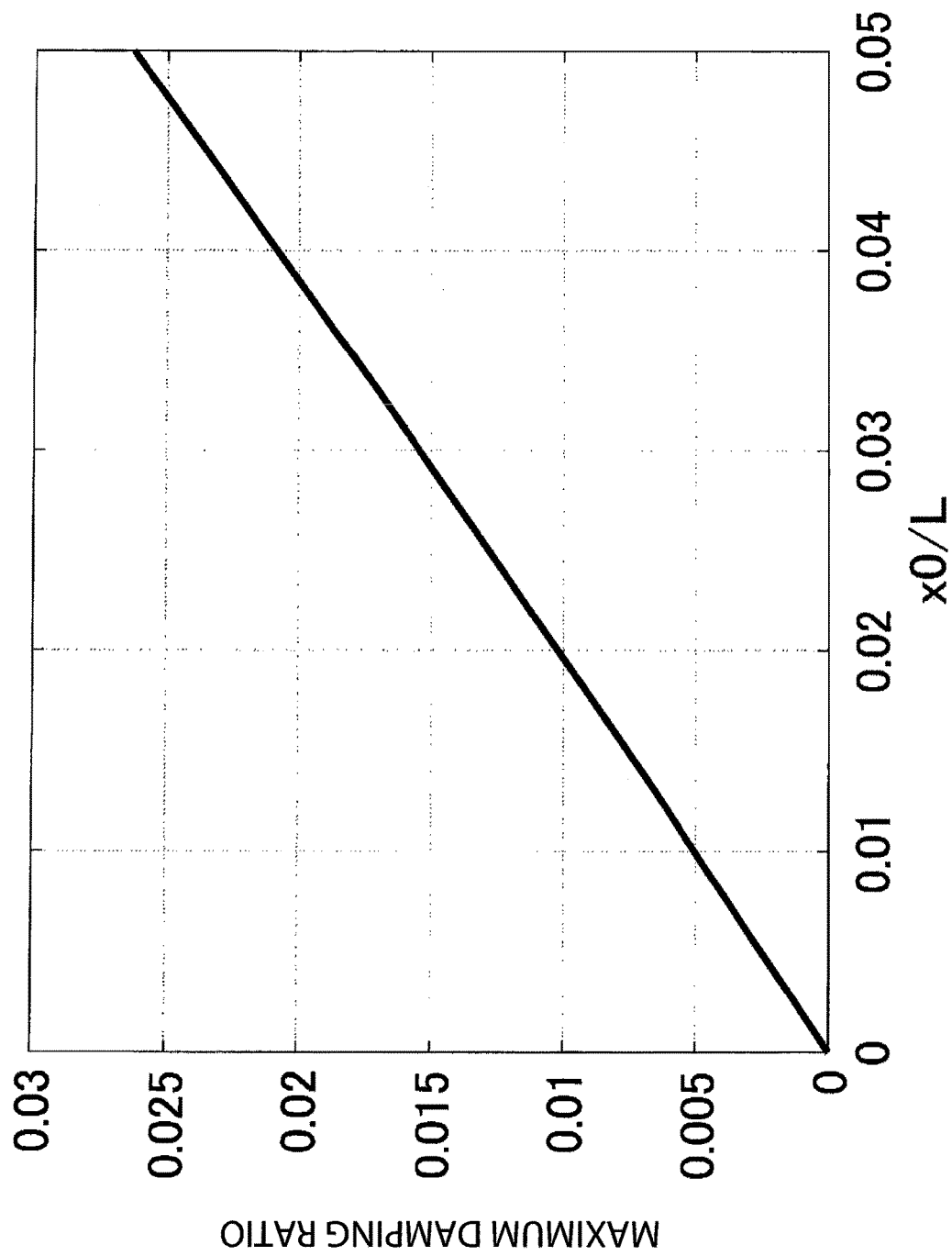
FIG. 19 is a graph illustrates the relation between the ratio of the distance from the end to the position where vibration damping device is provided to the length of the main rope of the elevator apparatus according to Embodiment 2 and the maximum damping ratio.

Next, the vibration damping effect of the negative stiffness and viscosity will be examined from the above expression. FIG. 19 is a graph of the function of Expression (18) representing the maximum damping ratio, and illustrates the vibration damping effect of the vibration damping device configured with only viscosity and without the aforementioned negative stiffness. In the figure, the abscissa axis indicates the ratio $x_0/L$ of the position $x_0$ where the vibration damping device is disposed to the length L of the main rope 16, and the ordinate axis indicates the maximum damping ratio. It is found that the maximum damping ratio is proportional to the ratio $x_0/L$. However, when the ratio $x_0/L$ is 0.01, for example, the maximum damping ratio $\zeta$ is 0.005, which means that an increase in the absolute value is only a little. Therefore, the vibration damping effect is not expected in the region where the ratio $x_0/L$ is small.

In the elevator apparatus, provided that the position $x_0$ where the vibration damping device is disposed cannot be changed, since the rope length L will change as the car 14 is raised or lowered, the ratio $x_0/L$ will greatly change correspondingly. That is, if vibration damping is performed using only viscosity, there is a disadvantage that the obtained performance is likely to vary depending on the rope length, that is, the position of the car 14.

Figure 20:
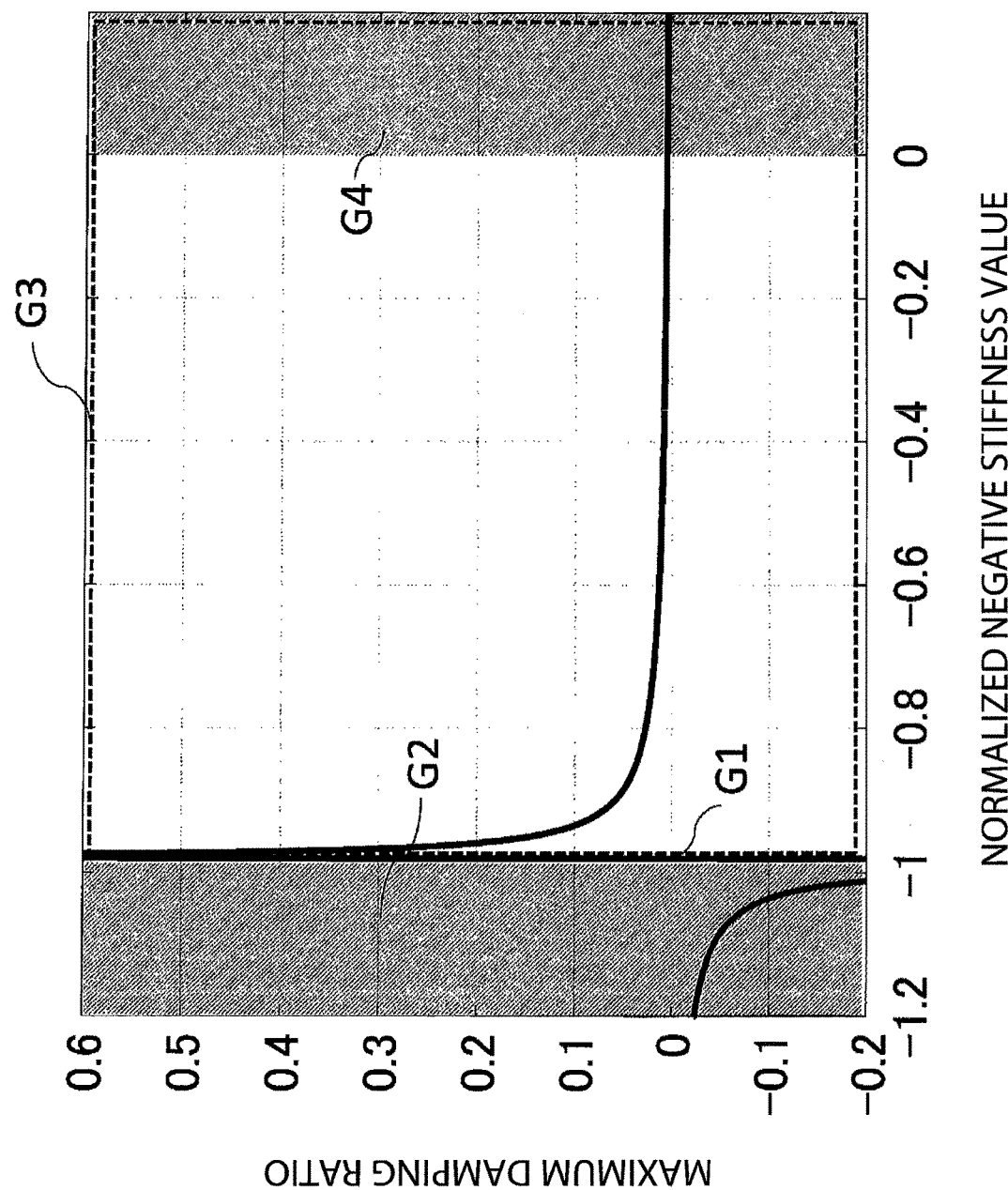
FIG. 20 is a graph illustrates the relation between the normalized stiffness value when positive or negative stiffness is applied to the elevator apparatus according to Embodiment 2 and the maximum damping ratio.

FIG. 20 illustrates the maximum damping ratio when the ratio $x_0/L$ of the distance $x_0$ from the end B1 to the position where the vibration damping device 100 is disposed to the length L of the main rope 16 is 0.01, and positive or negative stiffness including that of the displacement amplifier 7 is applied. The graph of the figure is calculated based on Expression (17), and the abscissa axis indicates the normalized negative stiffness value $K_p$ bar of the vibration damping device, and the ordinate axis indicates the maximum damping ratio $\zeta$. When the ratio $x_0/L$ is 0.01, if the vibration damping device is configured with only a vibration damper using viscosity as in FIG. 19, the maximum damping ratio $\zeta$ is 0.005. Thus, only a small damping effect is obtained. In the abscissa axis of the figure, the direction in which the positive value of the normalized stiffness value increases is the rightward direction. Thus, regarding the negative stiffness, the direction in which the absolute value increases is the leftward direction.

In FIG. 20, as the absolute value of the normalized negative stiffness value $K_p$ bar increases from zero toward the boundary G1, the maximum damping ratio $\zeta$ increases hyperbolically. Meanwhile, when the normalized negative stiffness value $K_p$ bar is on the left side of −1, that is, when the absolute value thereof exceeds 1, the maximum damping ratio has a large negative value. Further, as the absolute value of the normalized negative stiffness value $K_p$ bar increases, the absolute value of the maximum damping ratio on the negative side decreases but the maximum damping ratio $\zeta$ approaches zero from the negative side. From this graph, it is found that the boundary (G1) is present at a normalized stiffness value of slightly greater than −1. Herein, when the normalized stiffness value is changed from zero to the negative side, the maximum damping ratio suddenly increases to the positive side and is then inverted to the negative side. Thus, the boundary of the normalized stiffness value at which the maximum damping ratio changes from positive to negative is defined as the boundary G1. Then, it is found that as the normalized negative stiffness value $K_p$ bar approaches the value at the boundary G1, the maximum damping ratio increases.

Herein, comparing the vibration damping illustrated in FIG. 20 with the vibration damping of the vibration damping device configured with only a vibration damper illustrated in FIG. 19 can confirm that the maximum damping ratio in FIG. 20 is significantly increased. Further, using the negative stiffness portion 71 with negative stiffness characteristics, which is the displacement amplifier 7, can increase the displacement of the main rope 16 and allow the displacement to have characteristics closer to the characteristics of the antinode of the vibration.

The effect of the negative stiffness characteristics of the negative stiffness portion 71 greatly depends on the distance $x_0$ from the end B1 or B2 of the rope to the position where the vibration damping device 100 is disposed, and has low sensitivity to the length L of the main rope 16. Thus, the robustness of the damper as the vibration damping means can also be increased.

Herein, when the absolute value of the normalized negative stiffness value becomes greater than that at the boundary G1, the value of the maximum damping ratio becomes negative. That is, it is found that a region indicated by G2 in which the normalized negative stiffness value is less than −1 is an unstable region. The value of the normalized negative stiffness value at the boundary G1 is the value of $K_p$ bar at which the damping ratio is infinite in Expression (17), and is represented by the following expression.

[Math. 19]

$$\left|\bar{K}_p^{asy}\right| = \left|-\frac{1}{\alpha}\frac{\omega_L^2}{\omega_{x0}^2}\right| = \frac{L}{L-x_0} \quad (19)$$

Expression (19) represents that the absolute value of the normalized negative stiffness value at the boundary G1 is the value obtained by dividing the length of the main rope 16 by the difference between the length of the main rope 16 and the distance from the end B1 to the position where the vibration damping device is disposed. That is, when the vibration damping device 100 is provided near the traction machine of the elevator, the absolute value of the normalized negative stiffness value at the boundary G1 is the value obtained by dividing the length of the main rope 16 by the distance from the vibration damping device 100 to the car 14. Alternatively, when the vibration damping device 100 is provided near the car 14 of the elevator, the absolute value of the normalized negative stiffness value at the boundary G1 is the value obtained by dividing the length of the main rope 16 by the distance from the vibration damping device 100 to the traction machine.

It should be noted that the length of the main rope 16 is the length of the main rope 16 from its end in contact with the sheave of the traction machine to the car 14. Thus, the length of the main rope 16 will change as the car 14 of the elevator is raised and lowered. Therefore, the absolute value of the normalized negative stiffness value at the boundary G1 becomes large when the car 14 is at the top floor and becomes small when the car 14 is at the bottom floor.

Accordingly, if the vibration damping device 100 is configured such that it has the resultant stiffness value with an absolute value less than that of the normalized negative stiffness value obtained by dividing "the length of the main rope 16 when the car 14 is at the bottom floor" by "the difference between the length of the main rope 16 and the distance from the end B1 to the position where the vibration damping device is disposed," an unstable condition can be reliably avoided. Therefore, if the negative stiffness portion 71 (i.e., the displacement amplifier 7) and the limiting members are configured such that the absolute value of the resultant stiffness of the vibration damping device 100 does not become greater than the value obtained by dividing "the length of the main rope 16 when the car 14 is at the bottom floor" by "the difference between the length of the main rope 16 and the distance from the end B1 to the position where the vibration damping device is disposed" and also such that the resultant stiffness value of the vibration damping device 100 becomes as small as possible, an unstable condition can be avoided and a device with a high vibration damping effect can be obtained.

In addition, a region G4 illustrated in FIG. 20 is a region where the stiffness value of the stiffness member of the vibration damping device 100 is positive. In the region G4, the maximum damping ratio is zero. Therefore, in comparison with the characteristics of the maximum damping ratio of the damping device that uses only viscosity in FIG. 19, the maximum damping ratio obtained herein becomes smaller than that when only viscosity is used. Thus, implementation of positive stiffness is not preferred. Therefore, to control vibration of the main rope 16, it is desirable to implement a normalized negative stiffness value in the range of the following expression.

[Math. 20]

$$-\frac{L}{L-x_0} < \bar{K}_p < 0 \quad (20)$$

Expression (20) represents that the normalized negative stiffness value $K_p$ bar is greater than the normalized negative stiffness value at the boundary G1 represented by Expression (19) and is less than zero. Since $K_p$ bar means that the negative stiffness value has been divided by the constant G of Expression (11) above for normalization, the negative stiffness value to be implemented can be determined by multiplying Expression (20) by the constant G.

[Math. 21]

$$-\frac{T}{x_0}\frac{L}{L-x_0} < K_p < 0 \quad (21)$$

The present embodiment is designed to fix a negative stiffness value in the stable region represented by Expression (21) using the limiting members so as to maximally extract the damping effect by means of viscosity. The left-hand side of Expression (21) corresponds to the slope of the solid line a in FIG. 5 described in Embodiment 1. The slope of the solid line a in FIG. 5 represents the minimum negative stiffness (i.e., the maximum stiffness in terms of the absolute value of a stiffness force) that does not cause an unstable condition due to the negative stiffness portion 71. Specifically, the minimum negative stiffness that ensures stability is obtained by multiplying a value, which is obtained by dividing the tension of the main rope by the position where the vibration damping device is disposed, by a correction coefficient including the length of the main rope and the position where the vibration damping device is disposed.

Expression (21) represents the desired range of the negative stiffness value $K_p$ of the negative stiffness portion 71 of the displacement amplifier 7. Similarly, Expression (19) represents the normalized negative stiffness value at the boundary G1. When Expression (19) is multiplied by the constant G of Expression (11) to obtain a negative stiffness value, the following expression is obtained.

[Math. 22]

$$K_p^{asy} = -\frac{T}{x_0}\frac{L}{L-x_0} \quad (22)$$

Expression (22) represents the negative stiffness value $K_p^{asy}$ at the boundary between the stable and unstable regions of the displacement amplifier 7 of the vibration damping device 100. It should be noted that the superscript asy means an asymptote. Similar to the above description made with reference to Expression (19), if the negative stiffness portion 71 (i.e., the displacement amplifier 7) and the limiting members are configured such that the resultant stiffness value of the vibration damping device 100 does not become smaller than the negative stiffness value of Expression (22) that is represented by the tension T, the distance $x_0$ from the end B to the position where the vibration damping device is disposed, and the length L of the main rope 16 when the car 14 is at the bottom floor, but becomes as large as possible, an unstable condition can be avoided and a device with a high vibration damping effect can be provided.

Further, regarding the limiting members 8b in FIG. 15, the rollers at the tips of the limiting members 8b are controlled to come into contact with the main rope 16 based on the distance between the permanent magnets 24 and the main rope 16a so that the attraction force of the permanent magnets 24 as the displacement amplifier does not become smaller than the negative stiffness value $K_p^{asy}$ represented by Expression (22). Accordingly, the attraction force (i.e., negative stiffness force) of the permanent magnets 24 as the displacement amplifier can stably amplify a displacement without the vibration damping device 100 entering the unstable region.

Furthermore, regarding the limiting members 8c in FIG. 17, the limiting members 8c are provided at positions where they contact the limiting members 8c in a state where the negative stiffness force exerted by the toggle link mechanism 31 does not become smaller than the negative stiffness value $K_p^{asy}$ represented by Expression (22). Accordingly, the negative stiffness force of the toggle link mechanism 31, which is the displacement amplifier, can stably amplify a displacement without the vibration damping device 100 entering the unstable region.

Regarding the tension T of the main rope 16, the negative stiffness value $K_p^{asy}$ at the boundary may be determined with the tension of the main rope 16 when the car 14 is empty, and the determined value may be used as the resultant stiffness value of the vibration damping device 100. The tension of the main rope 16 is the lowest when the car 14 is empty. Therefore, the negative stiffness value $K_p^{asy}$ at the boundary is the smallest when the car 14 is empty. Setting the resultant stiffness value of the vibration damping device 100 in this manner can avoid an unstable condition and thus is safe.

The above holds true for not only the main rope 16 between the traction machine and the car 14 but also the traction machine, the counterweight 15, the governor rope, the traveling cable, and other elevator ropes.

According to the present embodiment, the elevator apparatus 11 includes the vibration damping device 100. The vibration damping device 100 reduces vibration of an elevator rope. That is, a structure that is a vibration control target of the vibration damping device 100 of the present embodiment is an elevator rope. In particular, the vibration damping device 100 is directed to control vibration of the main rope 16 of the elevator that is connected to the car 14 and the counterweight 15 of the elevator and is wound on the sheave, as a target elevator rope. The vibration damping device 100 according to the present embodiment includes the displacement amplifier 7 that is arranged along any position in the longitudinal direction of the elevator rope and that amplifies a displacement of the elevator rope, and the limiting members that control the displacement amplification performed by the displacement amplifier 7 such that the displacement of the elevator rope amplified by the displacement amplifier 7 does not become greater than the preset first displacement. Such a configuration can stably increase a displacement due to vibration of the elevator rope at the position where the displacement amplifier 7 is provided, and thus can increase the vibration damping effect.

Further, the vibration damping device 100 of the present embodiment includes the limiting members that allow a force exerted by the displacement amplifier 7 to be smaller than a force with which the elevator rope attempts to return to the equilibrium position with the tension of the elevator rope. This can stably increase a displacement due to vibration of the elevator rope at the position where the displacement amplifier 7 is provided, and thus can increase the vibration damping effect.

The displacement amplifier 7 of the vibration damping device 100 of the present embodiment includes the negative stiffness member that exerts a force corresponding to a transverse displacement of the elevator rope in a direction away from the equilibrium position of the elevator rope. Therefore, the transverse vibration of the elevator rope can be effectively controlled.

Further, the displacement amplifier 7 of the vibration damping device 100 of the present embodiment is arranged at a position closer to the sheave than to the car 14 or the weight. Therefore, even at a position where a transverse displacement of the elevator rope is small, the displacement amplifier 7 can increase the displacement and change the vibration mode, and thus can effectively control the vibration.

The distance between the position of the displacement amplifier 7 of the vibration damping device 100 of the present embodiment and the position of the car 14 or the counterweight 15, or the sheave is shorter than the distance between both fixed positions of the elevator rope. In addition, the distance between the position of the displacement amplifier 7 and the position of the car 14 or the counterweight 15, or the sheave is greater than zero. Accordingly, even at a position where a displacement of the elevator rope is small, the displacement amplifier 7 can increase the displacement and can change the vibration mode so that the vibration damping device 100 can effectively control the vibration.

The first displacement based on which the limiting members of the vibration damping device 100 of the present embodiment control the displacement amplification performed by the displacement amplifier 7 is a displacement where a force is exerted with a modulus of elasticity that has a value obtained by dividing the tension acting on the elevator rope when the car 14 in an empty state is at the top floor of the elevator by the distance from the fixed position of the elevator rope to the position coupled to the displacement amplifier 7. Accordingly, the vibration damping device 100 can always and stably increase a displacement of the elevator rope and thus can increase the vibration damping effect.

The displacement amplifier 7 and the limiting members of the vibration damping device 100 of the present embodiment amplify a displacement of the main rope 16 by exerting a force based on the modulus of elasticity K. The modulus of elasticity K satisfies an inequality represented by Expression (23). Herein, the tension of the elevator rope is T, the distance from the connection point between the car 14 or the weight and the elevator rope to the position where the displacement amplifier 7 is arranged is $x_0$, and the total length of the elevator rope is L. Accordingly, the vibration damping device 100 can always and stably increase a displacement of the elevator rope, and thus can increase the vibration damping effect.

[Math. 23]

$$-\frac{T}{x_0}\frac{L}{L-x_o} < K < 0 \tag{23}$$

The displacement amplifier 7 may include the pair of magnet units 54. The pair of magnet units 54 are arranged with their magnetic poles facing each other across the elevator rope. The limiting members 8a are a pair of non-magnetic bodies arranged between the magnetic poles of the pair of magnet units 54 and the elevator rope. Each limiting member 8a controls the approach of the elevator rope to the magnetic pole of each of the pair of magnet units 54 so that the elevator rope does not become close to the magnetic pole beyond the thickness of the limiting member 8a. Therefore, by forming each limiting member 8a thicker than the thickness at which the main rope 16 contact the limiting member 8a when the main rope 16 is displaced by the first displacement, it becomes possible for the vibration damping device 100 to stably control vibration of the elevator rope. In addition, the displacement amplifier 7 amplifies a displacement of the elevator rope without contact. Accordingly, wear of the elevator rope and the like due to amplification of the displacement can be suppressed.

The pair of magnet units 54 are arranged with their same magnetic poles facing each other. Accordingly, the pair of magnet units 54 repel each other. Therefore, the gap between the pair of magnet units 54 is not closed by the magnetic forces of the pair of magnet units 54. Thus, it is not necessary to consider an attraction force acting between the pair of magnet units 54 when fixing the pair of magnet units 54.

Each of the pair of magnet units 54 includes the yoke 25, the permanent magnet 24a, and the permanent magnet 24b. The yoke 25 is arranged along a direction parallel with the elevator rope. The magnetic poles of the permanent magnet 24a are directed toward one end of the yoke 25 from the direction of the elevator rope. The magnetic poles of the permanent magnet 24b are opposite to those of the permanent magnet 24a and are directed toward the other end of the yoke 25 from the same direction of the permanent magnet 24a. Accordingly, the yoke 25 guides a magnetic flux emitted from the magnetic pole on the side opposite to the elevator rope toward the inside. Thus, each magnet unit 54 can have suppressed leakage of the magnetic flux on the side opposite to the elevator rope. This can suppress the influence of the vibration damping device 100 on the peripheral devices.

The displacement amplifier 7 may include an unstable link mechanism that generates a negative stiffness force upon occurrence of displacement of one or more links. In such a case, the limiting member 8c controls the displacement of at least one of the one or more links. Accordingly, the displacement amplifier 7 can generate a negative stiffness force without using a magnetic force.

The link mechanism of the displacement amplifier 7 may be a pair of toggle link mechanisms 31 arranged across the elevator rope. Accordingly, the displacement amplifier 7 can generate a negative stiffness force using a simple mechanism.

The displacement amplifier 7 may include rollers to come into contact with the elevator rope. Accordingly, deterioration that would occur due to friction between the elevator rope and the displacement amplifier 7 can be suppressed.

The vibration damping device 100 may include a vibration damper that reduces vibration of the elevator rope. Accordingly, vibration energy is dissipated efficiently. Thus, a high vibration damping effect can be obtained.

The vibration damper includes the coil 26 and the electric resistor 27, for example. The coil 26 passes a magnetic flux passing through at least one of the pair of magnet units 54. The electric resistor 27 is electrically connected to the coil 26. The coil 26 may be wound on the yoke 25 of at least one of the pair of magnet units 54. Accordingly, amplification of displacement by the displacement amplifier 7 and dissipation of vibration energy by the vibration damper are performed concurrently. Thus, the vibration damping device 100 can more effectively control vibration of the elevator rope using a simple structure.

Figure 21:
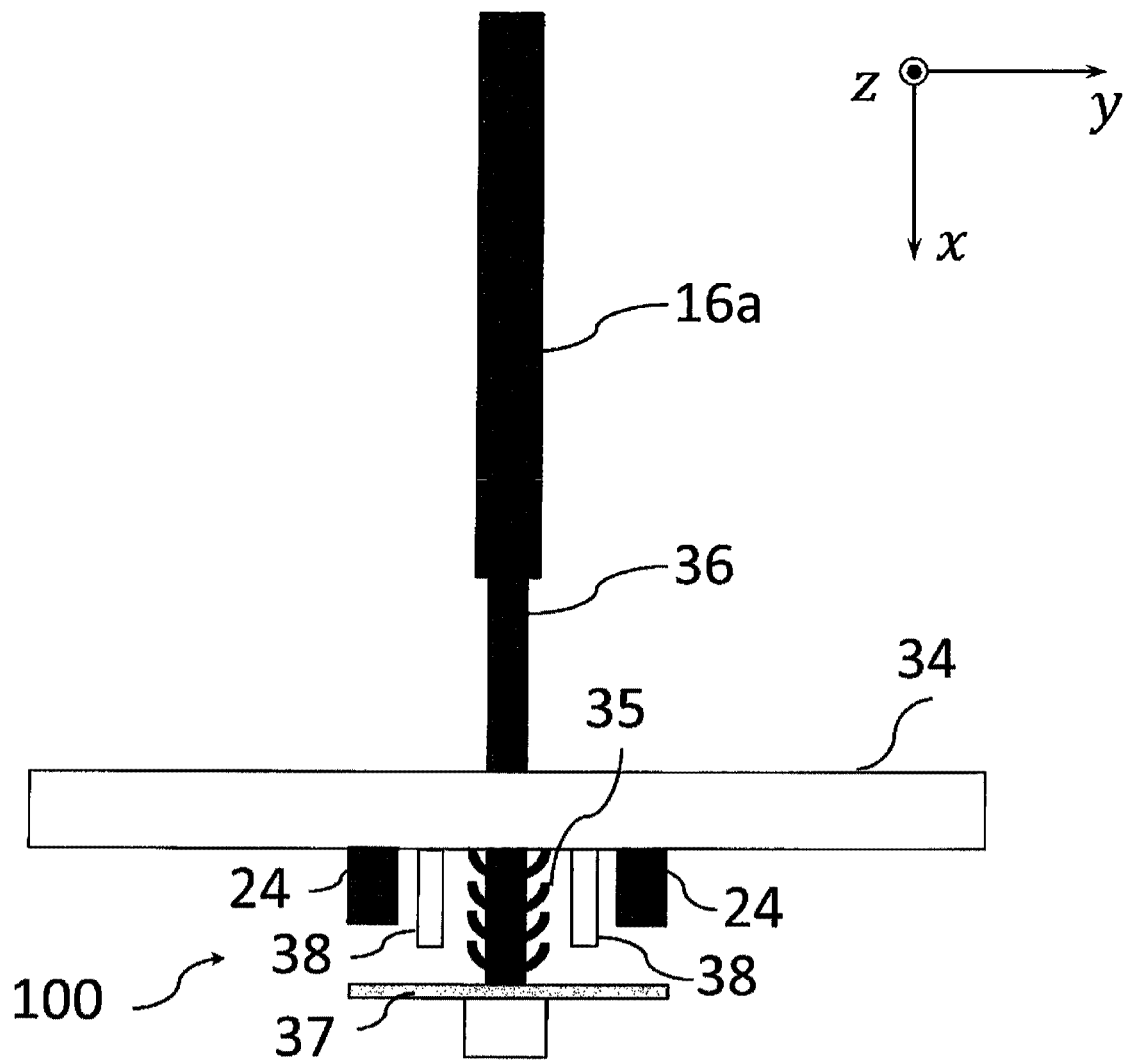
FIG. 21 is a view illustrates an exemplary configuration of the vibration damping device that controls longitudinal vibration in of the elevator apparatus according to Embodiment 2.

The vibration damping device 100 of the present embodiment is also applicable to longitudinal vibration of the main rope 16. FIG. 21 illustrates an exemplary configuration of a vibration damping device that controls longitudinal vibration of the main rope 16. The main rope 16a is fixed to an upper beam 34 of a car via a shackle rod 36 and a shackle spring 35. A ferromagnetic body 37 is attached to an end of the shackle rod, and magnets 24 are provided on the upper beam 34 of the car so as to face the ferromagnetic body 37. With such a configuration, negative stiffness characteristics can be imparted in the x-direction (i.e., the vertical direction). In addition, limiting members 38 are provided to prevent an unstable condition. It should be noted that longitudinal vibration has a smaller amplitude than transverse vibration. Thus, the limiting members 38 may be removed if the vibration damping device 100 operates only in a region where the nonlinearity of the displacement amplifier is not strong. Further, as the element for implementing the negative stiffness portion 71, a toggle link mechanism may be used instead of the permanent magnets 24.

Each limiting member of the vibration damping device 100 of the present embodiment includes a roller to come into contact with the elevator rope. Such a roller is effective in reducing friction between the elevator rope and the limiting member and thus preventing deterioration of both the members.

Figure 22:
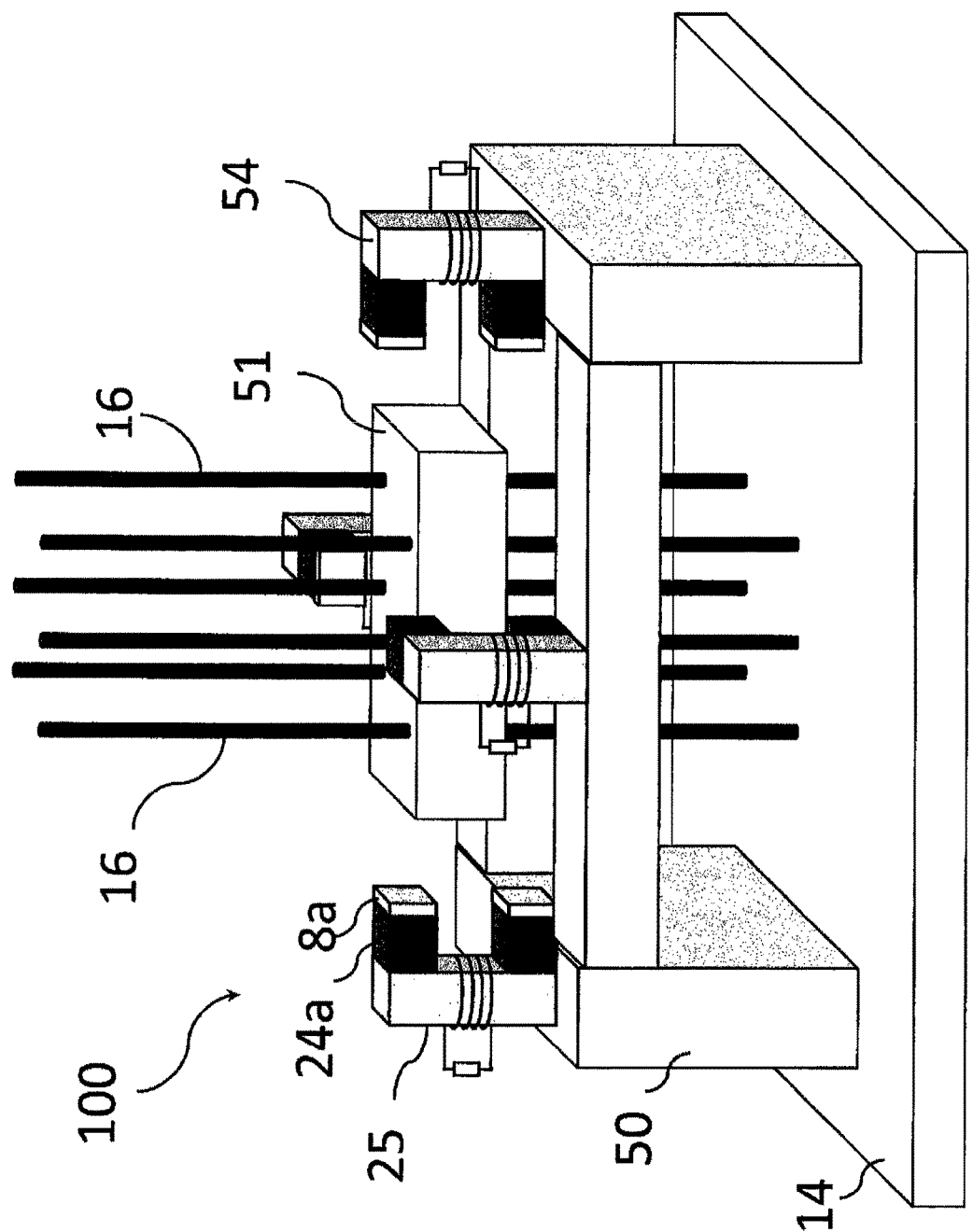
FIG. 22 is a perspective view of the vibration damping device according to Embodiment 2.

FIG. 22 is a view of the vibration damping device 100 of the present embodiment applied to the elevator apparatus 11 including a plurality of main ropes 16. Herein, the structure 1 whose vibration is controlled by the vibration damping device 100 is the plurality of main ropes 16. An end of each of the plurality of main ropes 16 is connected to the top of the car 14. The vibration damping device 100 is provided above the car 14. The vibration damping device 100 includes a support base 50 and a restraining member 51.

The support base 50 is provided on the top of the car 14. The support base 50 is provided around the plurality of main ropes 16.

The restraining member 51 is made of a ferromagnetic material. The restraining member 51 is a member that maintains a constant distance between each of the plurality of main ropes 16 in the horizontal direction. The restraining member 51 is a block-like member fixed to each of the plurality of main ropes 16, for example.

The vibration damping device 100 includes at least three magnet units 54. In this example, the vibration damping device 100 includes four magnet units 54. Each of the plurality of magnet units 54 is provided on the upper face of the support base 50. Each of the plurality of magnet units 54 includes permanent magnets 24 (24a and 24b). The magnetic poles of the plurality of magnet units 54 are arranged facing the restraining member 51 from different directions so as to surround the restraining member 51. For example, when the vibration damping device 100 includes three magnet units, the magnetic poles of the plurality of magnet units 54 may be arranged at intervals of 120° with respect to the central axis of the restraining member 51 along the longitudinal direction of the main ropes 16. Meanwhile, when the vibration damping device 100 includes four magnet units, the magnetic poles of the plurality of magnet units 54 may be arranged at intervals of 90° with respect to the central axis of the restraining member 51 along the longitudinal direction of the main ropes 16. The plurality of magnet units 54 may be arranged at different heights along the longitudinal direction of the main ropes 16.

As described above, when the structure 1 whose vibration is controlled by the vibration damping device 100 is the plurality of main ropes 16, the vibration damping device 100 includes the restraining member 51. The restraining member 51 maintains a constant distance between each of the plurality of main ropes 16 in the horizontal direction. The design value of the negative stiffness value of the negative stiffness portion 71 is determined by the tension of an elevator rope as indicated by Expression (11). Therefore, when the vibration damping device 100 is to control vibration of the plurality of main ropes 16, the vibration damping performance of the vibration damping device 100 would decrease if the tension varies among the plurality of main ropes 16. Therefore, the plurality of main ropes 16 are integrated by being restrained by the restraining member 51, whereby the design value of the negative stiffness value of the negative stiffness portion 71 is determined by the total tension of the plurality of main ropes 16. The tensions of the plurality of main ropes 16 vary both positively and negatively. Therefore, the total sum of variation in the tension of each of the plurality of main ropes 16 has no (i.e., cancelled) influence of the variation in the tension of each of the plurality of main ropes 16. This can reduce a decrease in the vibration damping performance due to variation in the tension of each of the plurality of main ropes 16. Further, the robustness of the vibration damping performance of the vibration damping device 100 against variation in the tension of each of the plurality of main ropes 16 improves.

Further, the restraining member 51 is fixed to each of the plurality of main ropes 16. Accordingly, the restraining member 51 is configured with a simple structure, such as a block-like member.

Figure 23B:
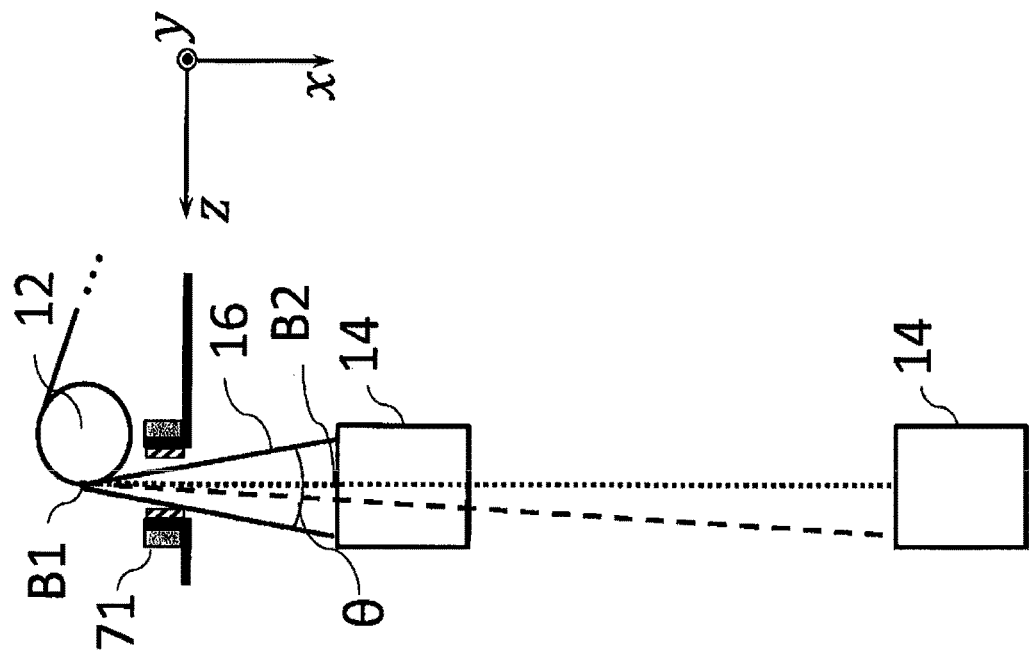
FIG. 23B is a view illustrating the relation between the position of the car of the elevator apparatus according to Embodiment 2 and the fleet angle.
Figure 23A:
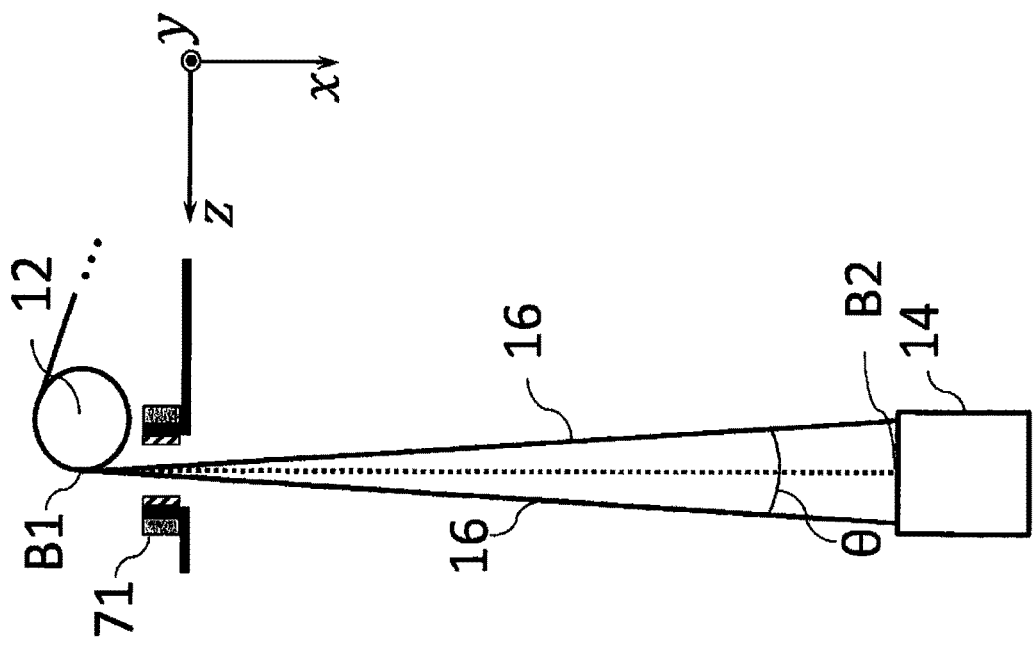
FIG. 23A is a view illustrating the relation between the position of the car of the elevator apparatus according to Embodiment 2 and the fleet angle.

The influence of the position of the car 14 will be described with reference to FIGS. 23. FIG. 23A illustrates a state where the car 14 is stopped at the bottom floor. FIG. 23B illustrates a state where the car 14 is stopped at the top floor.

As illustrated in FIG. 23A, when the elevator apparatus 11 includes a plurality of main ropes 16, for example, the main ropes 16 are attached to the car 14 at a plurality of different positions. Therefore, the plurality of main ropes 16 are stretched at a fleet angle θ from the end B1 to the car 14.

As illustrated in FIG. 23B, the fleet angle θ changes depending on the distance between the car 14 and the traction machine 12. The distance between the car 14 and the traction machine 12 is the shortest when the car 14 is stopped at the top floor. At this time, the fleet angle θ is the largest. When the fleet angle θ changes, the distance between the plurality of main ropes 16 spreading from the end B1 at the fleet angle θ and the negative stiffness portion 71 will also change. Even when the main ropes 16 are not vibrating, there may be cases where the horizontal positions of the main ropes 16 as viewed from the negative stiffness portion 71 change. At this time, if the moving quantity of the main ropes 16 in the horizontal direction is large, the main ropes 16 may come into contact with the permanent magnets 24 of the negative stiffness portion 71.

Figure 24:
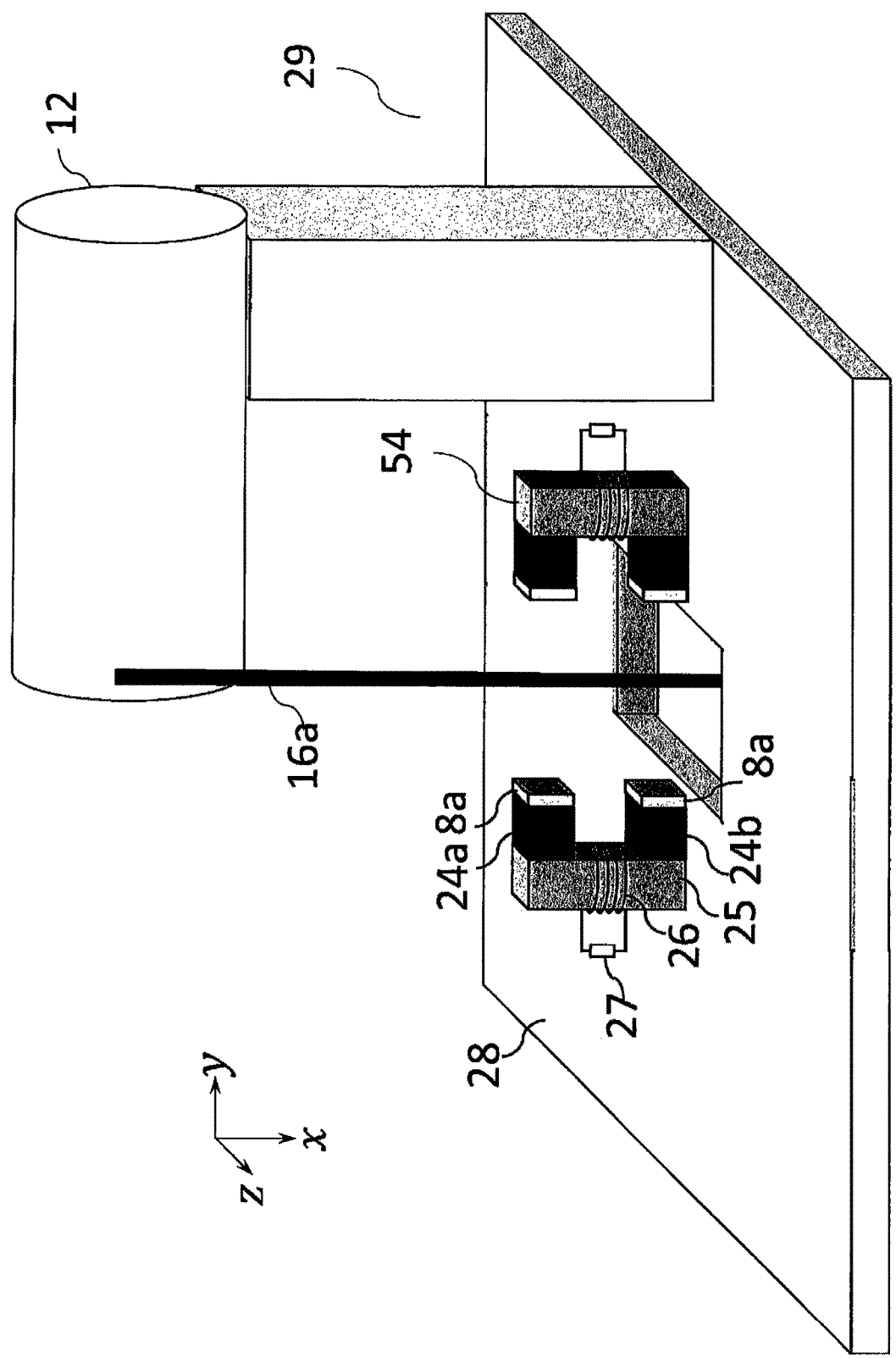
FIG. 24 is a perspective view of the vibration damping device according to Embodiment 2.

FIG. 24 is a view illustrating the vibration damping device 100 when the car 14 is stopped at the bottom floor. In FIG. 24, the main rope 16a is at the equilibrium position. At this time, the main rope 16a passes through the center of the rope duct 28a. In such a state, the fleet angle θ is the smallest.

Figure 25:
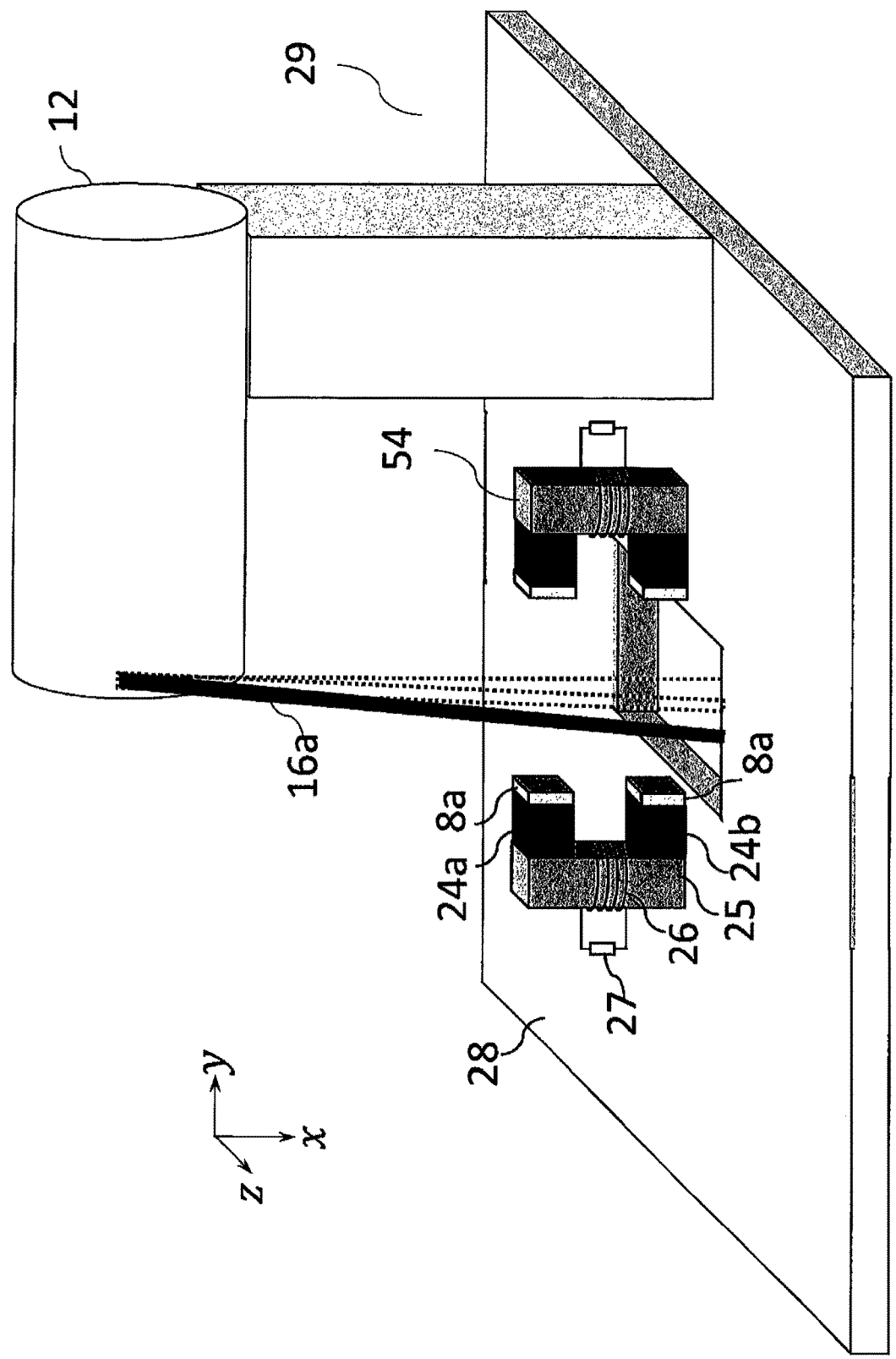
FIG. 25 is a perspective view of the vibration damping device according to Embodiment 2.

FIG. 25 is a view illustrating the vibration damping device 100 when the car 14 is stopped at the top floor. In FIG. 25, the main rope 16a is at the equilibrium position. The main rope 16a is stretched between the traction machine 12 and the car 14 at a fleet angle θ larger than that when the car 14 is at the bottom floor. At this time, the main rope 16a is located closer to the permanent magnets 24 of the negative stiffness portion 71 than when the car 14 is stopped at the bottom floor. In addition, the permanent magnets 24 further attract the main rope 16 with a force stronger than that when the car 14 is stopped at the bottom floor. Accordingly, the allowance for the main rope 16a between the equilibrium position and the first displacement becomes smaller. This may result in a smaller range of displacement of the main rope 16 whose vibration is controlled by the vibration damping device 100 with a change in the fleet angle θ along with a change in the position of the car 14.

Figure 26:
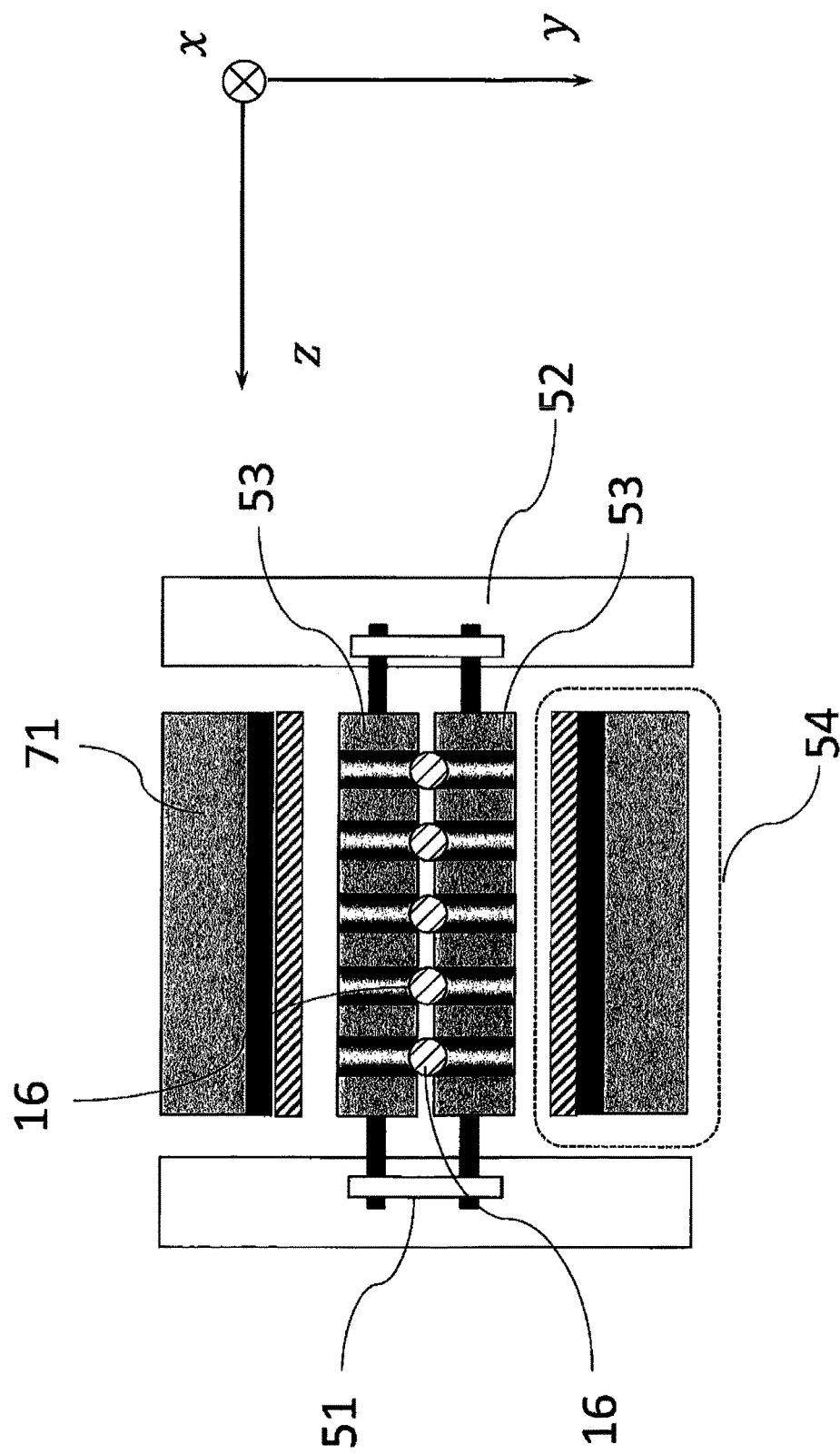
FIG. 26 is a top view of the vibration damping device according to Embodiment 2.
Figure 27:
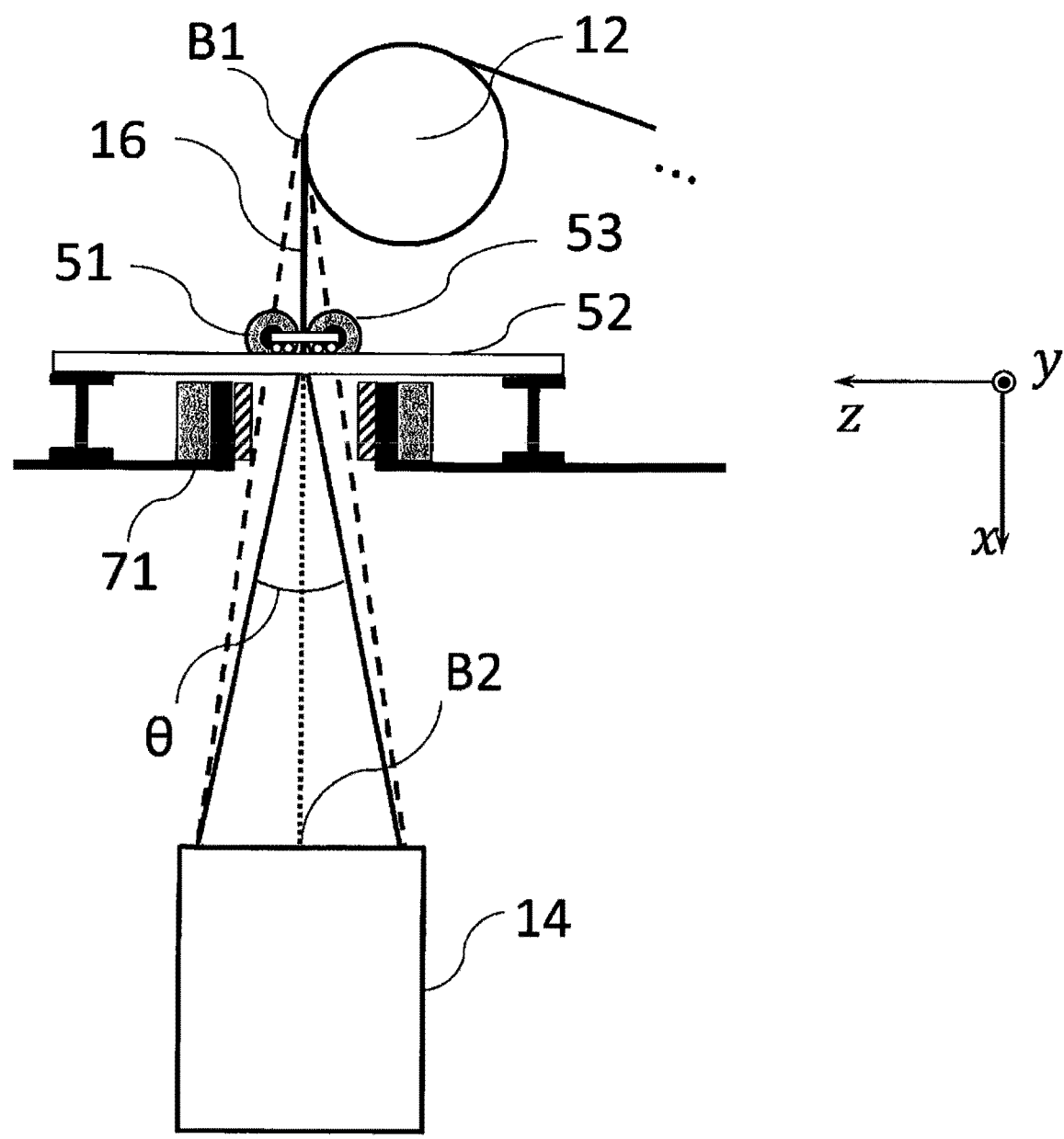
FIG. 27 is a side view of the vibration damping device according to Embodiment 2.

Next, an example of the vibration damping device 100 that suppresses the influence of the fleet angle θ will be described with reference to FIGS. 26 and 27. FIG. 26 is a top view of the vibration damping device 100. FIG. 27 is a side view of the vibration damping device 100. A plurality of main ropes 16 are aligned in the horizontal direction. The plurality of main ropes 16 are arranged in the direction of the rotation axis of the traction machine 12, for example.

As illustrated in FIG. 26, the vibration damping device 100 includes a restraining member 51 and a base 52. The vibration damping device 100 is provided in the machine room 29, for example.

The restraining member 51 includes a pair of rollers 53. The rotation axis of each of the pair of rollers 53 is oriented in the direction parallel with the direction in which the plurality of main ropes 16 are arranged. The pair of rollers 53 contact each of the plurality of main ropes 16 from both sides thereof in the direction perpendicular to the rotation axes. Each of the pair of rollers 53 has groove-like guides formed on the side face thereof so as to keep a constant distance between each of the plurality of main ropes 16 in the horizontal direction.

As illustrated in FIG. 27, the base 52 is provided so as to cover the negative stiffness portion 71 from above. The upper face of the base 52 is a horizontal plane.

The restraining member 51 is provided on the base 52. The restraining member 51 is provided on the upper face of the base 52 so as to be freely displaced in the horizontal plane in the direction perpendicular to the direction in which the plurality of main ropes 16 are arranged.

As described above, when the plurality of main ropes 16 are aligned in the horizontal direction, the restraining member 51 includes the pair of rollers 53. The pair of rollers 53 each have a rotation axis parallel with the direction in which the plurality of main ropes 16 are arranged. The pair of rollers 53 contact each of the plurality of main ropes 16 from both sides thereof in the direction perpendicular to the rotation axes. The restraining member 51 squeezes each of the plurality of main ropes 16 with the pair of rollers 53 above the displacement amplifier 7. Accordingly, the positions (i.e., moving quantities) of the main ropes 16 change from the positions indicated by the dashed lines to the positions indicated by the solid lines. This can avoid a contact between the vibration damping device 100 and the main ropes 16. Further, since the influence of the position of the car 14 on the distance between the vibration damping device 100 and the main ropes 16 is reduced, fluctuation of the vibration damping effect of the vibration damping device 100 due to the position of the car 14 is also reduced. Thus, the vibration damping device 100 can stably control vibration of the elevator ropes.

Figure 28:
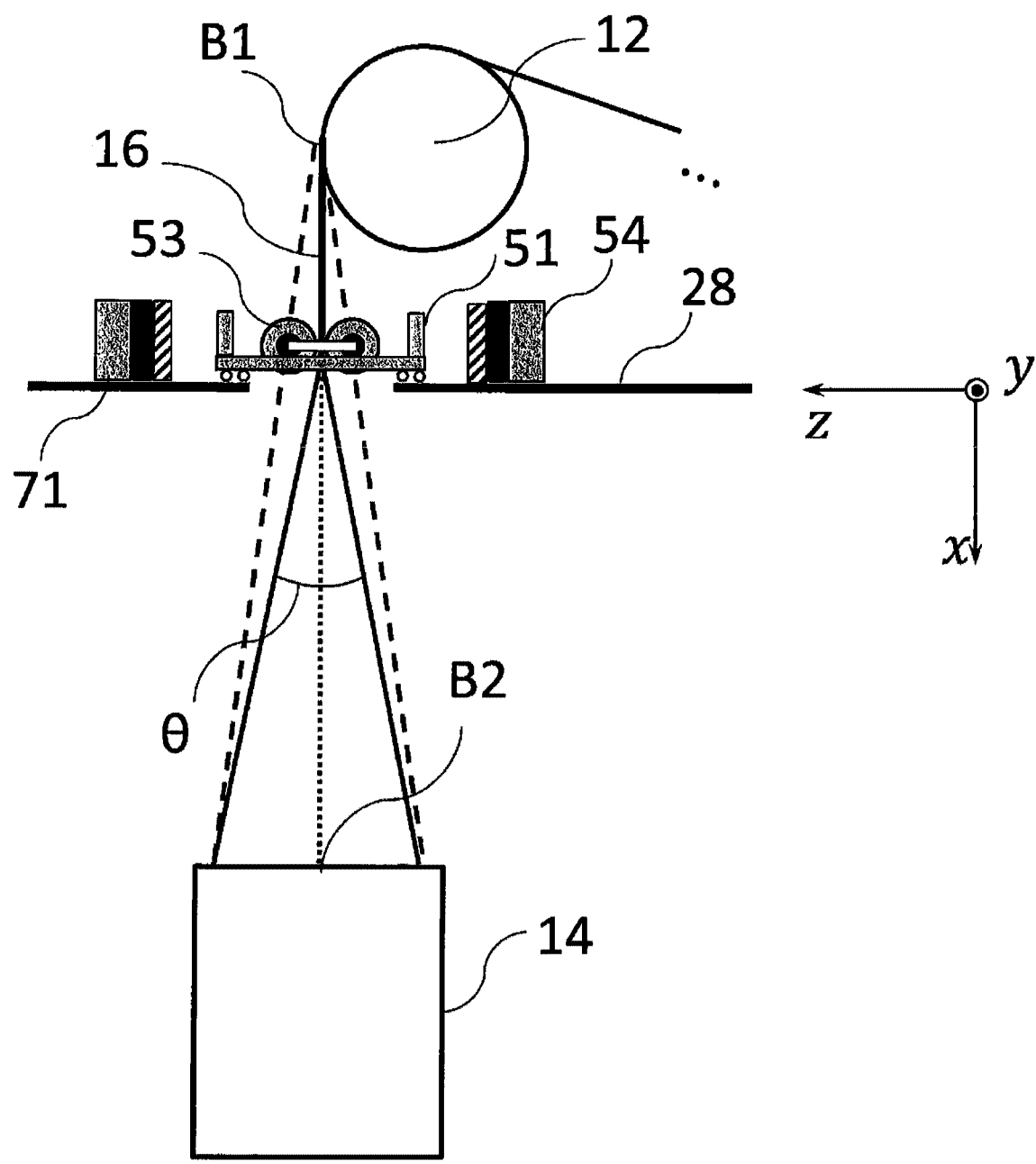
FIG. 28 is a side view of the vibration damping device according to Embodiment 2.

Next, another example of the vibration damping device 100 will be described with reference to FIG. 28. In this example, the restraining member 51 is provided between the pair of magnet units 54. The restraining member 51 is provided on the machine room floor 28. The restraining member 51 is provided on the machine room floor 28 so as to be freely displaced in the horizontal plane in the direction perpendicular to the direction in which the plurality of main ropes 16 are arranged. The restraining member 51 has magnetic bodies on both sides thereof in the direction in which it can be displaced on the machine room floor 28.

Accordingly, the installation space for the vibration damping device 100 in the vertical direction can be suppressed. Further, the distance between the restraining member 51 and each magnet unit 54 does not depend on the position of the car 14 at the equilibrium position. Therefore, the vibration damping performance of the vibration damping device 100 is stabilized.

Figure 29:
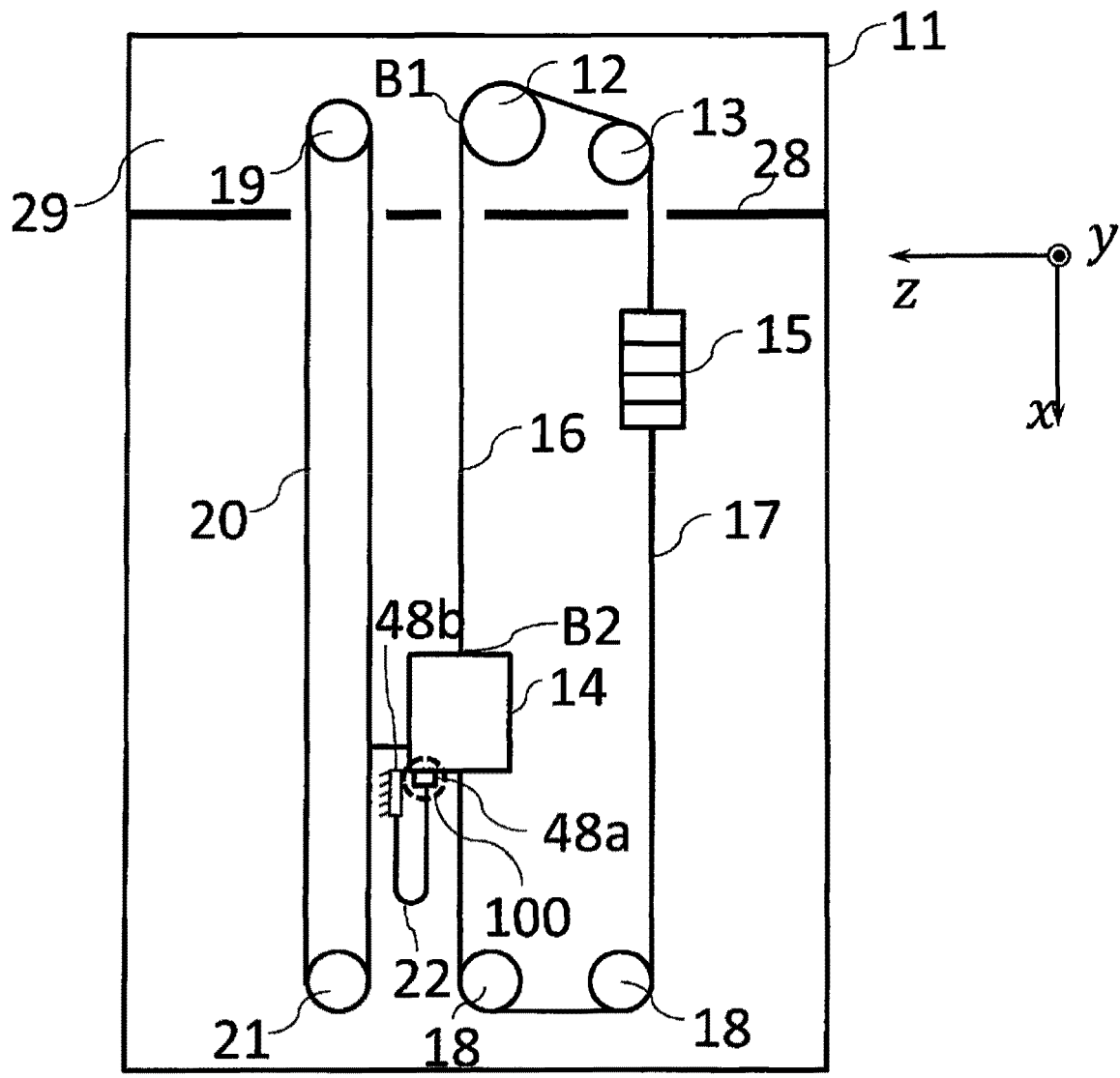
FIG. 29 is a schematic view of the elevator apparatus according to Embodiment 2.

FIG. 29 is a view illustrating an example of the vibration damping device 100 that controls vibration of the traveling cable 22. One end of the traveling cable 22 is connected to a hoistway-side terminal 48b on the inner wall of the hoistway. The car-side terminal at the other end of the traveling cable 22 is connected to the car 14. The portion of the traveling cable 22 on the side connected to the car 14 is fixed thereto via a fixing portion 48a. The fixing portion 48a is provided at the bottom of the car 14, for example. If the car-side terminal of the traveling cable 22 is connected to the top of the car 14, it may be routed to the fixing portion 48a at the bottom of the car 14.

Figure 30B:
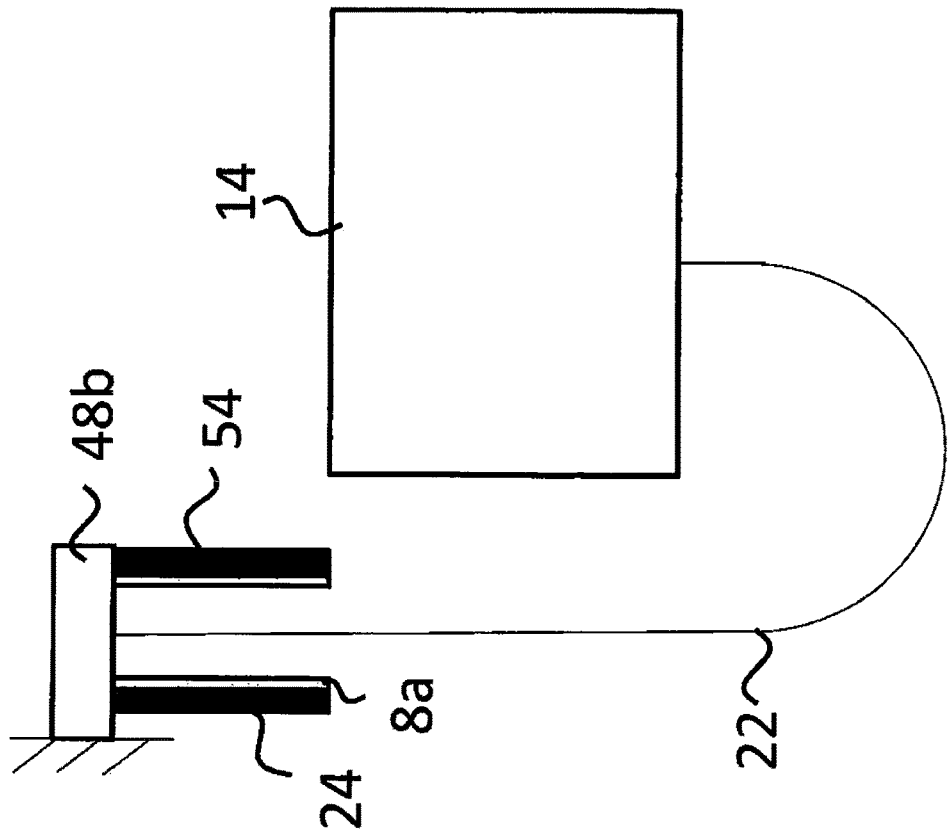
FIG. 30B is a side view of the vibration damping device according to Embodiment 2.
Figure 30A:
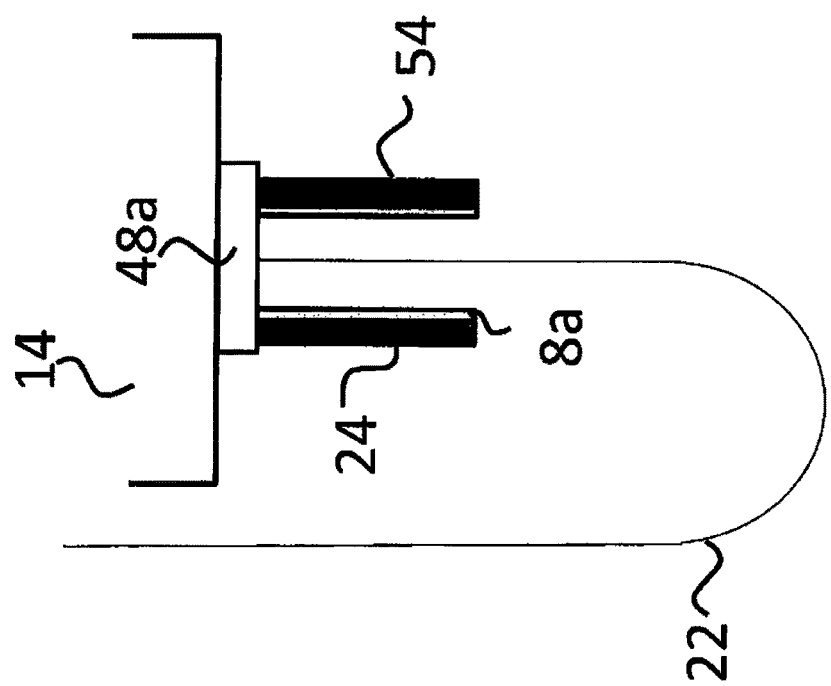
FIG. 30A is a side view of the vibration damping device according to Embodiment 2.

FIG. 30 are views each illustrating an exemplary configuration of the vibration damping device 100 that controls vibration of the traveling cable 22. In FIG. 30A, the vibration damping device 100 is provided on the fixing portion 48a at the bottom of the car 14. The vibration damping device 100 includes the pair of magnet units 54 and the limiting members 8a, for example. When the traveling cable 22 is formed of a magnetic material, such as iron, vibration of the traveling cable 22 is controlled with the magnetic forces received from the magnet units 54. Meanwhile, when the traveling cable 22 is formed of a non-magnetic material, such as copper, for example, the traveling cable 22 may be covered with a ferromagnetic material, for example. Accordingly, vibration of the traveling cable 22 is controlled with the magnetic forces received from the magnet units 54 by the ferromagnetic material.

The vibration damping device 100 may also control vibration of the traveling cable 22 using an unstable link mechanism, such as a toggle link mechanism, for example. In such a case, the vibration damping device 100 may include a base on which the link mechanism is mounted at a position below the fixing portion 48a. A force applied to the link mechanism may be any of the weight of a weight, the elastic force of a spring, or a magnetic force, for example.

As illustrated in FIG. 30B, the vibration damping device 100 may also be provided on the hoistway-side terminal 48b. Alternatively, the vibration damping device 100 may be provided on each of the fixing portion 48a and the hoistway-side terminal 48b.

As described above, the vibration damping device 100 is directed to control vibration of the traveling cable 22, which is connected to the car 14 of the elevator, as a target elevator rope. The displacement amplifier 7 is arranged along any position in the longitudinal direction of the traveling cable 22. The displacement amplifier 7 amplifies a displacement of the traveling cable 22. The limiting members 8 control the displacement amplification performed by the displacement amplifier 7 such that the displacement of the traveling cable 22 amplified by the displacement amplifier 7 does not become greater than the first displacement. Thus, vibration of the traveling cable 22 is reduced.

Embodiment 3

The present embodiment will describe the vibration damping device 100 that controls vibration of an elevator rope wound on one or more sheaves of an elevator and folded thereover.

Figure 31:
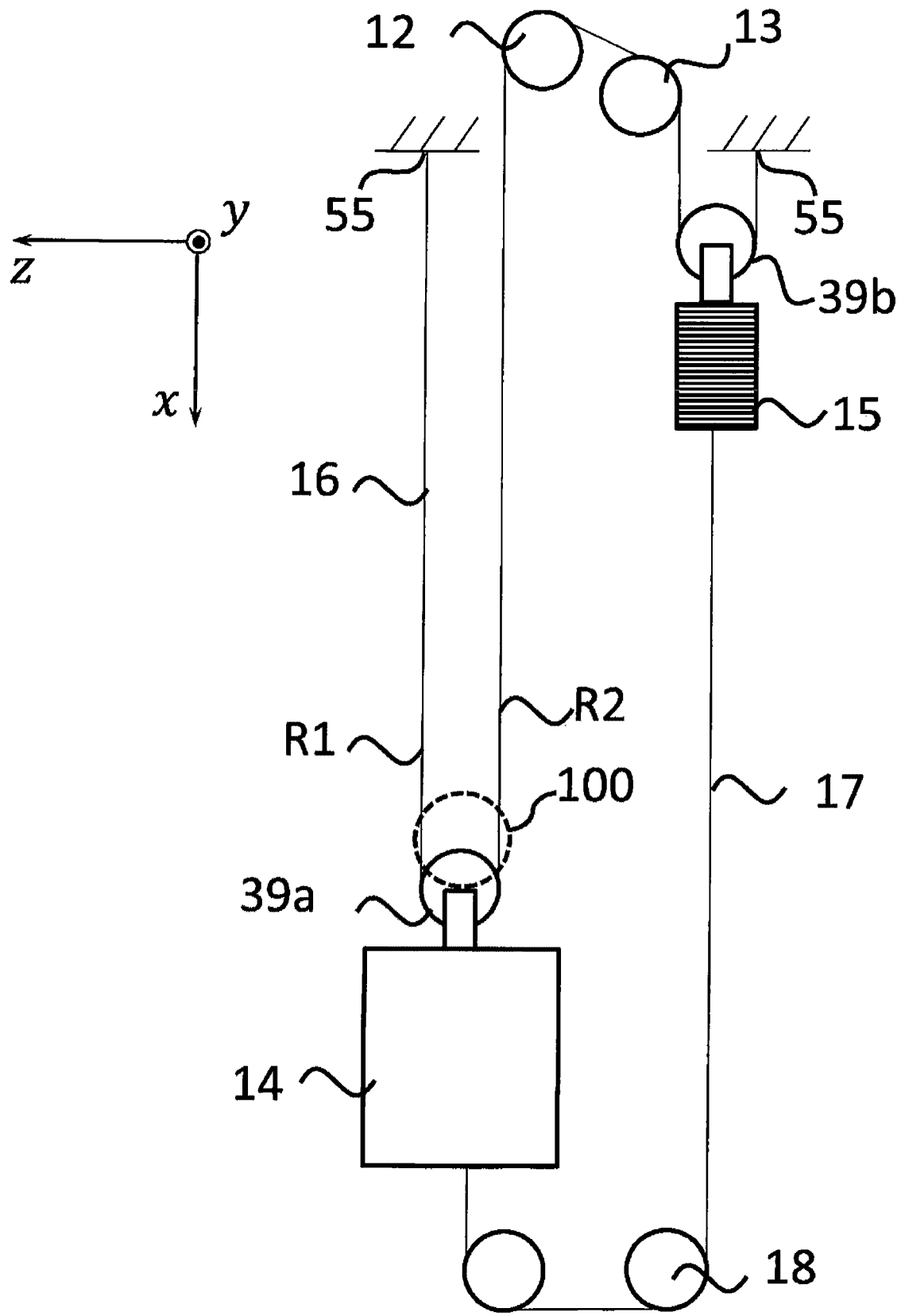
FIG. 31 is a configuration view of the elevator apparatus according to Embodiment 3.

FIG. 31 is a configuration view of an elevator apparatus according to Embodiment 3. FIG. 31 schematically illustrates the elevator apparatus 11 in a state where there is no building sway and thus no vibration is generated. In this example, the elevator apparatus 11 is a 2:1 roping elevator.

The elevator apparatus 11 includes a traction machine 12 and a deflector sheave 13. A car 14 for carrying passengers has a car suspension sheave 39a at the top. A counterweight 15 has a counterweight suspension sheave 39b at the top. Both ends of a main rope 16 are fixed to the top of the hoistway with rope supports 55. The main rope 16 is wound on the car suspension sheave 39a, the traction machine 12, the deflector sheave 13, and the counterweight suspension sheave 39b in this order in a region from the rope support 55 on the side of the car 14 to the rope support 55 on the side of the counterweight 15.

Figure 32:
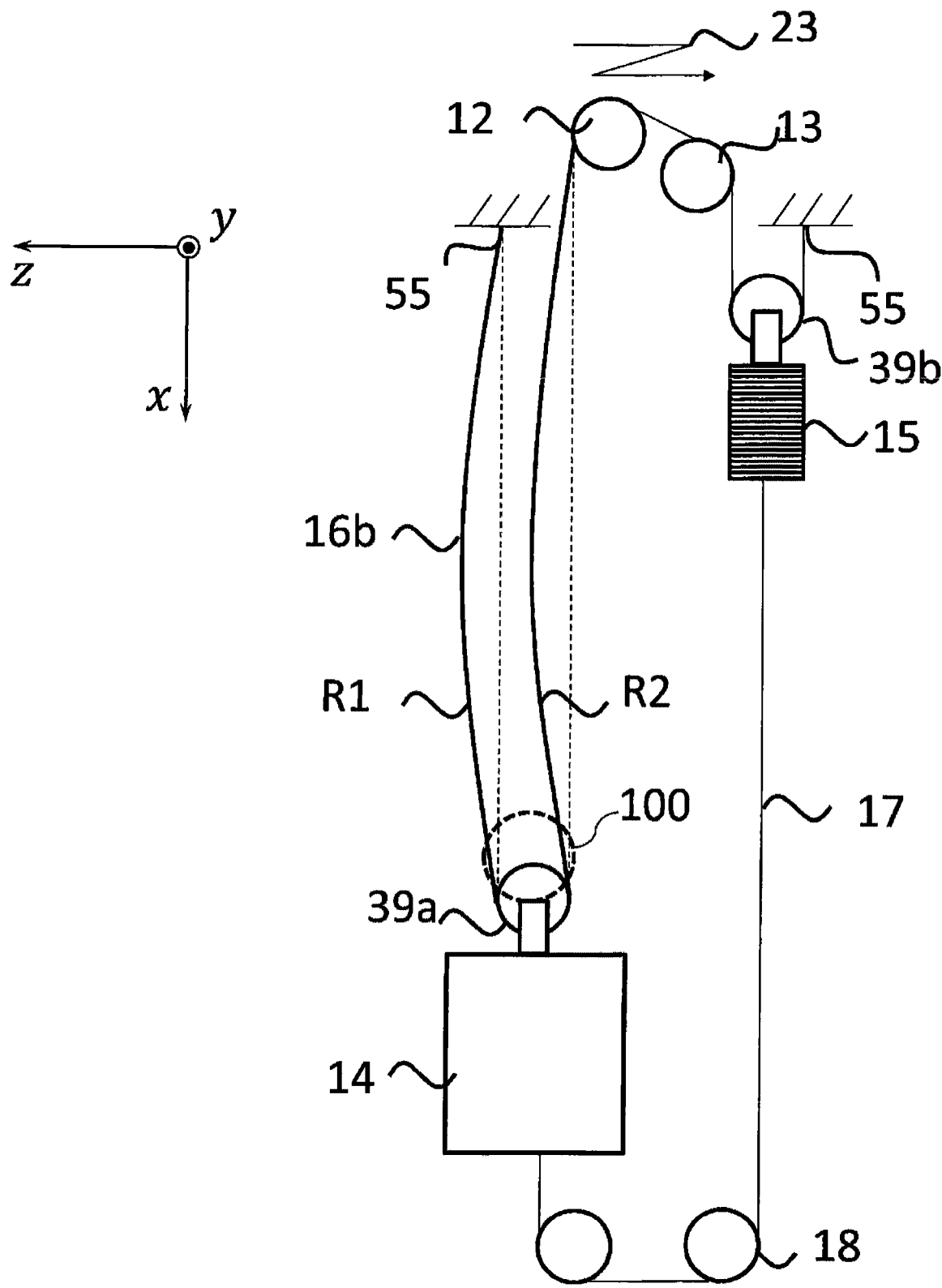
FIG. 32 is a configuration view of the elevator apparatus according to Embodiment 3.

FIG. 32 is a configuration view of the elevator apparatus according to Embodiment 3. FIG. 32 illustrates a state where building sway 23 occurs in the elevator apparatus 11 due to turbulence, such as earthquakes or winds, for example. When the building sway 23 occurs, the traction machine 12, the deflector sheave 13, and the governor 19 (not illustrated in FIG. 32) fixed to the building also sway in a similar manner. Accordingly, the main rope 16, the compensating rope 17, the governor rope 20, and the traveling cable 22, which are the elevator ropes, are vibrated. At this time, if the vibration frequency of the building sway 23 coincides with the natural frequency of any of the elevator ropes, the sway of the elevator rope increases due to the resonance phenomenon. FIG. 32 exemplarily illustrates a state where the natural frequency of the main rope 16b coincides with the vibration frequency of the building sway, and thus a resonance phenomenon occurs on the main rope 16b.

Figure 33:
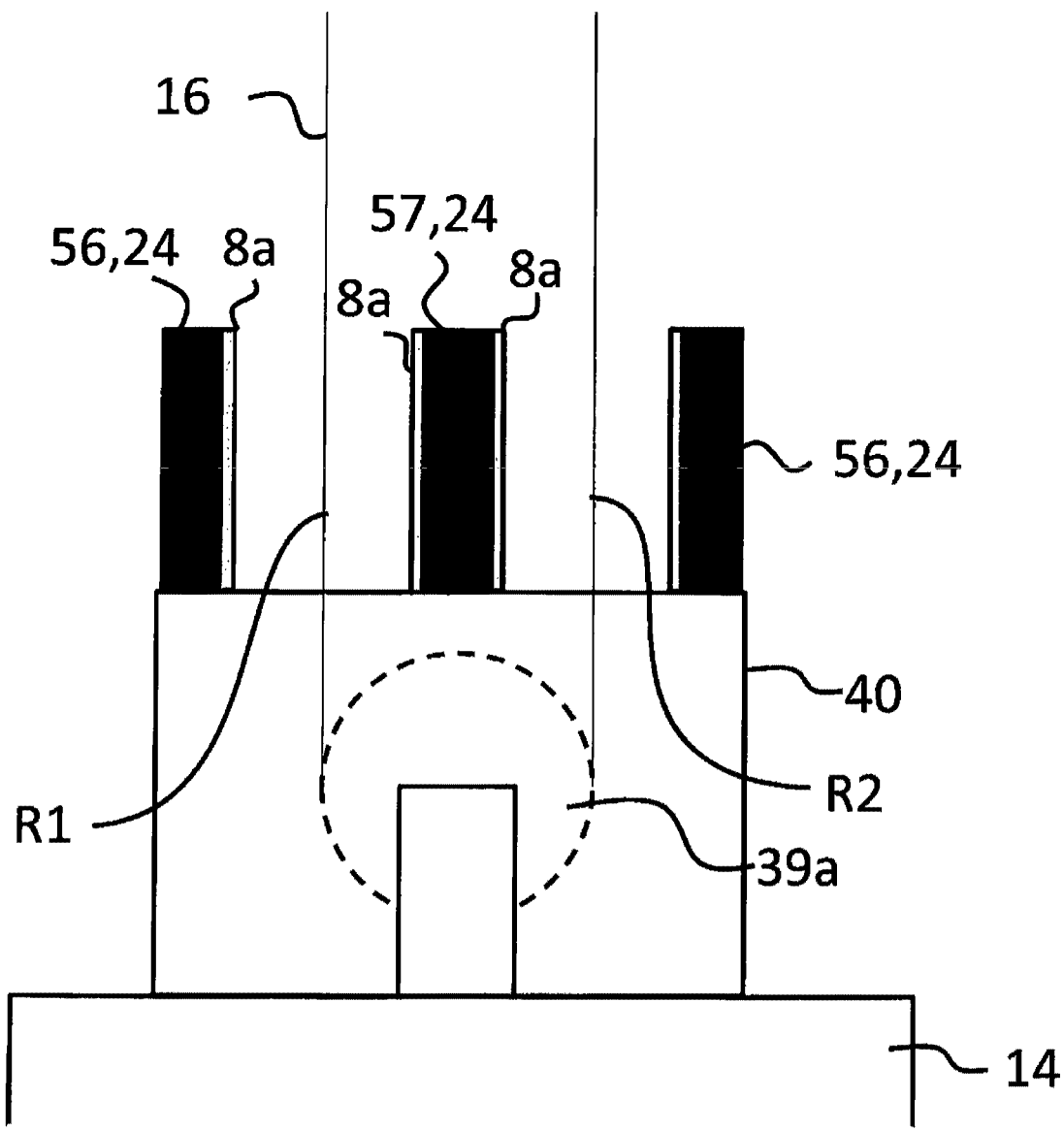
FIG. 33 is a side view of the vibration damping device according to Embodiment 3.

FIGS. 33 and 34 each illustrate the vibration damping device 100 provided on a housing 40 of the car suspension sheave 39a. FIGS. 33 and 34 are side views of the vibration damping device according to Embodiment 3.

As illustrated in FIG. 33, the main rope 16 is wound on the car suspension sheave 39a in a region between a first portion R1 and a second portion R2 of the main rope 16. The first portion R1 of the main rope 16 is a portion drawn from the car suspension sheave 39a that is a sheave. The second portion R2 of the main rope 16 is a portion drawn from the car suspension sheave 39a. The second portion R2 is drawn from the side opposite to the first portion R1. The first portion R1 and the second portion R2 are drawn in directions in parallel with each other.

The vibration damping device 100 includes the displacement amplifier 7 and the limiting members 8a.

In the present embodiment, the displacement amplifier 7 is a passive device. The displacement amplifier 7 is arranged around a region from the first portion R1 to the second portion R2 of the main rope 16. The displacement amplifier includes a pair of outer magnet units 56 and an inner magnet unit 57.

The displacement amplifier 7 may include at least one of the pair of outer magnet units 56 or the inner magnet unit 57. The outer magnet units 56 and the inner magnet unit 57 may be arranged at different heights along the longitudinal direction of the main rope 16. In addition, more than one outer magnet unit 56 and more than one inner magnet unit 57 may be arranged along the longitudinal direction of the main rope 16.

Each of the pair of outer magnet units 56 is a single permanent magnet, for example. The pair of outer magnet units 56 are arranged on the outer side of the first portion R1 and the second portion R2 of the main rope 16 in the direction in which the first portion R1 and the second portion R2 are connected horizontally. The pair of outer magnet units 56 are arranged with their magnetic poles facing each other.

The inner magnet unit 57 is a single permanent magnet, for example. The inner magnet unit 57 is arranged on the inner side of the first portion R1 and the second portion R2 of the main rope 16. One of the magnetic poles of the inner magnet unit 57 faces one of the magnetic poles of one of the pair of outer magnet units 56 across the first portion R1 of the main rope 16. The other magnetic pole of the inner magnet unit 57 faces one of the magnetic poles of the other of the pair of outer magnet units 56 across the second portion R2 of the main rope 16.

The limiting members 8a are a set of non-magnetic bodies, for example. Some of the non-magnetic bodies of the limiting members 8a are provided between the magnetic poles of the pair of outer magnet units 56 and the main rope 16. The others of the non-magnetic bodies of the limiting members 8a are provided between the magnetic poles of the inner magnet unit 57 and the main rope 16. The thickness of the non-magnetic body of each limiting member 8a is set so that the main rope 16 will come into contact with the limiting member 8a when the main rope 16 is displaced by the first displacement, for example.

Figure 34B:
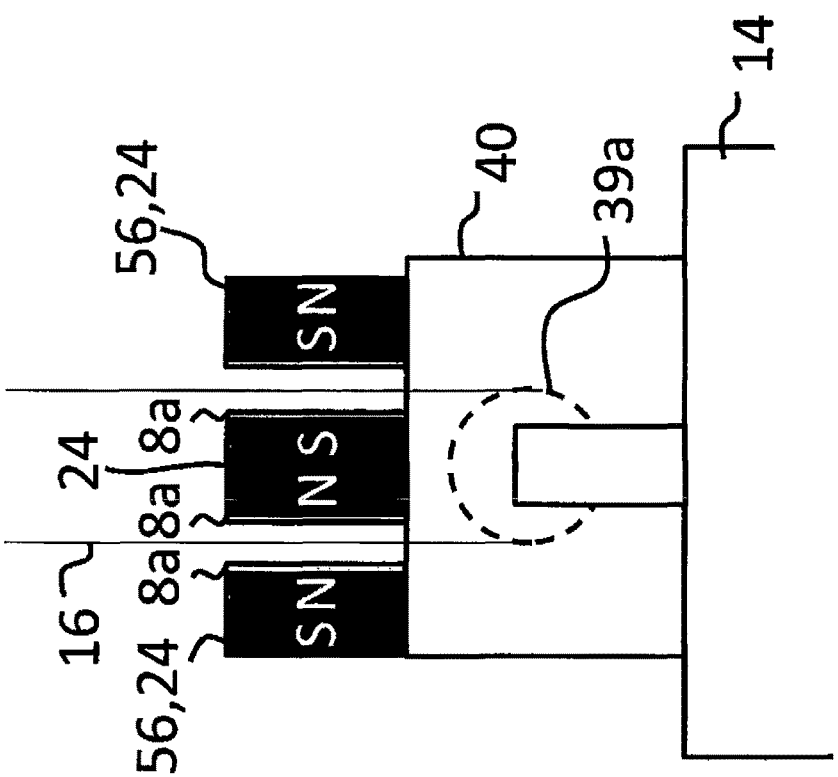
FIG. 34B is a side view of the vibration damping device according to Embodiment 3.
Figure 34A:
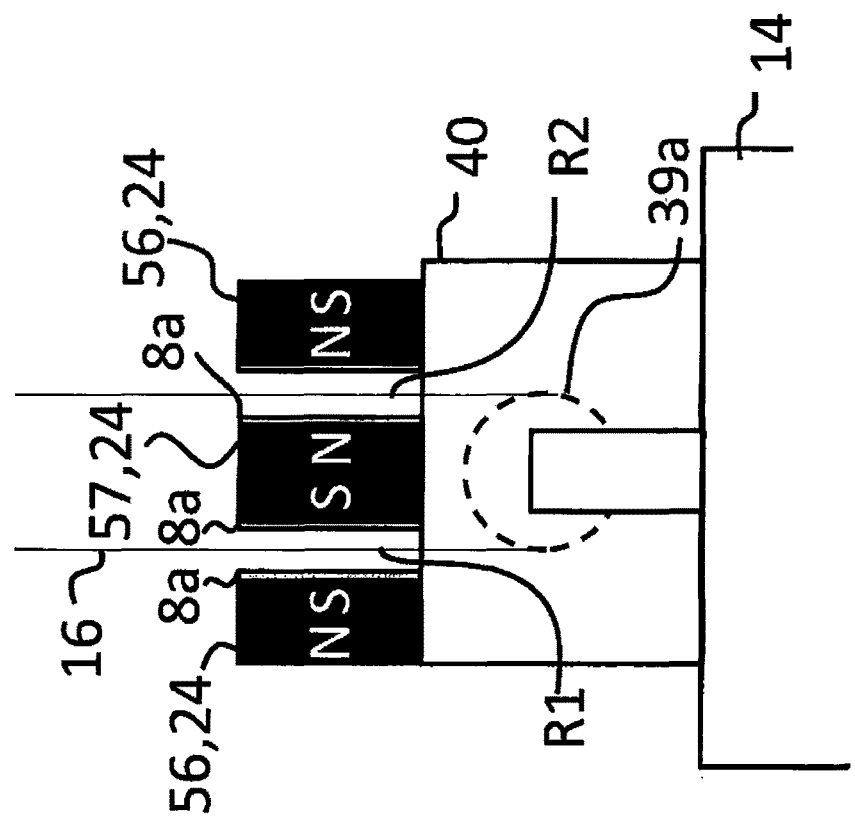
FIG. 34A is a side view of the vibration damping device according to Embodiment 3.

As illustrated in FIG. 34A, the inner magnet unit 57 has the S-pole facing the first portion R1 of the main rope 16. The outer magnet unit 56 that faces the S-pole of the inner magnet unit 57 has the S-pole facing the first portion R1 of the main rope 16. The inner magnet unit 57 has the N-pole facing the second portion R2 of the main rope 16. The outer magnet unit 56 that faces the N-pole of the inner magnet unit 57 has the N-pole facing the second portion R2 of the main rope 16. That is, the inner magnet unit 57 is arranged such that its S-pole faces the S-pole of one of the pair of outer magnet units 56 and its N-pole faces the N-pole of the other of the pair of outer magnet units 56. As illustrated in FIG. 34(b)-FIG. 34B, the pair of outer magnet units 56 and the inner magnet unit 57 may be arranged with the S-poles and the N-poles exchanged.

When the main rope 16 is vibrated upon occurrence of the building sway 23, a displacement of the first portion R1 of the main rope 16 due to the vibration is amplified by a magnetic field between one of the pair of outer magnet units 56 and the inner magnet unit 57. Meanwhile, a displacement of the second portion R2 of the main rope 16 due to the vibration is amplified by a magnetic field between the other of the pair of outer magnet units 56 and the inner magnet unit 57. The main rope 16 comes into contact with the limiting members 8a when displaced by the first displacement. The limiting members 8a control the displacement amplification performed by the displacement amplifier 7 such that the displacement of the first portion R1 amplified by the displacement amplifier 7 does not become greater than the first displacement. The limiting members 8a also control the displacement amplification performed by the displacement amplifier 7 such that the displacement of the second portion R2 amplified by the displacement amplifier 7 does not become greater than the first displacement.

As described above, the elevator apparatus 11 includes the vibration damping device 100. The vibration damping device 100 reduces vibration of an elevator rope wound on the sheave of the elevator and folded thereover. The elevator rope is, for example, the main rope 16. The vibration damping device 100 includes the displacement amplifier 7 and the limiting members 8a. The displacement amplifier 7 is arranged around a region from the first portion R1 to the second portion R2 of the main rope. The first portion R1 of the main rope 16 is a portion drawn from the sheave. The second portion R2 of the main rope 16 is a portion drawn from the sheave and on the side opposite to the first portion R1. The first portion R1 and the second portion R2 are drawn in directions in parallel with each other. The displacement amplifier 7 amplifies a displacement of each of the first portion R1 and the second portion R2 of the main rope 16. The displacement amplifier 7 amplifies a displacement of each of the first portion R1 and the second portion R2 of the main rope 16. The limiting members 8a control the displacement amplification performed by the displacement amplifier 7 such that the displacement of the first portion R1 or the second portion R2 amplified by the displacement amplifier 7 does not become greater than the first displacement. The first displacement is the displacement of the main rope 16 by which the main rope 16 is not allowed to return to the equilibrium position of the vibration. Accordingly, it is possible to stably increase a displacement due to vibration of the main rope 16 at the position where the displacement amplifier 7 is provided, and thus increase the vibration damping effect.

The displacement amplifier 7 includes the pair of outer magnet units 56 and the inner magnet unit 57. The pair of outer magnet units 56 are arranged on the outer side of the first portion R1 and the second portion R2 of the main rope 16 in the first direction in which the first portion R1 and the second portion R2 are connected horizontally. The pair of outer magnet units 56 are arranged with their magnetic poles facing each other. The inner magnet unit 57 is arranged on the inner side of the first portion R1 and the second portion R2. The inner magnet unit 57 is arranged such that both magnetic poles face the pair of outer magnet units 56. The limiting members 8a are a set of non-magnetic bodies arranged between the magnetic poles of the pair of outer magnet units 56 and the main rope 16 and between the opposite magnetic poles of the inner magnet unit 57 and the main rope 16. Each limiting member 8a controls the approach of the main rope 16 to the magnetic pole of each of the pair of outer magnet units 56 and the inner magnet unit 57 so that the main rope 16 does not become close to the magnetic pole beyond the thickness of the limiting member 8a. Therefore, by forming each limiting member 8a thicker than the thickness at which the main rope 16 contact the limiting member 8a when the main rope 16 is displaced by the first displacement, it becomes possible for the vibration damping device 100 to stably control vibration of the main rope 16. The displacement amplifier 7 amplifies a displacement of the main rope 16 without contact. Accordingly, wear of the main rope 16 and the like due to amplification of the displacement can be suppressed. The inner magnet unit 57 amplifies displacements of both the first portion R1 and the second portion R2 of the main rope 16. Accordingly, it is possible to configure the vibration damping device 100 with a smaller number of parts than providing a vibration damping device that individually controls vibration of each of the first portion R1 and the second portion R2 of the main rope 16.

The inner magnet unit 57 is arranged such that its S-pole faces the S-pole of one of the pair of outer magnet units 56 and its N-pole faces the N-pole of the other of the pair of outer magnet units 56. Accordingly, each of the pair of outer magnet units 56 and the inner magnet unit 57 repel each other. Therefore, the gap between each of the pair of outer magnet units 56 and the inner magnet unit 57 is not closed by the magnetic force. Thus, it is not necessary to firmly fix the pair of outer magnet units 56 or the inner magnet unit 57 considering an attraction force that would act due to the magnetic force.

Figure 35:
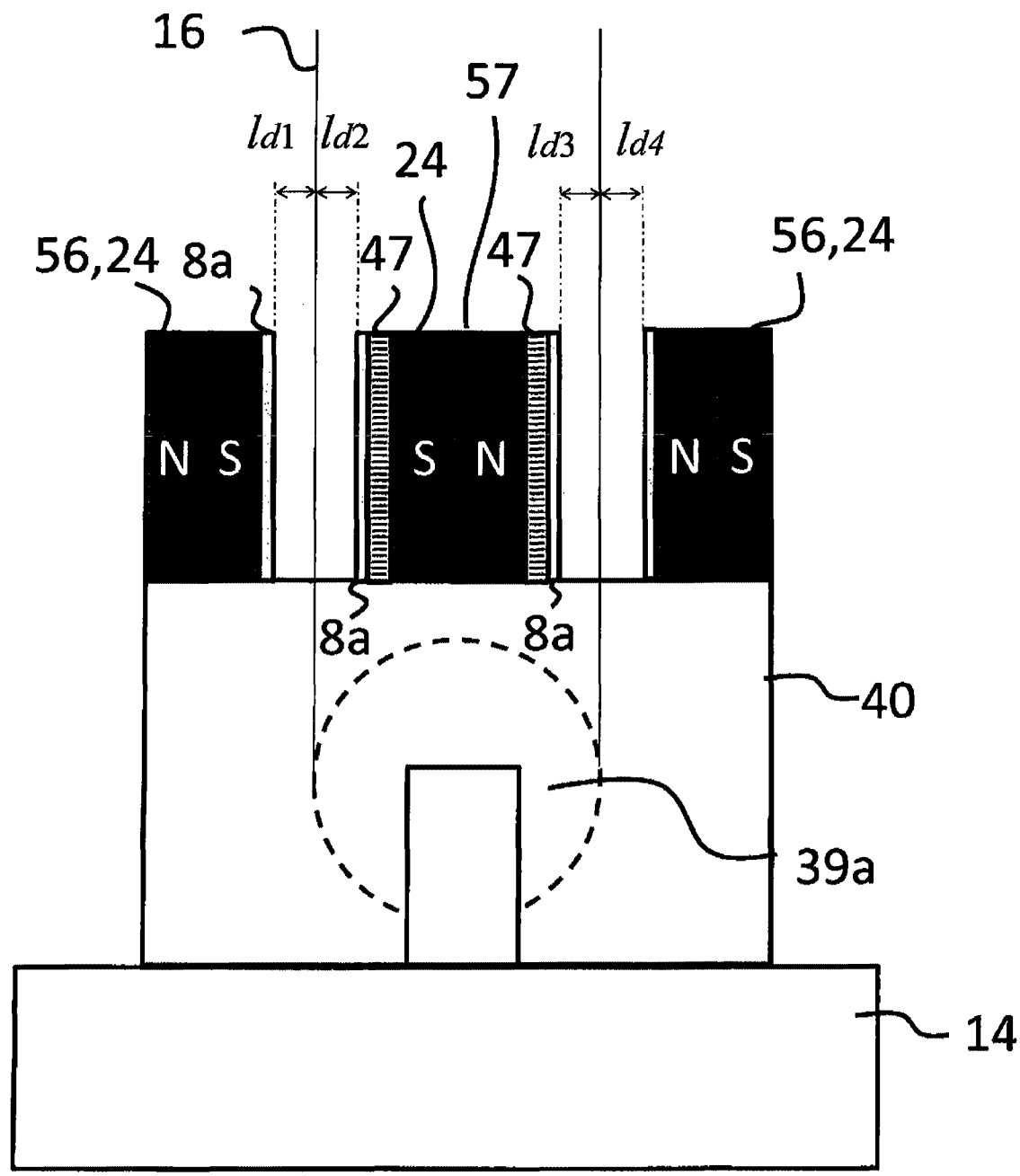
FIG. 35 is a side view of the vibration damping device according to Embodiment 3.

FIG. 35 is a side view of a vibration damping device according to Embodiment 3. FIG. 35 illustrates another example of the vibration damping device 100. To efficiently amplify transverse displacement of the main rope 16, it is preferable that the main rope 16 be arranged at the center of the gap between each of the pair of outer magnet units 56 and the inner magnet unit 57. That is, the dimensions of the gaps preferably satisfy the conditions: $l_{d1}=l_{d2}$ and $l_{d3}=l_{d4}$. Herein, $l_{d1}$ is the dimension of the gap between the first portion R1 of the main rope 16 and the magnetic pole of the outer magnet unit 56 facing the first portion R1. $l_{d2}$ is the dimension of the gap between the first portion R1 of the main rope 16 and the magnetic pole of the inner magnet unit 57 facing the first portion R1. $l_{d3}$ is the dimension of the gap between the second portion R2 of the main rope 16 and the magnetic pole of the inner magnet unit 57 facing the second portion R2. $l_{d4}$ is the dimension of the gap between the second portion R2 of the main rope 16 and the magnetic pole of the outer magnet unit 56 facing the second portion R2. Herein, the pair of outer magnet units 56 and the inner magnet unit 57 may also be arranged such that the dimensions of the gaps satisfy the condition: $l_{d1}=l_{d2}=l_{d3}=l_{d4}$.

For example, the inner magnet unit 57 includes a permanent magnet 24 and a pair of magnetic bodies 47. The pair of magnetic bodies 47 are arranged on the respective magnetic poles of the permanent magnet 24. Herein, the magnetic poles of the inner magnet unit 57 are the planes of the pair of magnetic bodies 47 on the side opposite to the permanent magnet 24. The thickness of each of the pair of magnetic bodies 47 is set to satisfy the conditions: $l_{d1}=l_{d2}$ and $l_{d3}=l_{d4}$ according to the diameter of the car suspension sheave 39a and the length of the permanent magnet 24, for example. The limiting members 8a are provided on the magnetic poles of the inner magnet unit 57. The magnetic bodies 47 are arranged between the magnetic poles of the permanent magnet 24 and the respective limiting members 8a.

As described above, the inner magnet unit 57 is arranged at a position where the width of the gap between the inner magnet unit 57 and one of the outer magnet units 56 facing each other across the first portion R1 of the main rope 16 is equal to the width of the gap between the inner magnet unit 57 and the other outer magnet unit 56 facing each other across the second portion R2 of the main rope 16. Herein, the width of the gap through which the first portion R1 of the main rope 16 passes between one of the outer magnet units 56 and the inner magnet unit 57 is equal to the width of the gap through which the second portion R2 of the main rope 16 passes between the other outer magnet unit 56 and the inner magnet unit 57. Accordingly, a transverse displacement of the main rope 16 is amplified symmetrically on both sides. Thus, the transverse displacement of the main rope 16 is efficiently amplified.

The inner magnet unit 57 includes the permanent magnet 24 and the magnetic bodies 47. The magnetic poles of the permanent magnet 24 are arranged along the first direction in which the first portion and the second portion of the elevator rope are connected horizontally. The magnetic bodies 47 are arranged on the opposite magnetic poles of the permanent magnet 24. The magnetic bodies 47 adjust the length of the inner magnet unit 57 in the first direction. Accordingly, the inner magnet unit 57 can be configured so that a transverse displacement of the main rope 16 is efficiently amplified according to the diameter of the car suspension sheave 39a or the length of the permanent magnet 24, for example.

Figure 36:
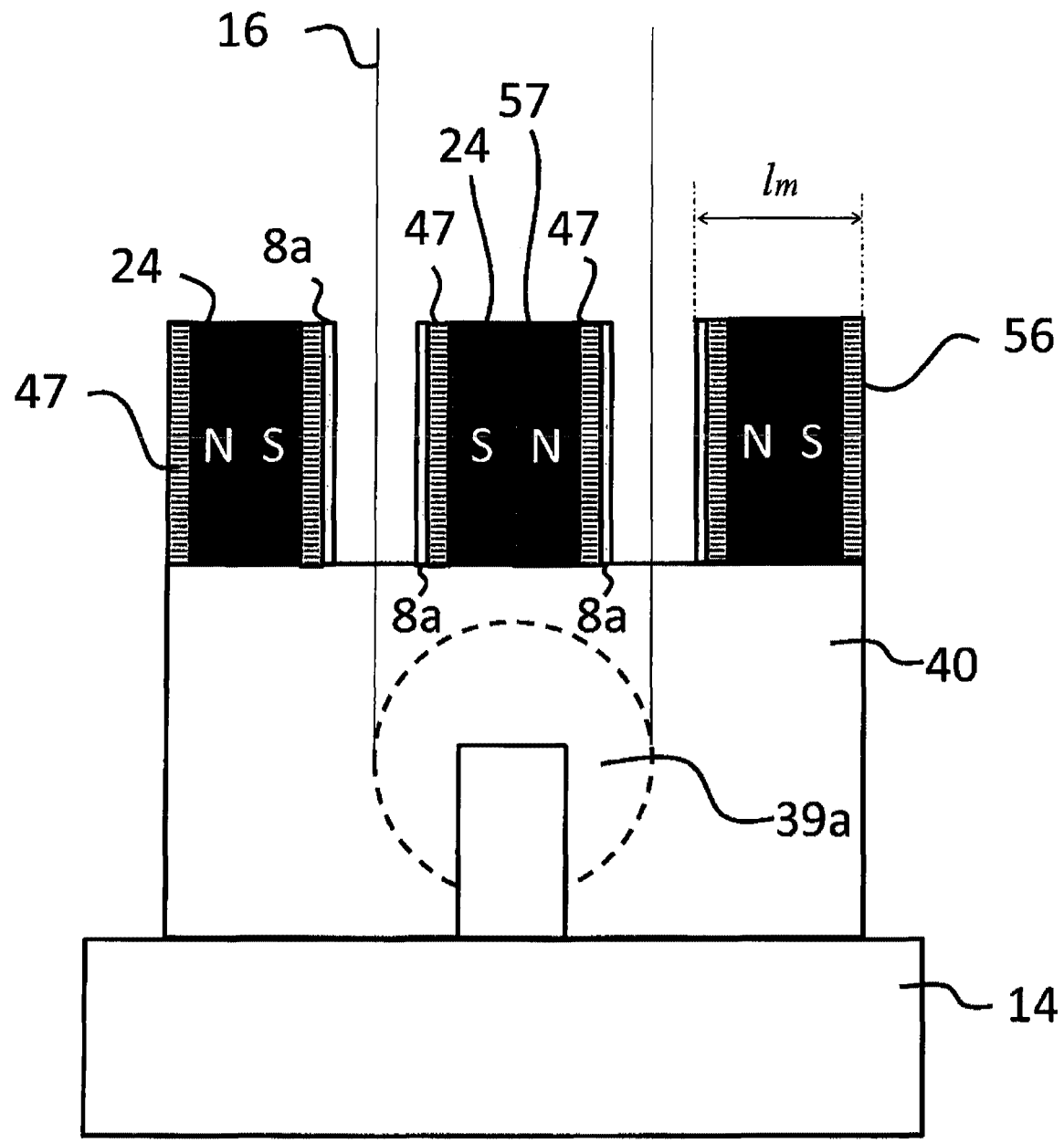
FIG. 36 is a side view of the vibration damping device according to Embodiment 3.

FIG. 36 is a side view of a vibration damping device according to Embodiment 3. FIG. 36 illustrates another example of the vibration damping device 100. To allow a displacement amplification force to effectively act against a transverse displacement of the main rope 16, it is preferable that the magnetomotive forces of the magnet units arranged on both sides of the main rope 16 be equal. Herein, the magnetomotive force of each magnet unit is determined by the length $l_m$ of the magnet unit in the magnetic pole direction. That is, the length of each of the pair of outer magnet units 56 in the magnetic pole direction is preferably equal to the length of the inner magnet unit 57 in the magnetic pole direction.

The inner magnet unit 57 includes a permanent magnet 24 and a pair of magnetic bodies 47. The pair of magnetic bodies 47 are arranged on the respective magnetic poles of the permanent magnet 24. Herein, the magnetic poles of the inner magnet unit 57 are the planes of the pair of magnetic bodies 47 on the side opposite to the permanent magnet 24. The thickness of each of the pair of magnetic bodies 47 is set so that the inner magnet unit 57 has the length $l_m$ in the magnetic pole direction. The limiting members 8a are provided on the respective magnetic poles of the inner magnet unit 57. The magnetic bodies 47 are arranged between the magnetic poles of the permanent magnet 24 and the respective limiting members 8a.

Each of the pair of outer magnet units 56 includes a permanent magnet 24 and a pair of magnetic bodies 47. The pair of magnetic bodies 47 are arranged on the respective magnetic poles of the permanent magnet 24. Herein, the magnetic poles of each of the pair of outer magnet units 56 are the planes of the pair of magnetic bodies 47 on the side opposite to the permanent magnet 24. The thickness of each of the pair of magnetic bodies 47 is set so that the length of each of the pair of outer magnet units 56 in the magnetic pole direction becomes equal to the length $l_m$ of the inner magnet unit 57 in the magnetic pole direction. The limiting member 8a is provided on one of the magnetic poles of each of the pair of outer magnet units 56. One of the magnetic bodies 47 is arranged between one of the magnetic poles of the permanent magnet 24 and the limiting member 8a.

As described above, the length of each of the pair of outer magnet units 56 in the first direction in which the first portion and the second portion of the elevator rope are connected horizontally is equal to the length of the inner magnet unit 57 in the first direction. Accordingly, the magnetomotive forces of the magnet units arranged on both sides of the elevator rope become equal. This allows a displacement amplification force to effectively act against a transverse displacement of the elevator rope.

Figure 37A:
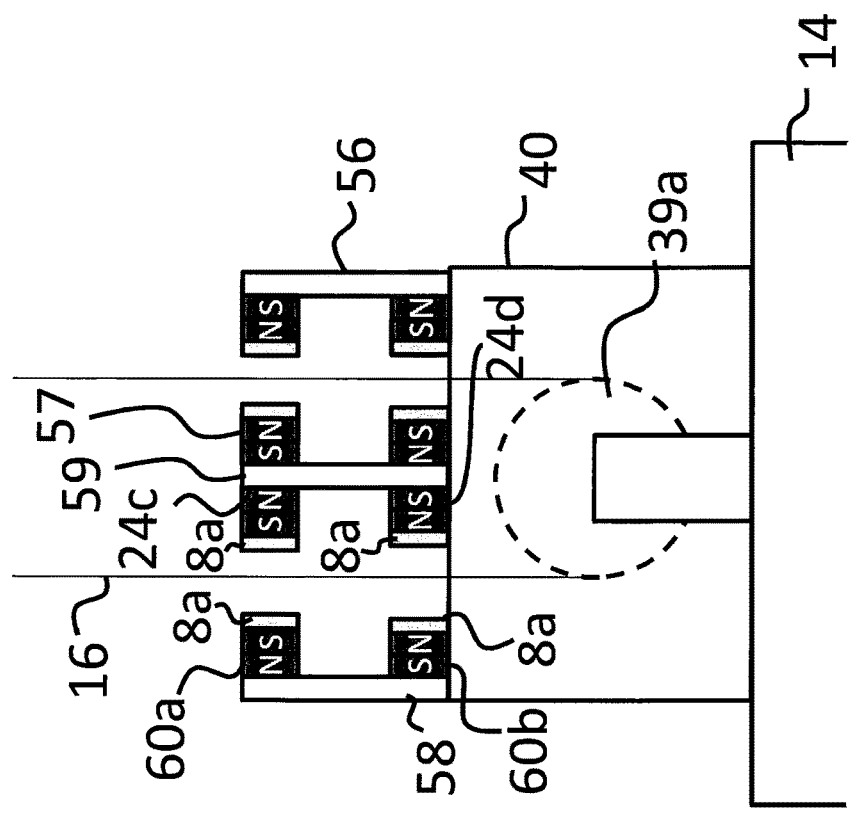
FIG. 37A is a side view of the vibration damping device according to Embodiment 3.

FIG. 37 are side views of vibration damping devices according to Embodiment 3. FIG. 37 each illustrate another example of the vibration damping device 100. As illustrated in FIG. 37A, each of a pair of outer magnet units 56 includes an outer yoke 58, a first outer permanent magnet 60a, and a second outer permanent magnet 60b. The outer yoke 58 is arranged along a second direction that is parallel with the first portion R1 or the second portion R2 of the main rope 16. The magnetic poles of the first outer permanent magnet 60a are directed toward the upper end of the outer yoke 58 from the direction of the main rope 16. The magnetic poles of the second outer permanent magnet 60b are opposite to those of the first outer permanent magnet 60a and are directed toward the lower end of the outer yoke 58 from the direction of the main rope 16. The magnetic poles of each of the outer magnet units 56 are, for example, the magnetic poles of the first outer permanent magnet 60a and the second outer permanent magnet 60b that do not face the outer yoke 58.

The inner magnet unit 57 includes an inner yoke 59, a first inner permanent magnet 61a, and a second inner permanent magnet 61b. The inner yoke 59 is arranged along the second direction that is parallel with the first portion R1 or the second portion R2 of the main rope 16. The first inner permanent magnet 61a is arranged at the upper end of the inner yoke 59 such that its magnetic poles face the same magnetic poles of the respective first outer permanent magnets 60a of the pair of outer magnet units 56. The second inner permanent magnet 61b is arranged at the lower end of the inner yoke 59 such that its magnetic poles face the same magnetic poles of the respective second outer permanent magnets 60b of the pair of outer magnet units 56.

Each of the pair of outer magnet units 56 forms a magnetic field on the side of the main rope 16. The outer yoke 58 forms a magnetic circuit between the first outer permanent magnet 60a and the second outer permanent magnet 60b. Therefore, a leakage flux is suppressed on the outer side of the pair of outer magnet units 56.

As described above, each of the pair of outer magnet units 56 includes the outer yoke 58, the first outer permanent magnet 60a, and the second outer permanent magnet 60b. The outer yoke 58 is arranged along the second direction that is parallel with the first portion or the second portion of the elevator rope. The magnetic poles of the first outer permanent magnet 60a are directed toward one end of the outer yoke 58 from the direction of the elevator rope. The magnetic poles of the second outer permanent magnet 60b are opposite to those of the first outer permanent magnet 60a and are directed toward the other end of the outer yoke 58 from the same direction of the first outer permanent magnet 60a. The inner magnet unit 57 includes the inner yoke 59, the first inner permanent magnet 61a, and the second inner permanent magnet 61b. The inner yoke 59 is arranged along the second direction. The first inner permanent magnet 61a is arranged at one end of the inner yoke 59 such that its magnetic poles face the same magnetic poles of the respective first outer permanent magnets 60a of the pair of outer magnet units 56. The second inner permanent magnet 61b is arranged at the other end of the inner yoke 59 such that its magnetic poles face the same magnetic poles of the respective second outer permanent magnets 60b of the pair of outer magnet units 56. Accordingly, the influence of a leakage flux from the magnet units of the displacement amplifier 7 on the operation of the peripheral devices can be suppressed. Further, as a leakage flux is reduced, the amount of the magnetic flux directed toward the elevator rope is increased. This allows a displacement of the elevator rope to be amplified more effectively. Thus, the vibration damping performance improves.

Figure 37B:
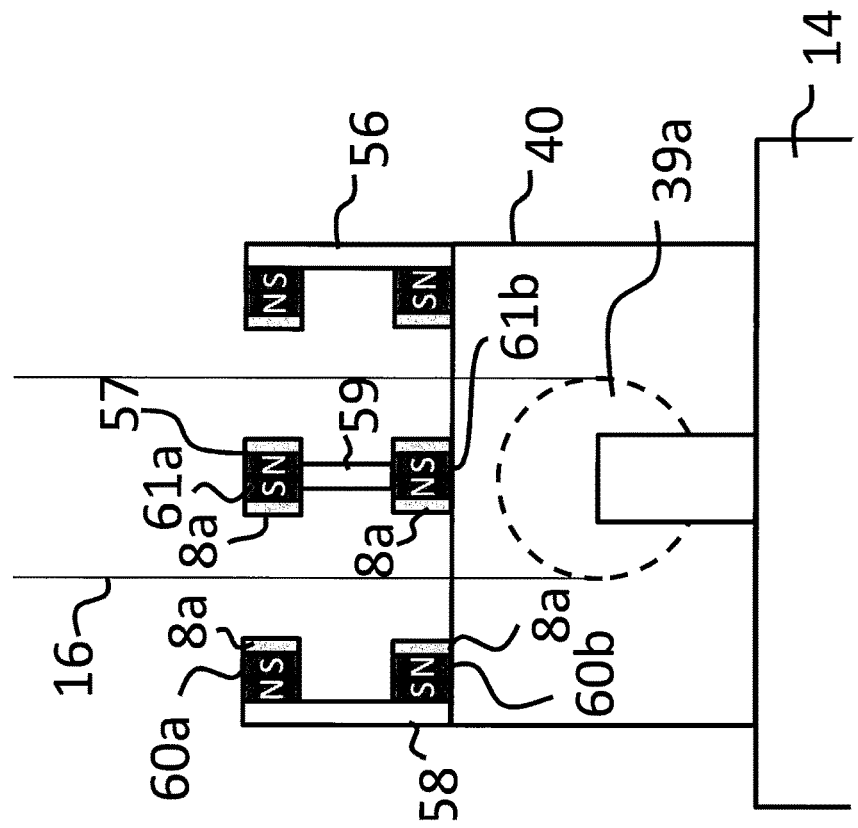
FIG. 37B is a side view of the vibration damping device according to Embodiment 3.

As illustrated in FIG. 37B, the inner magnet unit 57 may include a pair of permanent magnets 24c at the upper end of the inner yoke 59. The pair of permanent magnets 24c are arranged across the upper end of the inner yoke 59. The inner magnet unit 57 may also include a pair of permanent magnets 24d at the lower end of the inner yoke 59. The pair of permanent magnets 24d are arranged across the lower end of the inner yoke 59.

Figure 38:
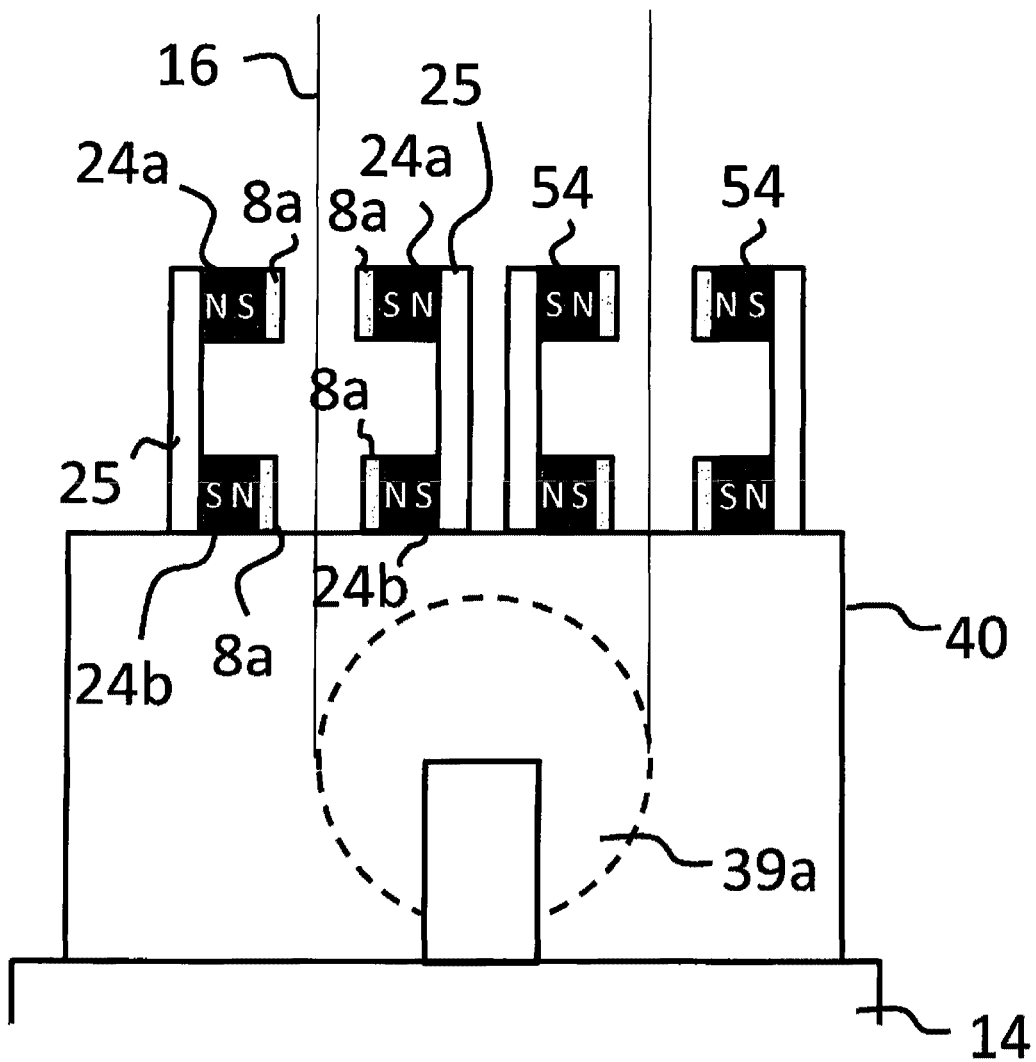
FIG. 38 is a side view of the vibration damping device according to Embodiment 3.

FIG. 38 is a side view of a vibration damping device according to Embodiment 3. As illustrated in FIG. 38, the displacement amplifier 7 may include a pair of magnet units 54 for each of the first portion R1 and the second portion R2 of the main rope 16.

Figure 39:
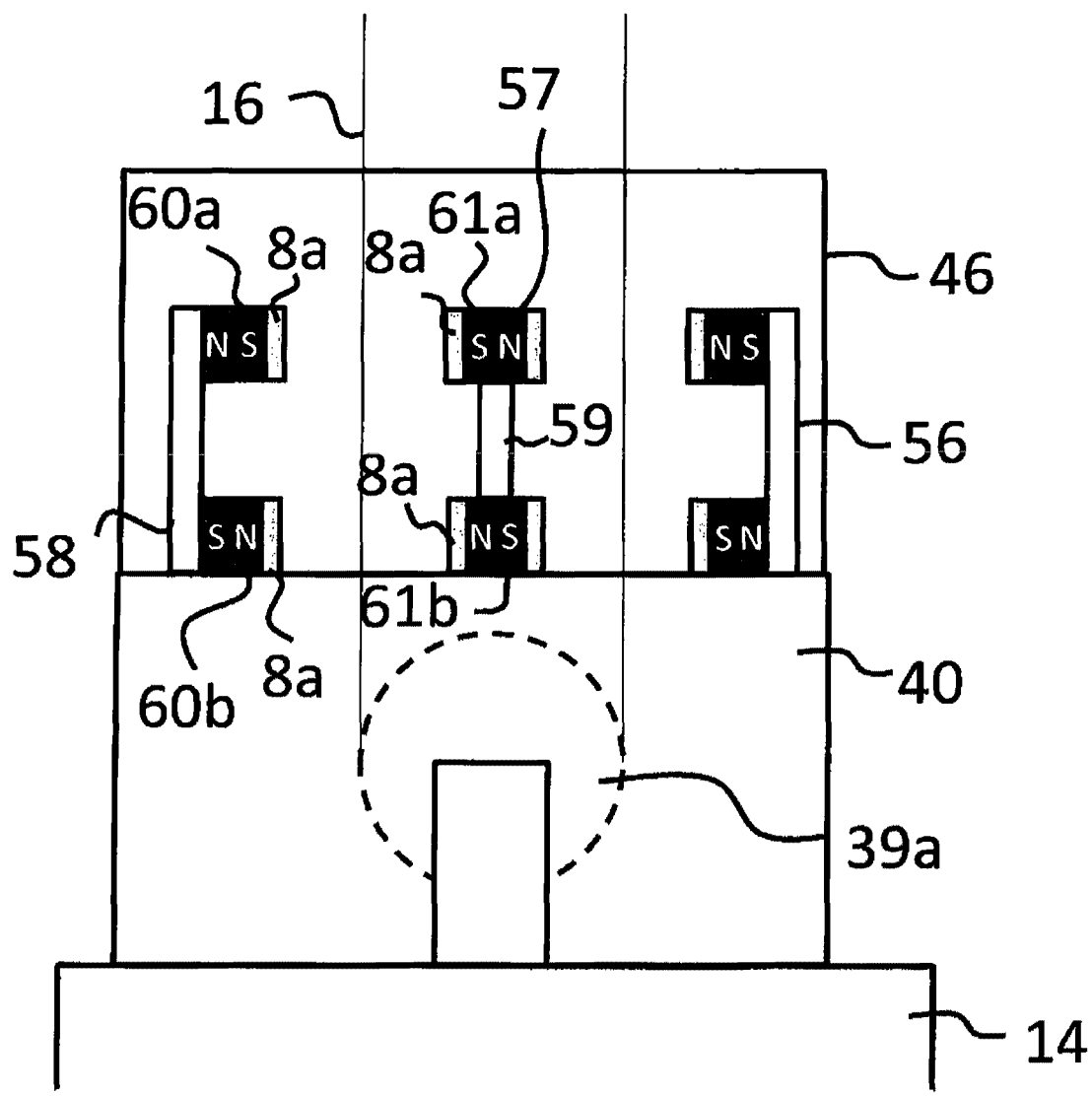
FIG. 39 is a side view of the vibration damping device according to Embodiment 3.

FIG. 39 is a side view of a vibration damping device according to Embodiment 3. FIG. 39 illustrates another example of the vibration damping device 100. The vibration damping device 100 includes a magnetic shield 46. The magnetic shield 46 is formed of a ferromagnetic material. Alternatively, the surface of the magnetic shield 46 is covered with a ferromagnetic material. Accordingly, the magnetic shield 46 has a ferromagnetic property. Herein, the ferromagnetic material used for the magnetic shield 46 is a material commonly used as a magnetic shield material, such as sheet metal or permalloy, for example.

As described above, the vibration damping device 100 includes the magnetic shield 46. The magnetic shield 46 has a ferromagnetic property. Accordingly, the influence of a leakage flux from the magnet units of the displacement amplifier 7 on the operation of the peripheral devices can be suppressed.

Figure 40:
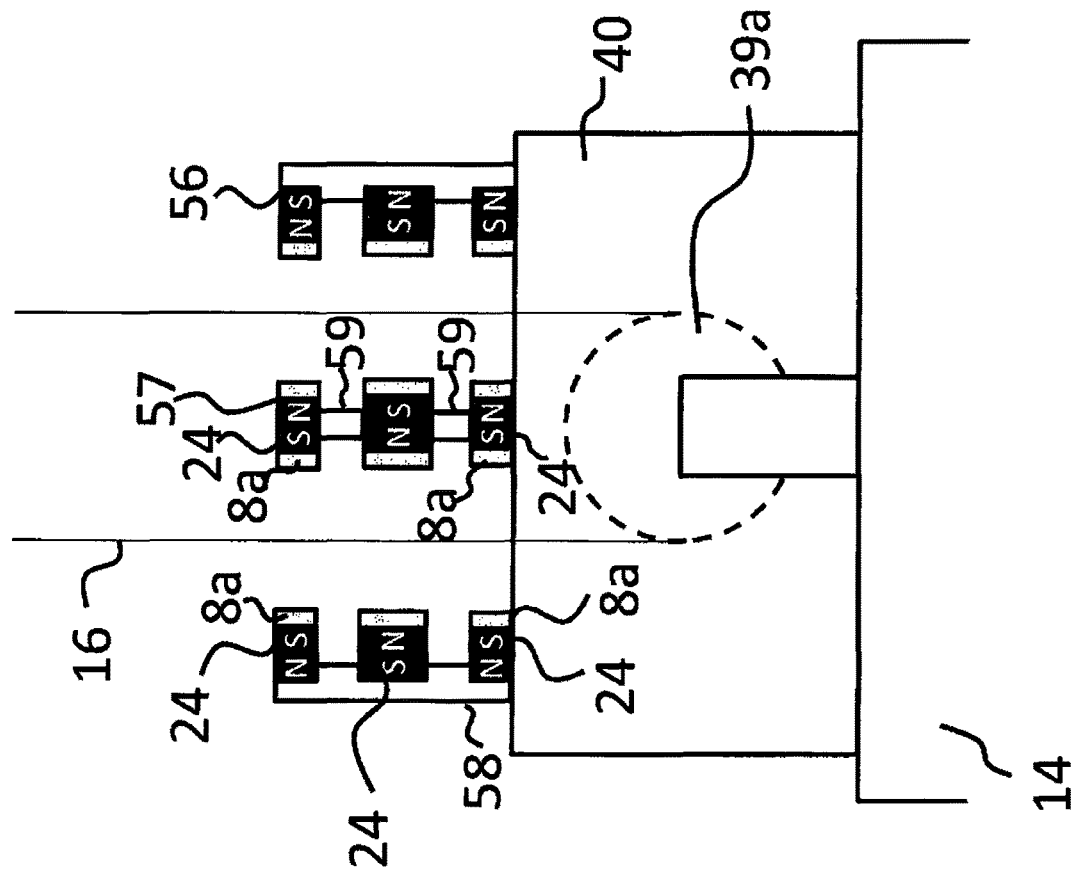
FIG. 40 is a side view of the vibration damping device according to Embodiment 3.

FIG. 40 are side views of vibration damping devices according to Embodiment 3. FIG. 40 each illustrate another example of the vibration damping device 100. As illustrated in FIG. 40A, each of a pair of outer magnet units 56 and an inner magnet unit 57 may include three or more permanent magnets 24. The three or more permanent magnets 24 are arranged such that alternately opposite magnetic poles face the main rope 16 in the direction along the main rope 16, for example.

An outer yoke 58 has grooves formed on its face on the side facing the main rope 16. The grooves of the outer yoke 58 have been machined corresponding to the shapes of the permanent magnets 24 of the outer magnet unit 56. Accordingly, it is possible to suppress the errant mutual attraction of a pair of permanent magnets 24, which are adjacent in the extending direction of the main rope 16, to each other due to an attraction force acting between the pair of permanent magnets 24. Therefore, the permanent magnets 24 can be attached easily.

As illustrated in FIG. 40B, the displacement amplifier 7 may include a pair of magnet units 54 each having three or more permanent magnets 24 for each of the first portion R1 and the second portion R2 of the main rope 16.

Figure 41:
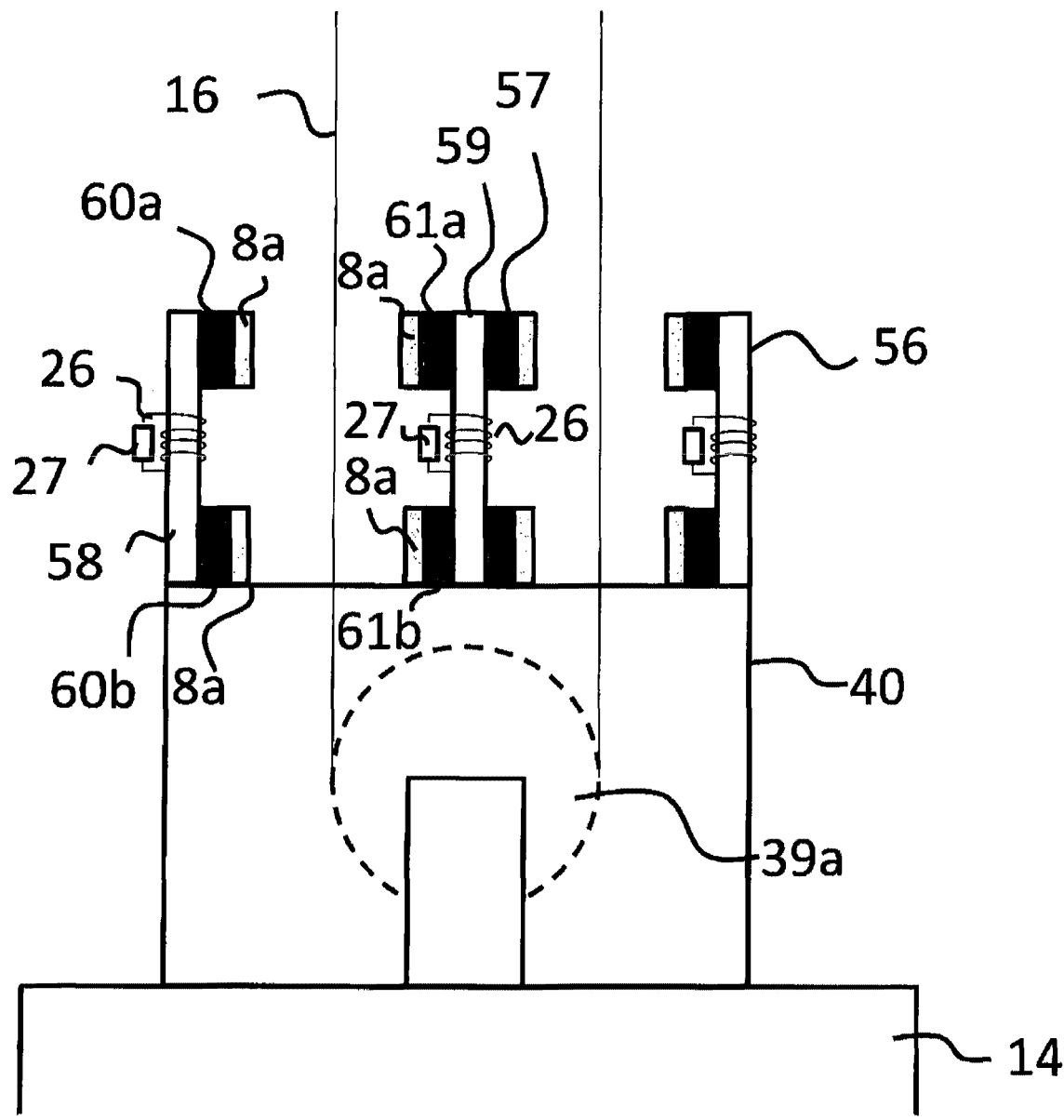
FIG. 41 is a side view of the vibration damping device according to Embodiment 3.
Figure 42:
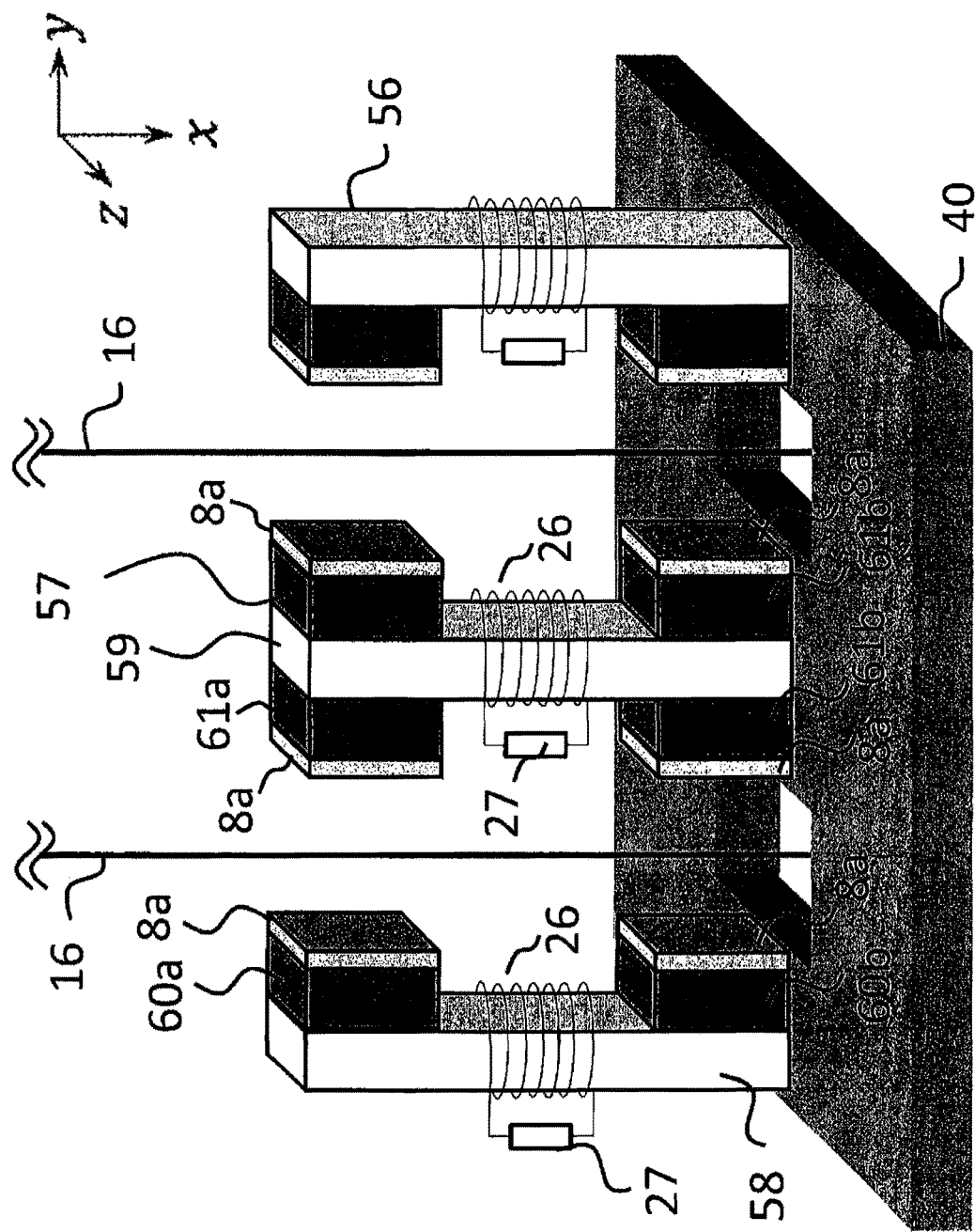
FIG. 42 is a perspective view of the vibration damping device according to Embodiment 3.
Figure 43:
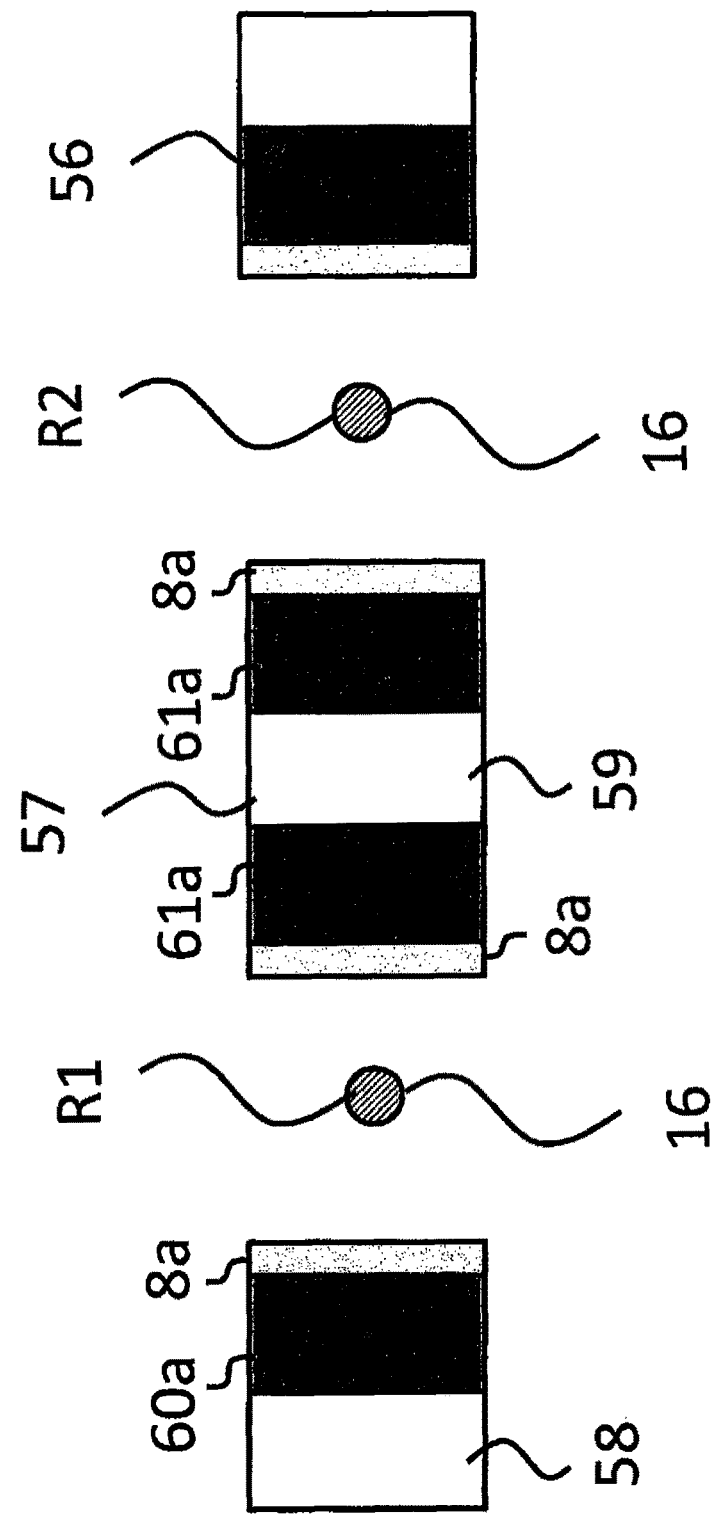
FIG. 43 is a top view of the vibration damping device according to Embodiment 3.

FIGS. 41 to 43 are views illustrating another example of the vibration damping device 100. FIG. 41 is a side view of a vibration damping device according to Embodiment 3. FIG. 42 is a perspective view of the vibration damping device according to Embodiment 3. FIG. 43 is a top view of the vibration damping device according to Embodiment 3.

The vibration damping device 100 includes a vibration damper. The vibration damper includes coils 26 and electric resistors 27. Each coil 26 is wound on each of the outer yoke 58 and the inner yoke 59. Each electric resistor 27 is electrically connected to the coil 26.

Herein, a magnetic flux passing through each of the outer yokes 58 and the inner yoke 59 changes with a change in the displacement of the main rope 16. Accordingly, a voltage is generated in each coil 26 due to an electromagnetic induction phenomenon. Accordingly, a current flows through each electric resistor 27. In this manner, the vibration energy of the main rope 16 is dissipated as Joule heat by the electric resistor 27. Therefore, the vibration damper reduces the vibration of the main rope 16.

Figure 44:
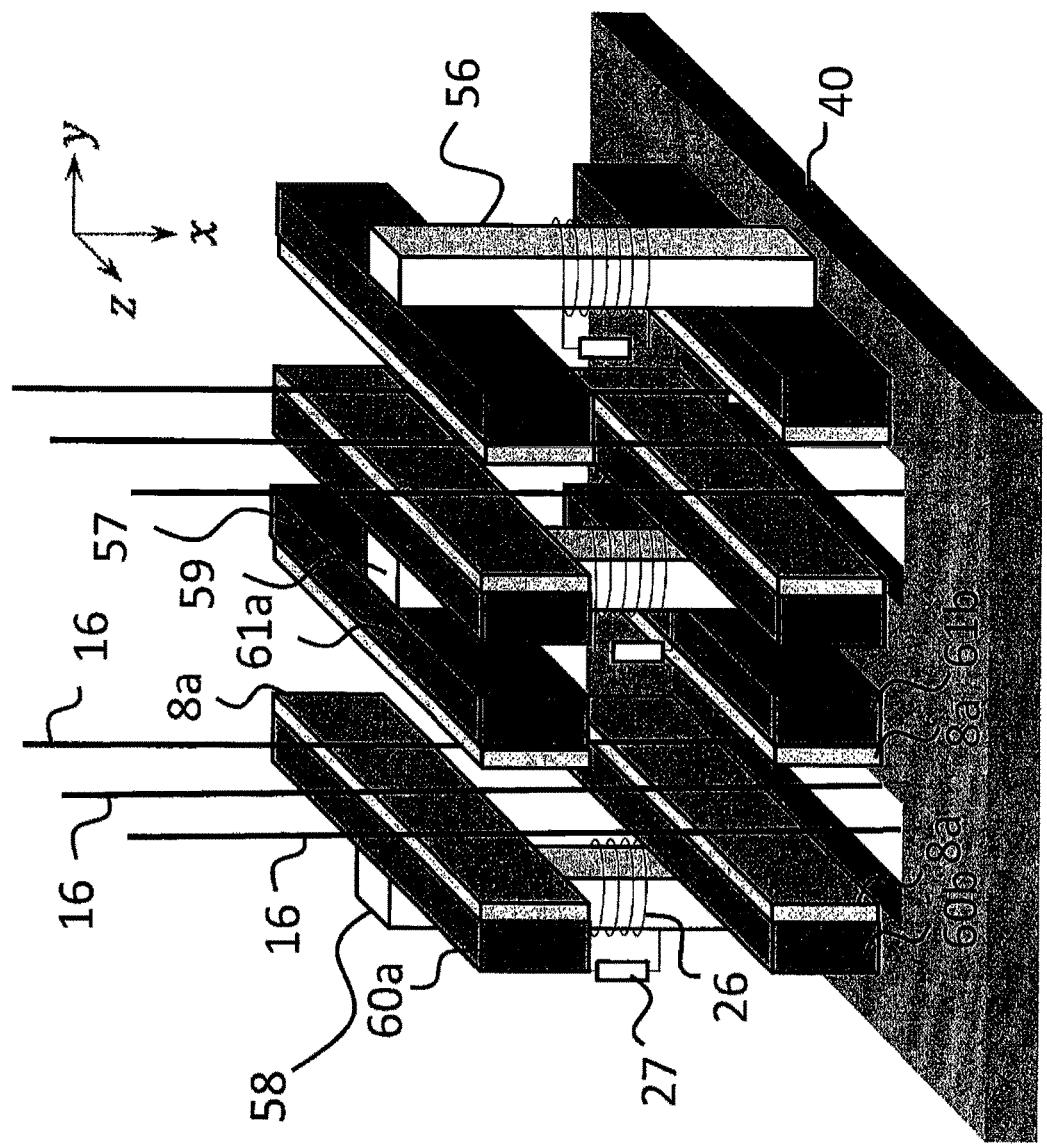
FIG. 44 is a perspective view of the vibration damping device according to Embodiment 3.

FIG. 44 is a perspective view of a vibration damping device according to Embodiment 3. FIG. 44 is a view illustrating another example of the vibration damping device 100. Herein, the structure whose vibration is controlled by the vibration damping device 100 is a plurality of main ropes 16. First portions R1 of the plurality of main ropes 16 are aligned in the horizontal direction in a vertical plane. In this example, the vertical plane is the xz plane. The plurality of main ropes 16 are arranged in the z-direction. Second portions R2 of the plurality of main ropes 16 are arranged in a vertical plane parallel with the vertical plane including the first portions R1 of the plurality of main ropes 16.

The magnetic poles of permanent magnets 24 of the displacement amplifier 7 face the first portions R1 or the second portions R2 of the plurality of main ropes 16 arranged in the horizontal direction. The magnetic poles of the permanent magnet 24 are arranged in parallel with the vertical plane including the first portions R1 or the second portions R2. The horizontal width of each permanent magnet 24 is wider than the total width of the first portions R1 or the second portions R2 arranged in the horizontal direction. Accordingly, displacements due to vibration of the plurality of main ropes 16 can be amplified.

Figure 45:
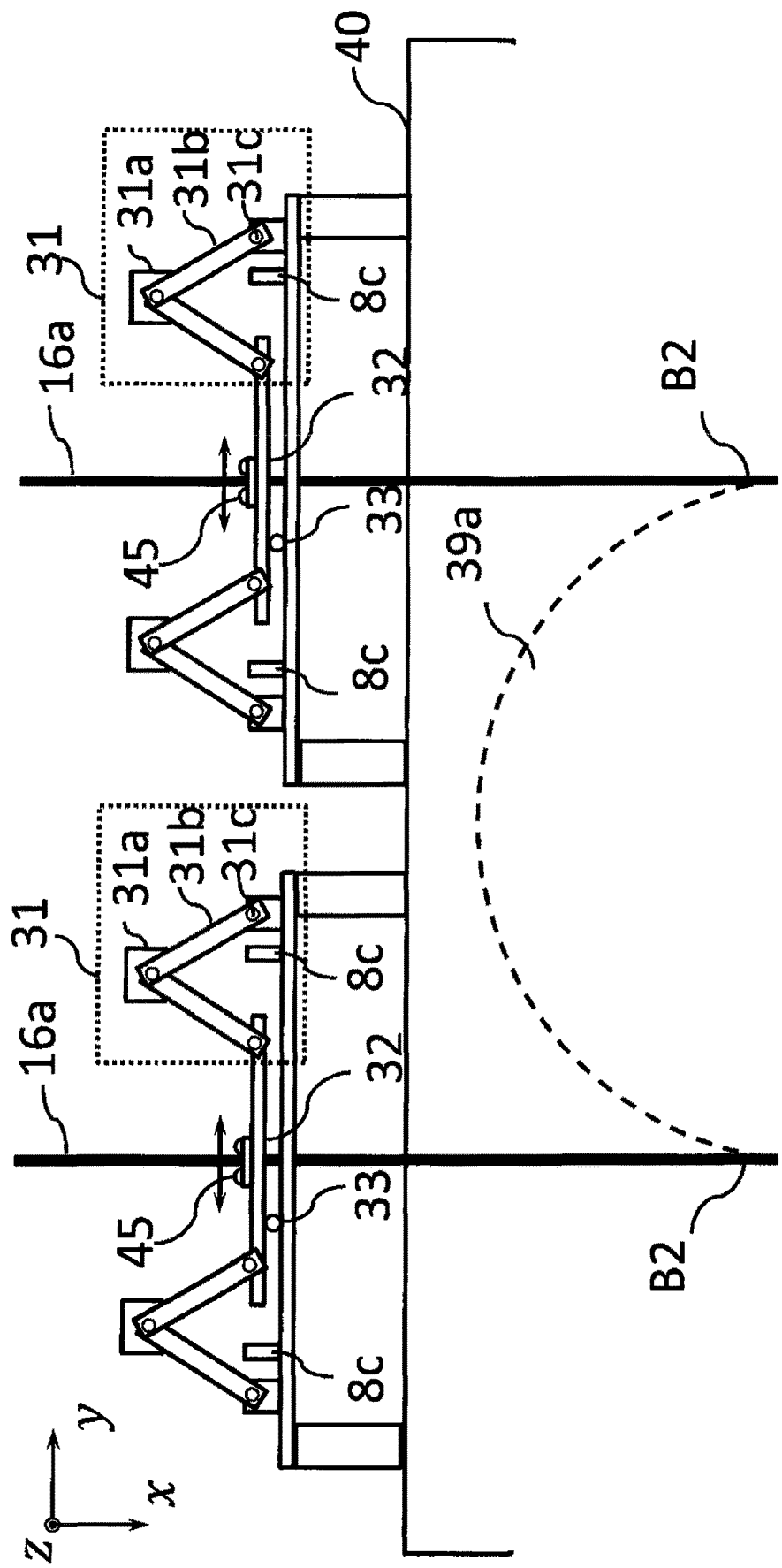
FIG. 45 is a side view of the vibration damping device according to Embodiment 3.
Figure 46:
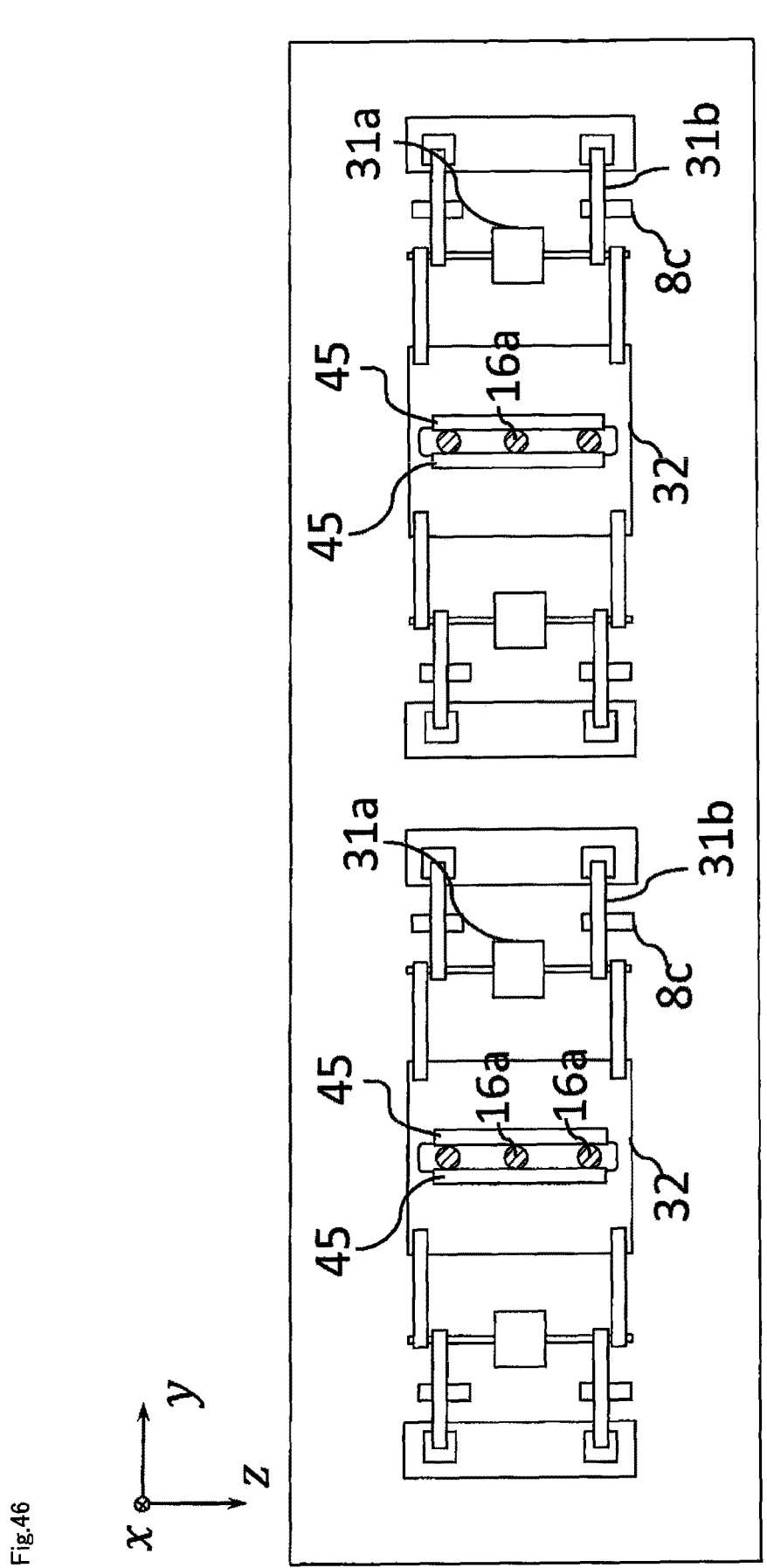
FIG. 46 is a top view of the vibration damping device according to Embodiment 3.

FIGS. 45 and 46 are views illustrating another example of the vibration damping device 100. FIG. 45 is a side view of a vibration damping device according to Embodiment 3. FIG. 46 is a top view of the vibration damping device according to Embodiment 3. As illustrated in FIG. 45, the displacement amplifier 7 may amplify a displacement of a first portion R1 or a second portion R2 using an unstable link mechanism. The displacement amplifier 7 includes a pair of toggle link mechanisms 31 and a rope restraining member 32 for each of the first portion R1 and the second portion R2 of each main rope 16*a*.

As illustrated in FIG. 46, each rope restraining member 32 includes a pair of rollers 45. The pair of rollers 45 contact the plurality of main ropes 16*a* from both sides thereof in the horizontal direction so as to sandwich them. The rotation axes of the pair of rollers 45 are oriented in the direction in which the plurality of main ropes 16*a* are arranged.

Figure 47:
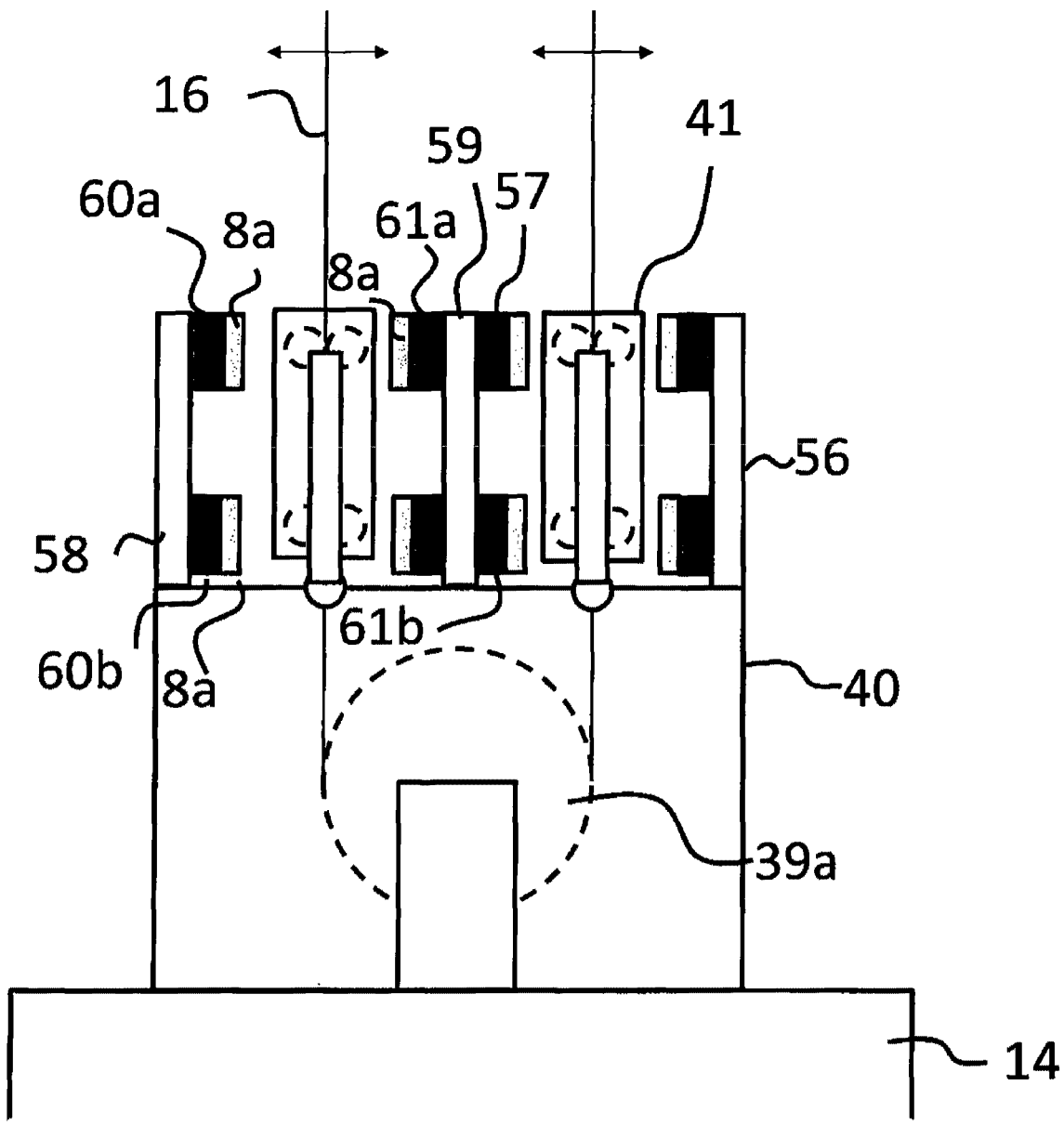
FIG. 47 is a side view of the vibration damping device according to Embodiment 3.
Figure 48:
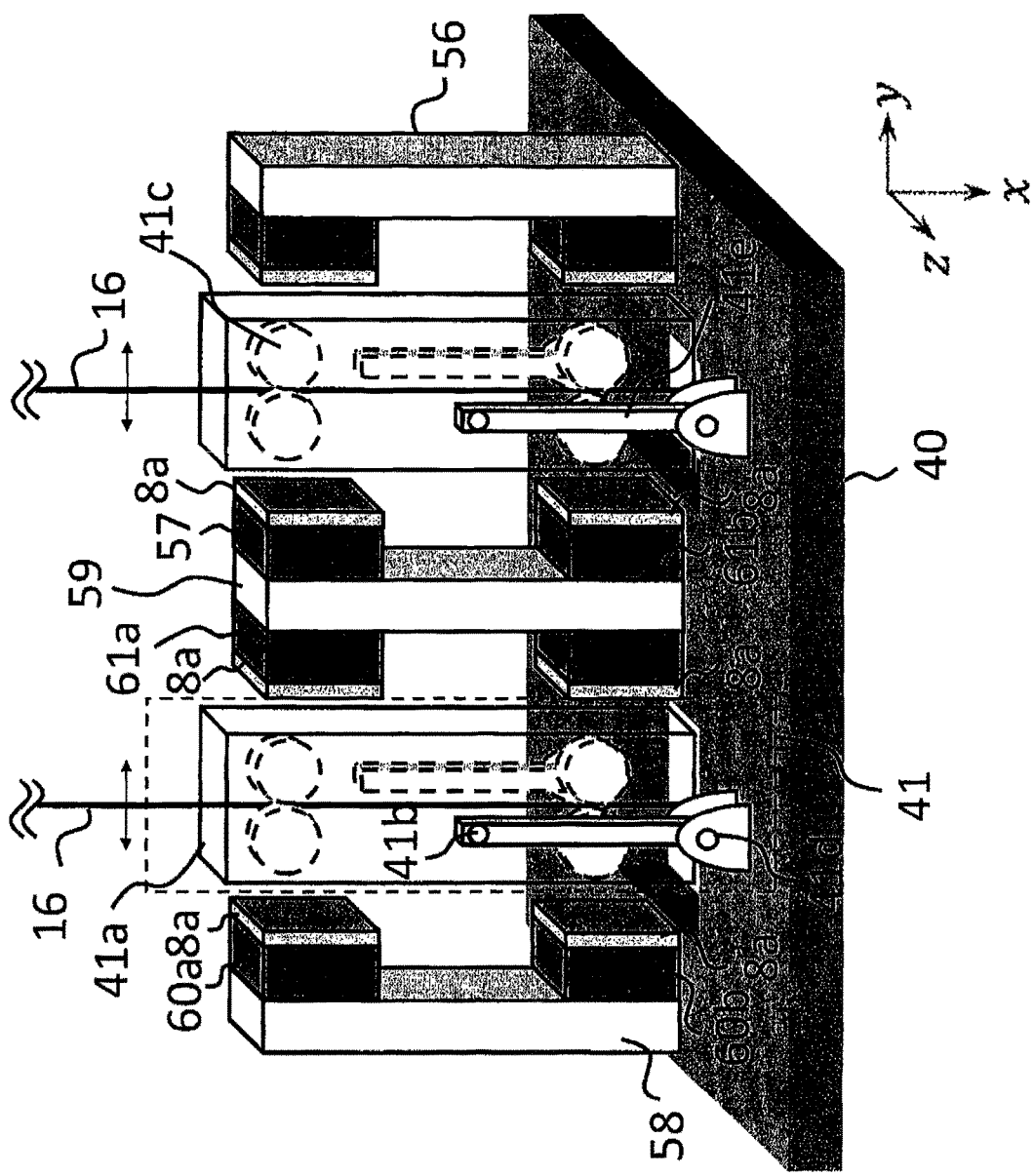
FIG. 48 is a perspective view of the vibration damping device according to Embodiment 3.

FIGS. 47 and 48 are views illustrating another example of the vibration damping device 100. FIG. 47 is a side view of a vibration damping device according to Embodiment 3. FIG. 48 is a perspective view of the vibration damping device according to Embodiment 3. In this example, the structure whose vibration is controlled by the vibration damping device 100 is a single main rope 16.

The vibration damping device 100 includes a pair of roller units 41 for a first portion R1 and a second portion R2 of the main rope 16. Each of the pair of roller units 41 includes a box 41*a*, a plurality of rollers 41*c*, and a pair of links 41*e*.

The box 41*a* of one of the pair of roller units 41 is arranged between one of a pair of outer magnet units 56 and an inner magnet unit 57. The box 41*a* of the other of the pair of roller units 41 is arranged between the other of the pair of outer magnet units 56 and the inner magnet unit 57. Each box 41*a* is a tubular member having openings at its top and bottom, for example. The box 41*a* is formed of a ferromagnetic material. Alternatively, the box 41*a* may have a ferromagnetic material attached to its surface so as to have a ferromagnetic property.

Each of the plurality of rollers 41*c* is arranged inside the box 41*a*. The plurality of rollers 41*c* include a pair of rollers arranged in the upper portion and a pair of rollers arranged in the lower portion of the box 41*a*, for example. The pair of rollers 41*c* arranged in the upper portion of the box 41*a* contact the main rope 16 from both sides thereof in the horizontal direction. The pair of rollers 41*c* arranged in the lower portion of the box 41*a* contact the main rope 16 from both sides thereof in the horizontal direction. The plurality of rollers 41*c* guide the main rope 16 by rotating with respect to the vertical movement of the main rope 16 along with the movement of the car 14.

Each of the pair of links 41*e* is a bar-like member. The pair of links 41*e* have joints 41*b* at the upper ends thereof. The pair of links 41*e* rotatably support the box 41*a* with the joints 41*b* at the upper ends thereof. The pair of links 41*e* also have joints 41*d* at the lower ends thereof. The pair of links 41*e* are rotatably supported on the housing 40 with the joints 41*d* at the lower ends thereof. The joints 41*b* and 41*d* generate a frictional force against rotation. The pair of links 41*e* support the box 41*a* such that the box 41*a* is allowed to be displaced in the first direction in which the first portion R1 and the second portion R2 are connected horizontally.

When the first portion R1 or the second portion R2 is displaced in the first direction due to vibration, the box 41*a* is also displaced in the first direction through the plurality of rollers 41*c*. The displacement in the first direction of the box 41*a* having a ferromagnetic property is amplified with the magnetic forces from the outer magnet unit 56 and the inner magnet unit 57. The box 41*a* amplifies the displacement of the main rope 16 through the plurality of rollers 41*c*.

When the box 41*a* is displaced, the joints 41*b* and 41*d* rotate. At this time, the kinetic energy about the joints 41*b* and 41*d* is dissipated as frictional heat. Accordingly, the joints 41*b* and 41*d* function as a vibration damper.

As described above, the vibration damping device 100 includes the pair of roller units 41. Each of the pair of roller units 41 is provided for each of the first portion R1 and the second portion R2 of the main rope 16. Each of the pair of roller units 41 includes the box 41*a*, the pair of rollers 41*c*, and the links 41*e*. The box 41*a* has a ferromagnetic property. The box 41*a* is arranged between one of the pair of outer magnet units 56 and the inner magnet unit 57. The pair of rollers 41*c* contact the main rope 16 from both sides thereof in the direction perpendicular to the main rope 16 inside the box 41*a*. The links 41*e* support the box 41*a* such that the box 41*a* is allowed to be displaced in the first direction. Accordingly, the magnet units of the displacement amplifier 7 can amplify even a displacement of the main rope 16 without a ferromagnetic property via the box 41*a* with a ferromagnetic property. The main rope 16 receives a force from the displacement amplifier 7 via the pair of rollers 41*c*. Thus, wear of the main rope 16 is suppressed.

The links 41*e* support the box 41*a* via the rotatable joints. Thus, the links 41*e* reduce vibration of the main rope 16 using friction that occurs along with the rotation of the joints. Accordingly, vibration energy is dissipated efficiently. Therefore, a high vibration damping effect can be obtained.

The pair of links 41*e* may be supported on the housing 40 via a shock-absorbing material, such as a gel, for example. Alternatively, the pair of links 41*e* may support the housing 40 via a shock-absorbing material, such as a gel, for example.

Figure 49:
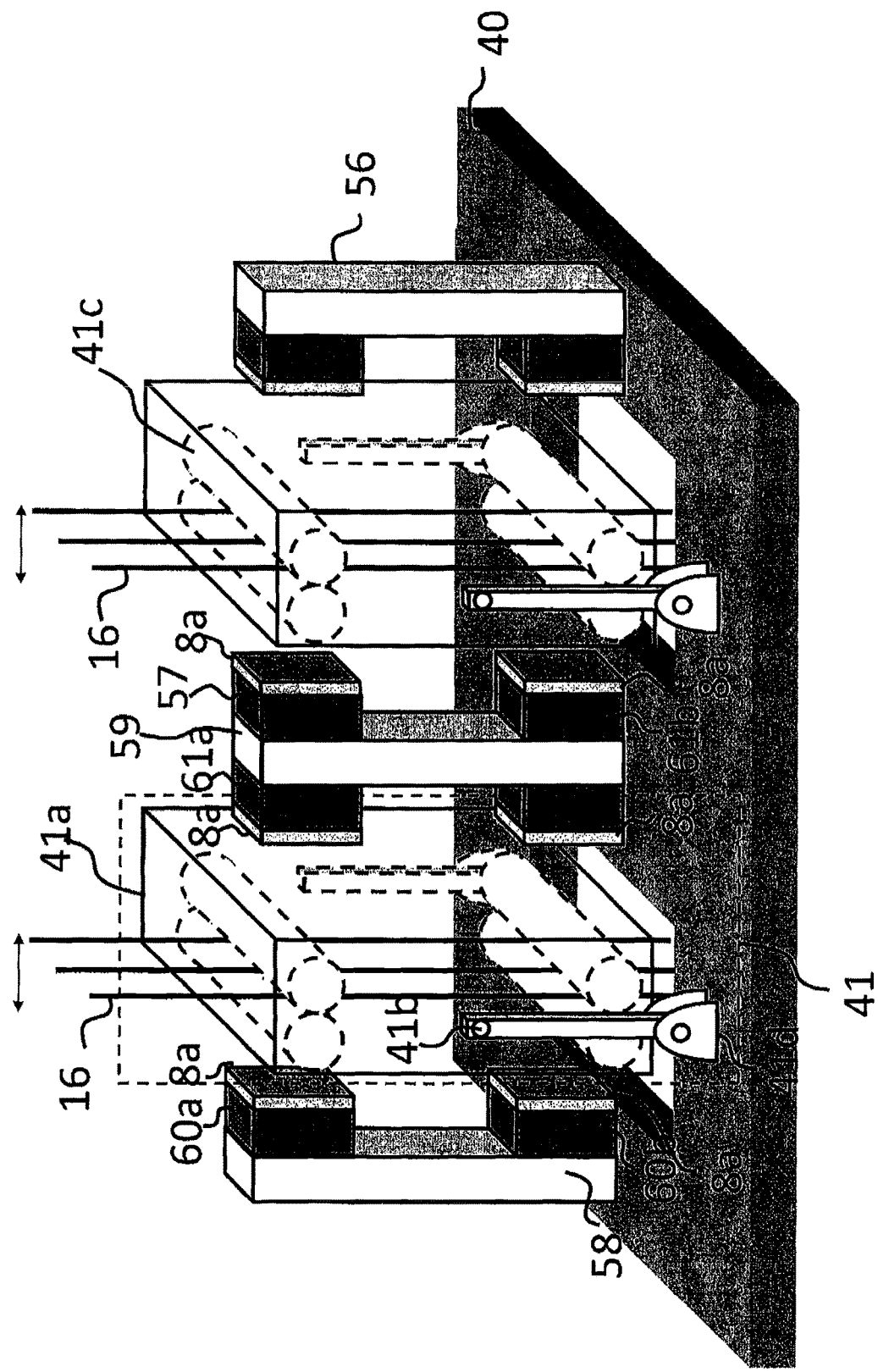
FIG. 49 is a perspective view of the vibration damping device according to Embodiment 3.
Figure 50:
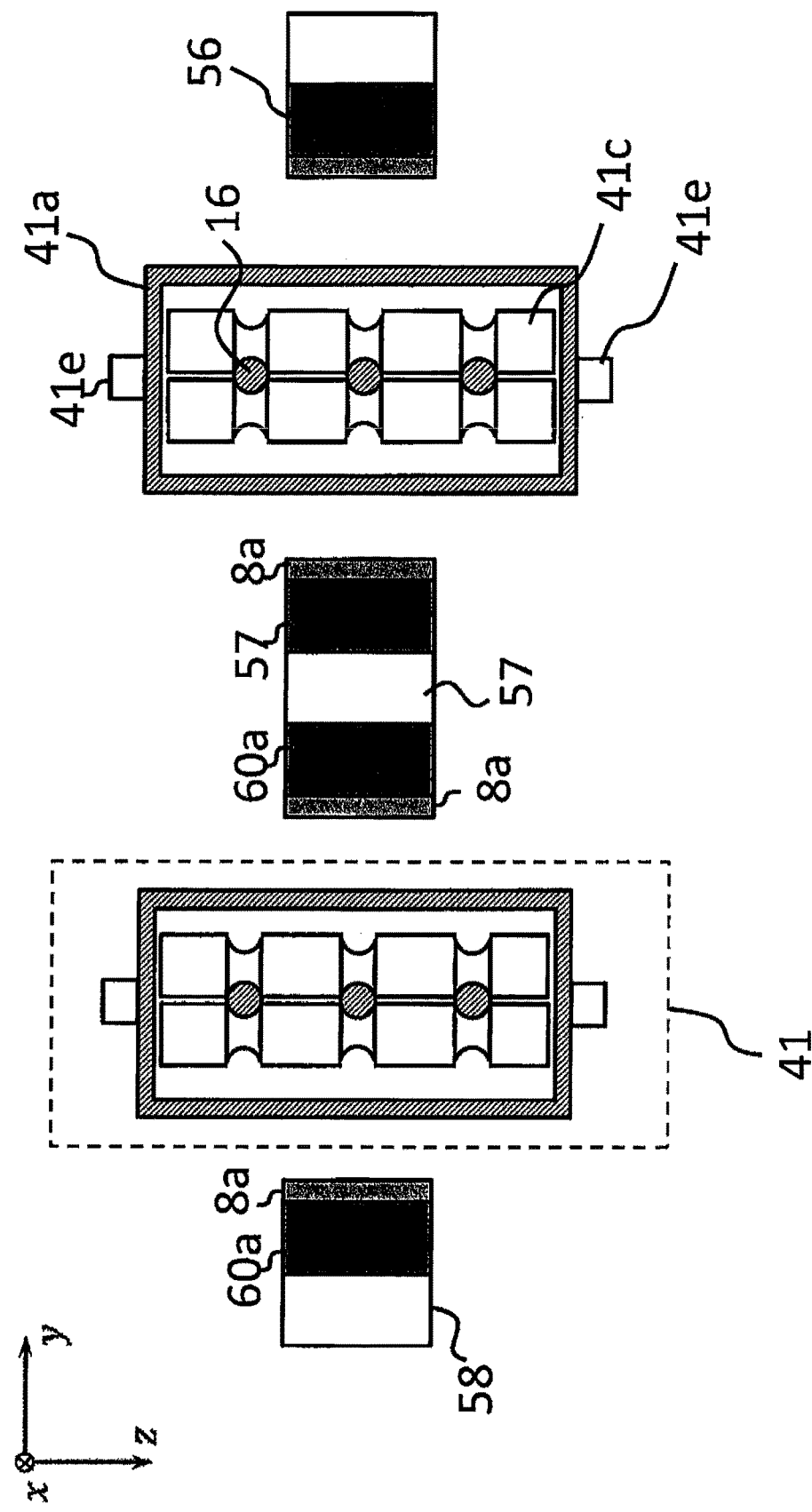
FIG. 50 is a top view of the vibration damping device according to Embodiment 3.

FIGS. 49 and 50 are views illustrating another example of the vibration damping device 100. FIG. 49 is a perspective view of a vibration damping device according to Embodiment 3. FIG. 50 is a top view of the vibration damping device according to Embodiment 3. In this example, the structure whose vibration is controlled by the vibration damping device 100 is a plurality of main ropes 16.

The rotation axes of a pair of rollers 41c are oriented in the direction parallel with the direction in which the plurality of main ropes 16 are arranged. The pair of rollers 41c contact each of the plurality of main ropes 16 from both sides thereof in the direction perpendicular to the rotation axes. Each of the pair of rollers 41c has groove-like guides formed on its side face so as to maintain a constant distance between each of the plurality of main ropes 16, which contact the pair of rollers 41c, in the horizontal direction.

As described above, when the target elevator rope is the plurality of main ropes 16 aligned in the horizontal direction, each roller 41c has a rotation axis parallel with the direction in which the plurality of main ropes 16 are aligned. Accordingly, each of the pair of roller units 41 functions as a restraining member that maintains a constant distance between each of the plurality of main ropes 16, which would otherwise contact each other, in the horizontal direction. This can suppress a decrease in the vibration damping performance due to variation in the tension of each of the plurality of main ropes 16.

Figure 51:
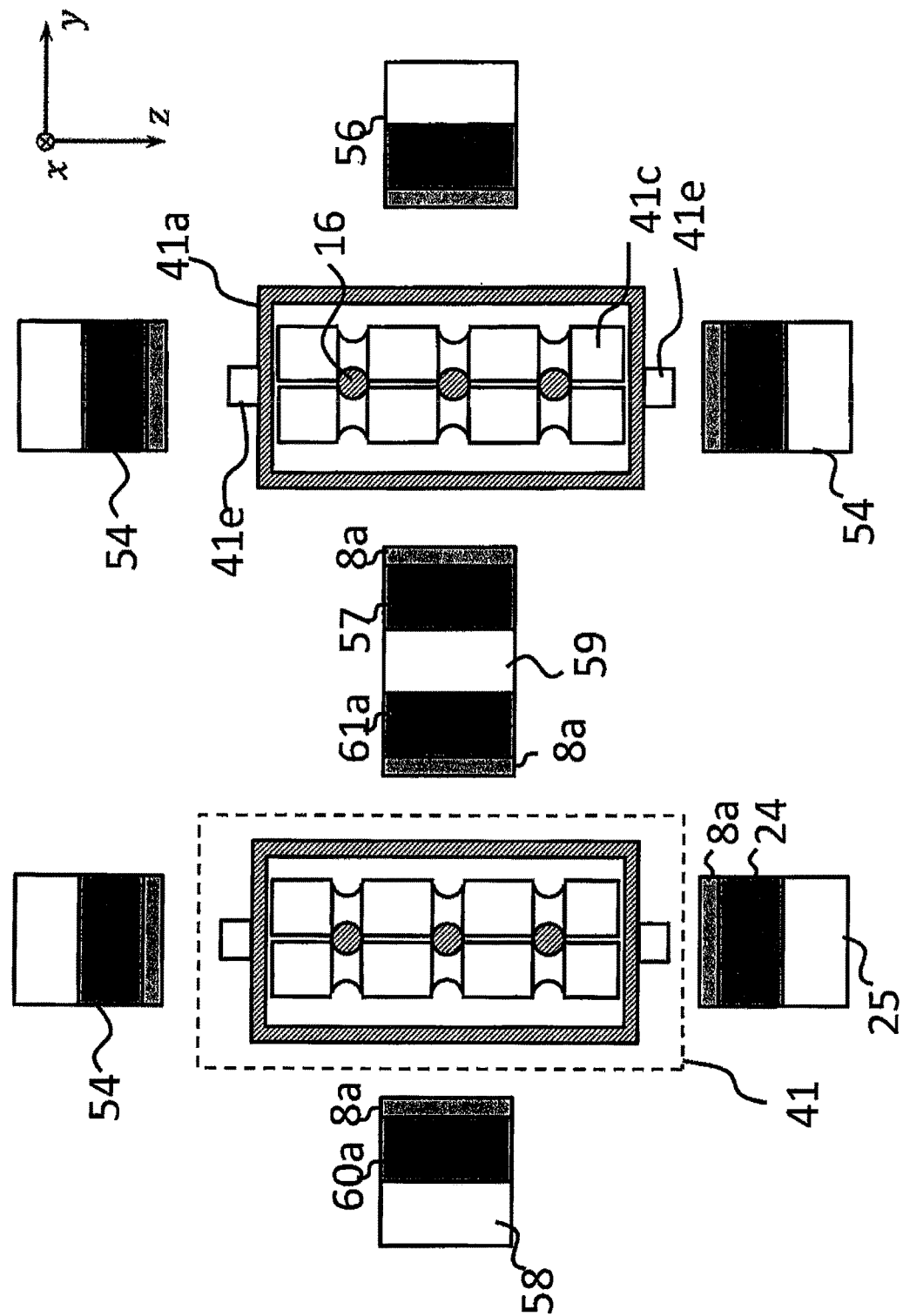
FIG. 51 is a top view of the vibration damping device according to Embodiment 3.

FIG. 51 is a top view of a vibration damping device according to Embodiment 3. FIG. 51 is a view illustrating another example of the vibration damping device 100. The vibration damping device 100 may include a pair of magnet units 54 facing each other in the direction in which the plurality of main ropes 16 are arranged. Accordingly, the vibration damping device 100 can control vibration of the main ropes 16 from two directions in the horizontal plane. It should be noted that the arrangement of the magnet units 54 in FIG. 51 is only exemplary, and thus the present invention is not limited thereto. For example, the vibration damping device 100 includes a plurality of magnet units 54. In such a case, the plurality of magnet units 54 may be arranged such that their magnetic poles face each of the pair of roller units 41 from different directions so as to surround them. The plurality of magnet units 54 may be arranged at different heights along the longitudinal direction of the main rope 16.

Figure 52B:
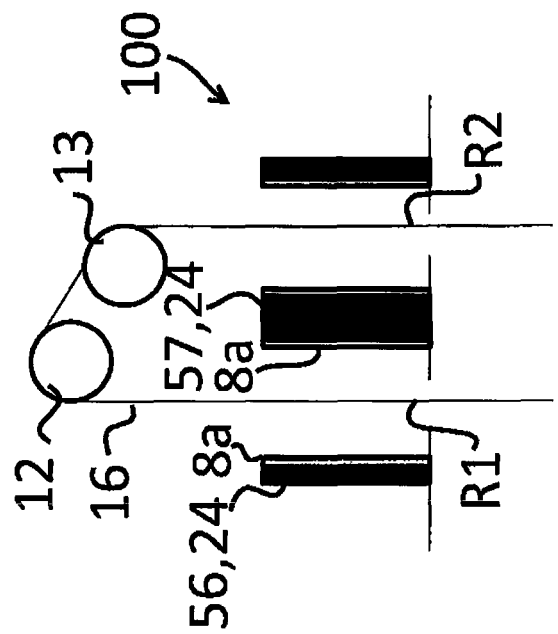
FIG. 52B is a configuration view of the elevator apparatus according to Embodiment 3.
Figure 52A:
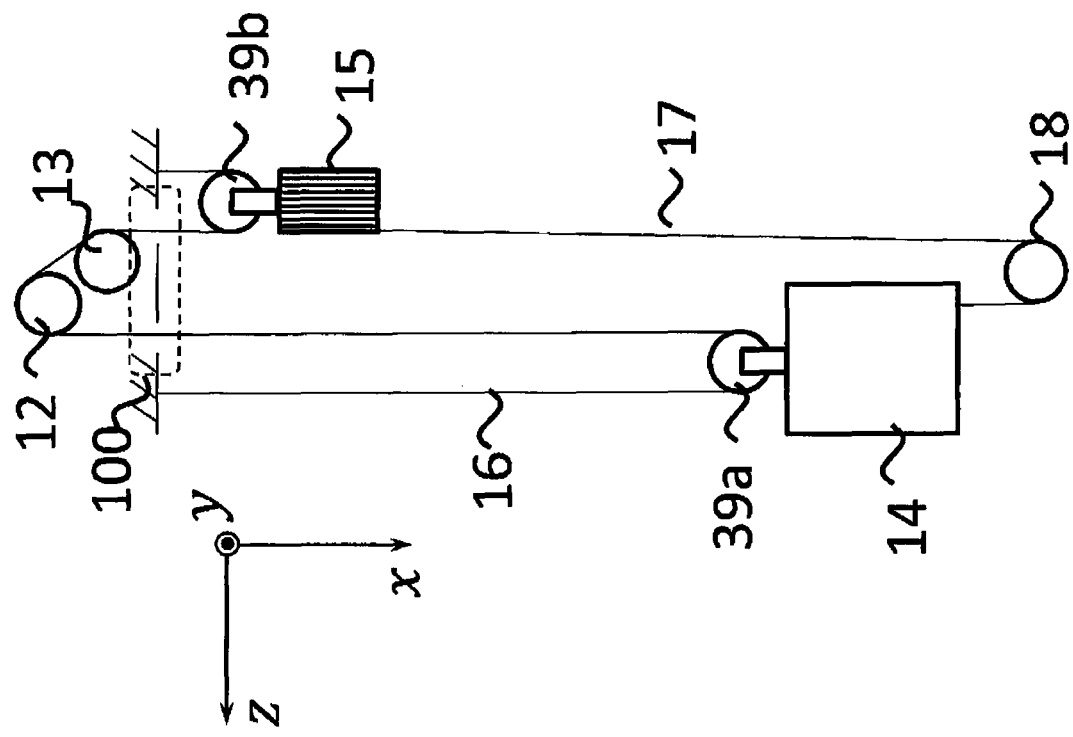
FIG. 52A is a configuration view of the elevator apparatus according to Embodiment 3.

FIG. 52 are configuration views of an elevator apparatus according to Embodiment 3. FIG. 52 are views illustrating another example of the vibration damping device 100. As illustrated in FIG. 52A, the vibration damping device 100 is provided in the machine room 29. As illustrated in FIG. 52B, the main rope 16 is wound on the sheave of the traction machine 12 and the deflector sheave 13 that is a sheave. The first portion R1 of the main rope 16 is a portion drawn from the sheave of the traction machine 12, for example. The second portion R2 of the main rope 16 is a portion drawn from the sheave of the deflector sheave 13, for example. In this manner, the main rope 16 may be wound on the plurality of sheaves and folded thereover.

Figure 53:
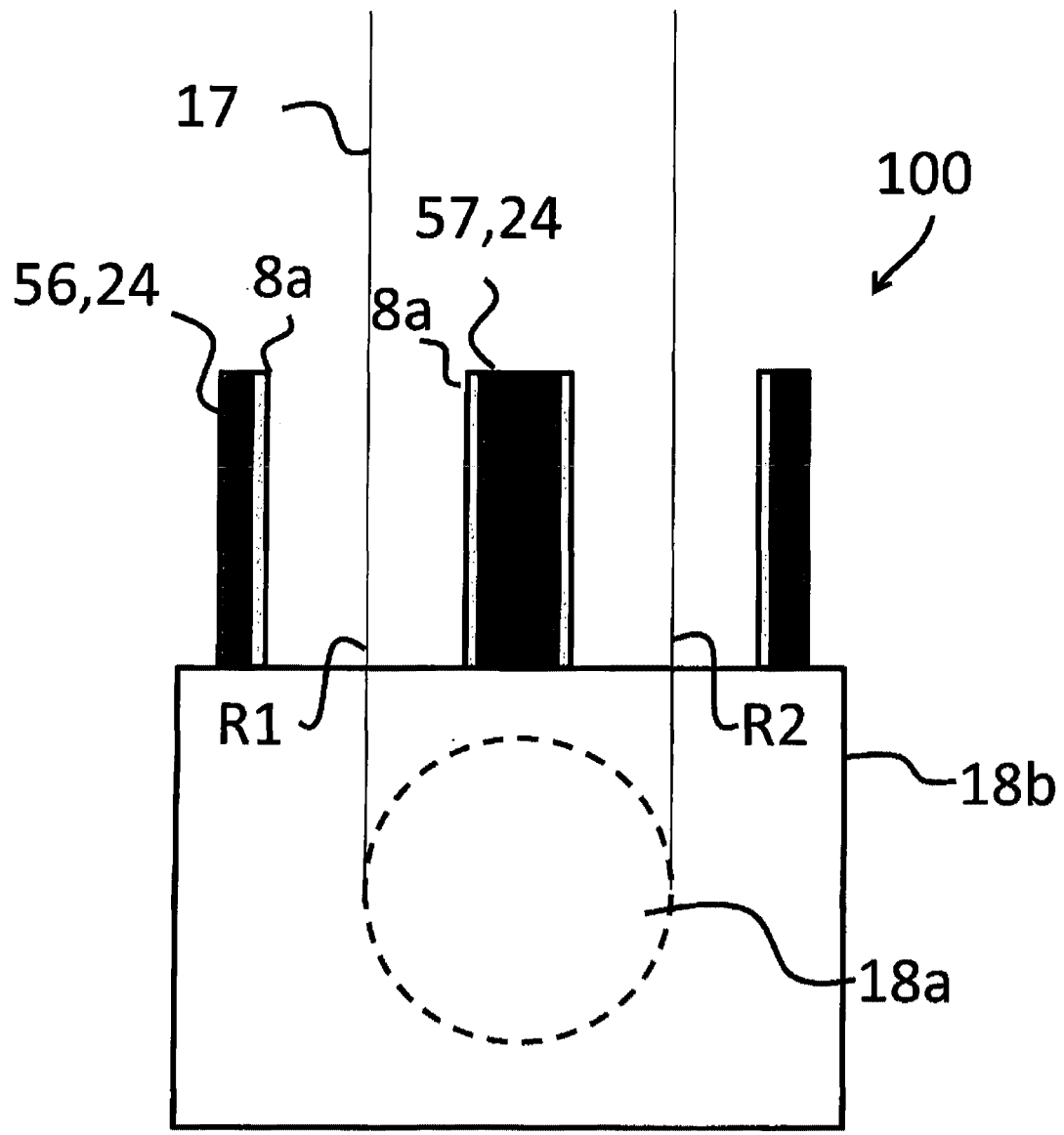
FIG. 53 is a side view of the vibration damping device according to Embodiment 3.

FIG. 53 is a side view of a vibration damping device according to Embodiment 3. FIG. 53 is a view illustrating another example of the vibration damping device 100. The vibration damping device 100 controls vibration of the compensating rope 17. The compensating rope 17 is wound on a compensating sheave 18a and is folded thereover. The vibration damping device 100 is provided on a housing 18b of the compensating sheave 18a.

Figure 54B:
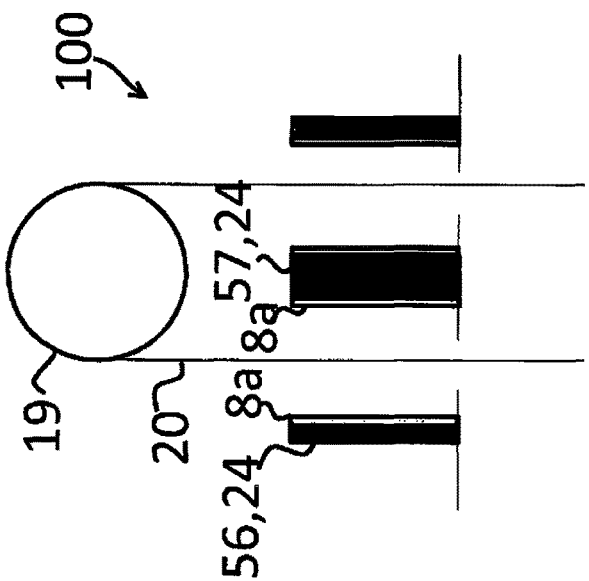
FIG. 54B is a configuration view of the elevator apparatus according to Embodiment 3.
Figure 54A:
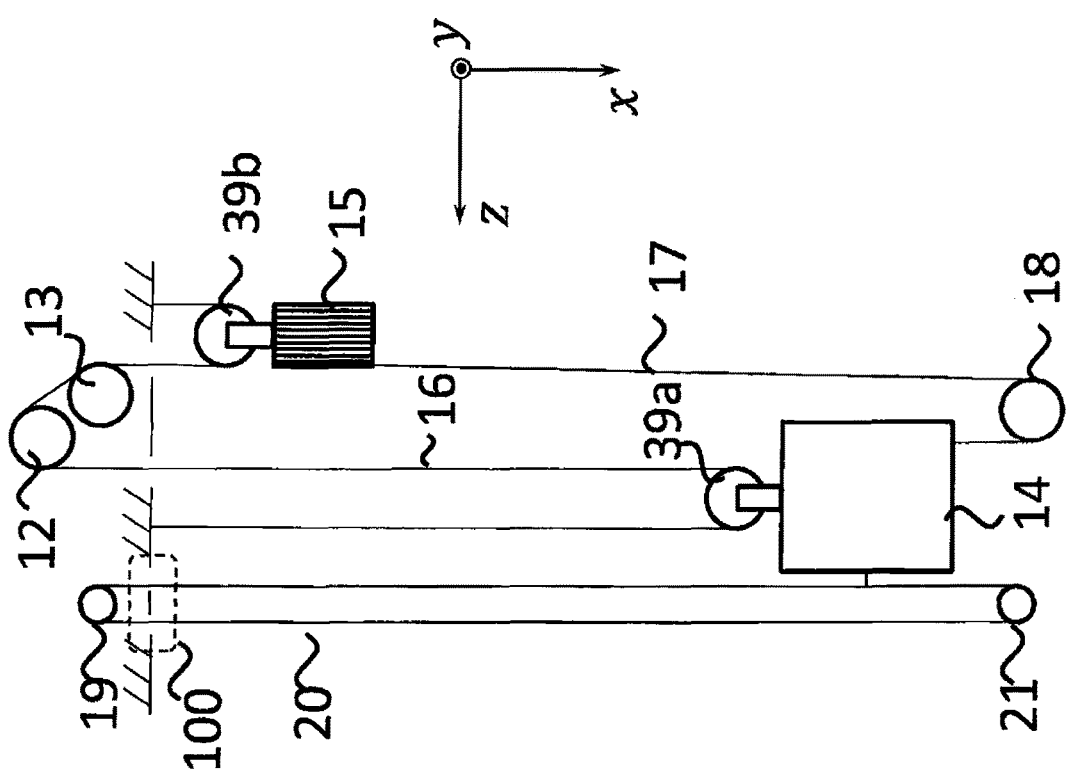
FIG. 54A is a configuration view of the elevator apparatus according to Embodiment 3.

FIG. 54 are configuration views of an elevator apparatus according to Embodiment 3. FIG. 54 are views illustrating another example of the vibration damping device 100. The vibration damping device 100 controls vibration of the governor rope 20. As illustrated in FIG. 54A, the vibration damping device 100 is provided in the machine room 29. As illustrated in FIG. 54B, the governor rope 20 is wound on the sheave of the governor 19. The vibration damping device 100 is provided below the governor 19.

INDUSTRIAL APPLICABILITY

The vibration damping device according to the present invention can be applied to an elevator apparatus. The elevator apparatus according to the present invention can be applied to a building with a plurality of floors.

REFERENCE SIGNS LIST

1, 1a, 1b, 1c, 1d, 1e Structure
2, 2a, 2b, 2c Fixed plane
3 Vibration force
4 Damper
5a, 5b Distance
6a, 6b, 6c Amplitude
7 Displacement amplifier
71 Negative stiffness portion
8, 8a, 8b, 8c, 8d Limiting member
9 Coupling portion
10 Positive stiffness portion (Elastic body)
11 Elevator apparatus
12 Traction machine
13 Deflector sheave
14 Car
15 Counterweight
16, 16a, 16b Main rope
17 Compensating rope
18 Compensating sheave
18b Housing
19 Governor
20 Governor rope
21 Governor tension sheave
22 Traveling cable
23 Building sway
24, 24a, 24b permanent magnet
25 Yoke
26 Coil
27 Electric resistor
28 Machine room floor
28a Rope duct
29 Machine room
30 Fixation member
31 Toggle link mechanism
31a Weight
31b Link
31c Rotation pivot
32 Rope restraining member
33 Linear guide
34 Upper beam
35 Shackle spring
36 Shackle rod
37 Ferromagnetic body
38 Limiting member
39a Car suspension sheave
39b Counterweight suspension sheave
40 Housing
41 Roller unit 41a Box
41c Roller
41e Link
41b, 41d Joint
45 Roller
46 Magnetic shield
47 Magnetic body
48a Fixing portion
48b Hoistway-side terminal
50 Support base
51 restraining member
52 Base
53 Roller
54 Magnet unit
55 Rope support
56 Outer magnet unit
57 Inner magnet unit
58 Outer yoke
59 Inner yoke
60a First outer permanent magnet
60b Second outer permanent magnet
61a First inner permanent magnet
61b Second inner permanent magnet

The invention claimed is:

1. A vibration damping device for reducing vibration of an elevator rope that is wound on and folded over one or more sheaves of an elevator, comprising:
a displacement amplifier arranged around a region from a first portion of the elevator rope drawn from the one or more sheaves and a second portion of the elevator rope drawn from an opposite side of the one or more sheaves in parallel with the first portion, the displacement amplifier being configured to amplify a displacement of each of the first portion and the second portion of the elevator rope; and
a limiting member that controls displacement amplification performed by the displacement amplifier such that the displacement of the first portion or the second portion amplified by the displacement amplifier does not become greater than a first displacement, the first displacement being a displacement of the elevator rope by which the elevator rope is not allowed to return to an equilibrium position of the vibration.

2. The vibration damping device according to claim 1, wherein:
the displacement amplifier includes at least one of a pair of outer magnet units or an inner magnet unit, the pair of outer magnet units being arranged on an outer side of the first portion and the second portion of the elevator rope such that magnetic poles of the pair of outer magnet units face each other in a first direction in which the first portion and the second portion are connected horizontally, the inner magnet unit being arranged on an inner side of the first portion and the second portion such that opposite magnetic poles of the inner magnet unit face the pair of respective outer magnet units, and
the limiting member includes a pair of non-magnetic bodies arranged between the respective magnetic poles of the pair of outer magnet units and the elevator rope or between the opposite magnetic poles of the inner magnet unit and the elevator rope.

3. The vibration damping device according to claim 2, further comprising a magnetic shield, the magnetic shield having a ferromagnetic property and covering the displacement amplifier.

4. The vibration damping device according to claim 1, wherein:
the displacement amplifier includes a pair of outer magnet units and an inner magnet unit, the pair of outer magnet units being arranged on an outer side of the first portion and the second portion of the elevator rope such that magnetic poles of the pair of outer magnet units face each other in a first direction in which the first portion and the second portion are connected horizontally, the inner magnet unit being arranged on an inner side of the first portion and the second portion such that opposite magnetic poles of the inner magnet unit face the pair of respective outer magnet units, and
the limiting member includes a pair of non-magnetic bodies arranged between the respective magnetic poles of the pair of outer magnet units and the elevator rope and between the opposite magnetic poles of the inner magnet unit and the elevator rope.

5. The vibration damping device according to claim 4, wherein the inner magnet unit is arranged such that both the same magnetic poles of the inner permanent magnet face the same magnetic poles of the respective outer permanent magnets of the pair of the outer magnet units.

6. The vibration damping device according to claim 4, wherein a length of each of the pair of outer magnet units in the first direction is equal to a length of the inner magnet unit in the first direction.

7. The vibration damping device according to claim 4, wherein the inner magnet unit is arranged at a position where a width of a gap between the inner magnet unit and one of the outer magnet units facing each other across the first portion of the elevator rope is equal to a width of a gap between the inner magnet unit and the other of the outer magnet units facing each other across the second portion of the elevator rope.

8. The vibration damping device according to claim 4, wherein at least one of the pair of outer magnet units or the inner magnet unit includes a permanent magnet and a magnetic body, the permanent magnet having magnetic poles arranged along the first direction, the magnetic body being arranged on each of the magnetic poles of the permanent magnet and adapted to adjust a length of the at least one of the pair of outer magnet units or the inner magnet unit in the first direction.

9. The vibration damping device according to claim 4, wherein:
each of the pair of outer magnet units includes an outer yoke, a first outer permanent magnet, and a second outer permanent magnet, the outer yoke being arranged along a second direction parallel with the first portion or the second portion of the elevator rope, the first outer permanent magnet having magnetic poles directed toward one end of the outer yoke from a direction of the elevator rope, the second outer permanent magnet having magnetic poles that are opposite to the magnetic poles of the first outer permanent magnet and directed toward another end of the outer yoke from the same direction of the first outer permanent magnet, and
the inner magnet unit includes an inner yoke, a first inner permanent magnet, and a second inner permanent magnet, the inner yoke being arranged along the second direction, the first inner permanent magnet being arranged at one end of the inner yoke such that opposite magnetic poles of the first inner permanent magnet face the same magnetic poles of the respective first outer permanent magnets of the pair of outer magnet units, the second inner permanent magnet being arranged at another end of the inner yoke such that opposite magnetic poles of the second inner permanent magnet face the same magnetic poles of the respective second outer permanent magnets of the pair of outer magnet units.

10. The vibration damping device according to claim 4, further comprising a pair of roller units provided for the first portion and the second portion of the elevator rope, respectively, wherein:

each of the pair of roller units includes a box having a ferromagnetic property and arranged between one of the pair of outer magnet units and the inner magnet unit, a pair of rollers adapted to contact the elevator rope from both sides in a direction perpendicular to the elevator rope inside the box, and a link that supports the box such that the box is allowed to be displaced in the first direction.

11. The vibration damping device according to claim 10, wherein when the elevator rope is a plurality of main ropes aligned in a horizontal direction, each of the rollers has a rotation axis parallel with the direction in which the plurality of main ropes are aligned.

12. The vibration damping device according to claim 10, wherein the link supports the box via a rotatable joint, and reduces vibration of the elevator rope using friction that occurs along with rotation of the joint.

13. An elevator apparatus comprising the vibration damping device according to claim 1.

\* \* \* \* \*